(12) United States Patent
Kuo et al.

(10) Patent No.: US 10,608,973 B2
(45) Date of Patent: Mar. 31, 2020

(54) EMBEDDED CODES IN MESSAGING PROTOCOL COMMUNICATIONS

(71) Applicant: Amazon Technologies, Inc., Seattle, WA (US)

(72) Inventors: Calvin Yue-Ren Kuo, Mercer Island, WA (US); Jonathan I. Turow, Seattle, WA (US); Kyunghwan Choi, Seattle, WA (US); Marc John Brooker, Seattle, WA (US); James Christopher Sorenson, III, Seattle, WA (US); Weili Zhong McClenahan, Seattle, WA (US); Mark Edward Rafn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 15/362,757

(22) Filed: Nov. 28, 2016

(65) Prior Publication Data
US 2018/0152405 A1   May 31, 2018

(51) Int. Cl.
*H04L 12/58*   (2006.01)
(52) U.S. Cl.
CPC .................................. *H04L 51/18* (2013.01)
(58) Field of Classification Search
CPC ...................................................... H04L 51/18
USPC ........................................................ 709/204
See application file for complete search history.

(56) References Cited

U.S. PATENT DOCUMENTS

| 6,256,498 | B1 | 7/2001 | Ludwig |
| 8,339,259 | B1 * | 12/2012 | Biere ..................... G06Q 10/10 340/309.16 |
| 9,122,651 | B1 | 9/2015 | Baulier et al. |
| 9,146,764 | B1 | 9/2015 | Wagner |
| 9,317,318 | B2 | 4/2016 | Zheng et al. |

(Continued)

FOREIGN PATENT DOCUMENTS

| WO | WO 2018/098366 A1 | 5/2018 |
| WO | WO 2018/098443 A1 | 5/2018 |
| WO | WO 2018/098445 A1 | 5/2018 |

OTHER PUBLICATIONS

Corbin, "MQTT is the de-facto standard and ISO standard for messaging protocols", Jul. 1, 2016, developer.ibm.com (4 pages).*
Wikipedia, "Create, Read, Update, and Delete", saved Oct. 1, 2018, en.wikipedia.com (3 pages).*

(Continued)

*Primary Examiner* — Wing F Chan
*Assistant Examiner* — Leon Y Tseng
(74) *Attorney, Agent, or Firm* — Knobbe, Martens, Olson & Bear, LLP

(57) ABSTRACT

Systems and methods are described for management of data transmitted between computing devices in a communication network. An administrative component can configure one or more devices in the communication path of messages to be exchanged by devices to interpret codes embedded in the communication messages. A receiving device can review incoming messages for one or more processing codes or instructions that are embedded in the portion of the communication typically utilized solely to identify the subject matter of the communication, generally referred to as the topic portion of the communication. The receiving devices can then process the embedded codes to determine how the communication message will be routed or otherwise processed.

20 Claims, 36 Drawing Sheets

(56) References Cited

U.S. PATENT DOCUMENTS

| | | |
|---|---|---|
| 9,606,817 B1 | 3/2017 | Efstathopoulos |
| 9,860,677 B1 | 1/2018 | Agerstam et al. |
| 10,091,100 B1 | 10/2018 | Duerk |
| 10,193,839 B2 | 1/2019 | Tandon et al. |
| 10,216,540 B2 | 2/2019 | Kuo et al. |
| 10,372,486 B2 | 8/2019 | Kuo et al. |
| 2002/0184070 A1 | 12/2002 | Chen et al. |
| 2005/0021836 A1* | 1/2005 | Reed ................... G06F 9/542 709/238 |
| 2005/0132368 A1 | 6/2005 | Sexton et al. |
| 2005/0198365 A1 | 9/2005 | Wei |
| 2008/0248801 A1 | 10/2008 | Fletcher et al. |
| 2010/0064208 A1* | 3/2010 | Valtchev ............... G06F 9/4443 715/234 |
| 2011/0061062 A1 | 3/2011 | Chu et al. |
| 2012/0060171 A1 | 3/2012 | Bobroff et al. |
| 2012/0233248 A1 | 9/2012 | Zou et al. |
| 2013/0018960 A1 | 1/2013 | Knysz et al. |
| 2013/0191542 A1 | 7/2013 | Matczynski et al. |
| 2013/0198319 A1 | 8/2013 | Shen et al. |
| 2013/0219385 A1 | 8/2013 | Geibel et al. |
| 2014/0115655 A1 | 4/2014 | Marvais et al. |
| 2014/0317738 A1 | 10/2014 | Be'ery et al. |
| 2014/0324973 A1 | 10/2014 | Goel et al. |
| 2015/0006296 A1 | 1/2015 | Gupta et al. |
| 2015/0019342 A1 | 1/2015 | Gupta |
| 2015/0271150 A1 | 9/2015 | Barnett et al. |
| 2016/0092251 A1 | 3/2016 | Wagner |
| 2016/0105691 A1 | 4/2016 | Zucchetta |
| 2016/0149917 A1 | 5/2016 | Tanaka |
| 2016/0205106 A1 | 7/2016 | Yacoub et al. |
| 2016/0226937 A1 | 8/2016 | Patel et al. |
| 2016/0255167 A1 | 9/2016 | Green et al. |
| 2016/0259932 A1 | 9/2016 | Lakshmanan et al. |
| 2016/0291959 A1 | 10/2016 | Searle et al. |
| 2017/0006030 A1 | 1/2017 | Krishnamoorthy et al. |
| 2017/0026321 A1 | 1/2017 | Ciavatta |
| 2017/0093915 A1 | 3/2017 | Ellis et al. |
| 2017/0139925 A1 | 5/2017 | Shah et al. |
| 2017/0155703 A1 | 6/2017 | Hao et al. |
| 2017/0168736 A1 | 6/2017 | Batra et al. |
| 2017/0168777 A1 | 6/2017 | Britt |
| 2017/0187597 A1 | 6/2017 | Nolan et al. |
| 2017/0280279 A1 | 9/2017 | Ghosh et al. |
| 2018/0034913 A1 | 2/2018 | Matthieu et al. |
| 2018/0109395 A1 | 4/2018 | Berdy et al. |
| 2018/0150317 A1 | 5/2018 | Kuo et al. |
| 2018/0150318 A1 | 5/2018 | Kuo et al. |
| 2018/0150325 A1 | 5/2018 | Kuo et al. |
| 2018/0150339 A1 | 5/2018 | Pan et al. |
| 2018/0150341 A1 | 5/2018 | Pan et al. |
| 2018/0152406 A1 | 5/2018 | Kuo et al. |

OTHER PUBLICATIONS

Lampkin, What is MQTT and how does it work with WebSphere MQ, www.ibm.com, Mar. 16, 2012 (6 pages).*

Wikipedia, IBM MQ, en.wikipedia.org, Jun. 3, 2019 (8 pages).*

Kim, M., et al., Developing an On-Demand Cloud-Based Sensing-as-a-Service System for Internet of Things, Journal of Computer Networks and Communications, vol. 2016, pp. 1-17, available at https://www.hindawi.com/journals/jcnc/2016/3292783, accessed Mar. 14, 2018.

International Search Report and Written Opinion in PCT/US2017/063138 dated Mar. 6, 2018.

International Search Report and Written Opinion in PCT/US2017/063302 dated Mar. 9, 2018.

International Search Report and Written Opinion in PCT/US2017/063314 dated Feb. 9, 2018.

Dang Van Mien, Five Security Strategies for IBM Websphere MQ Series, www.bus.umich.edu, published Sep. 12, 2003 (6 pages).

International Preliminary Report on Patentability in PCT/US2017/063138 dated May 28, 2019.

International Preliminary Report on Patentability in PCT/US2017/063302 dated May 28, 2019.

International Preliminary Report on Patentability in PCT/US2017/063314 dated May 28, 2019.

* cited by examiner

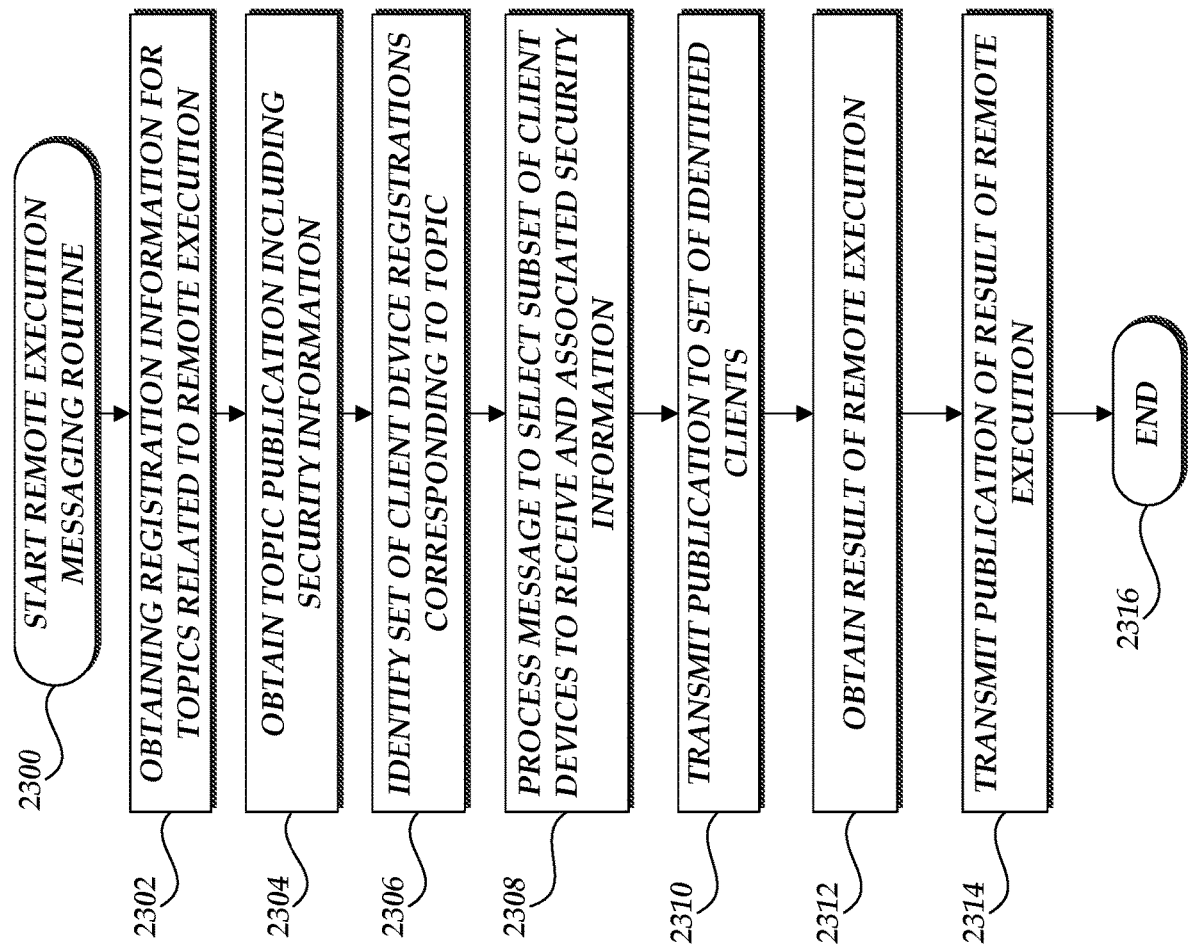

EMBEDDED CODES IN MESSAGING PROTOCOL COMMUNICATIONS

CROSS-REFERENCE TO RELATED APPLICATIONS

This application is related to U.S. patent application Ser. No. 15/362,709, entitled LOCALIZED DEVICE COORDINATOR WITH ON-DEMAND CODE EXECUTION CAPABILITIES, and filed on Nov. 28, 2016; U.S. patent application Ser. No. 15/362,691, entitled LOCALIZED DEVICE COORDINATOR, and filed on Nov. 28, 2016; U.S. patent application Ser. No. 15/362,696, entitled ON-DEMAND CODE EXECUTION IN A LOCALIZED DEVICE COORDINATOR, and filed on Nov. 28, 2016; U.S. patent application Ser. No. 15/362,708, entitled INTRA-CODE COMMUNICATION IN A LOCALIZED DEVICE COORDINATOR, and filed on Nov. 28, 2016; U.S. patent application Ser. No. 15/362,707, entitled REMOVE INVOCATION OF CODE EXECUTION IN A LOCALIZED DEVICE COORDINATOR, and filed on Nov. 28, 2016 (hereinafter, collectively, the "Related Applications"). The entirety of each of the Related Applications is hereby incorporated by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality. In some instances, the local user interfaces of these embedded devices or thin devices are limited, and thus remote management may be required to implement some functions of these devices. However, remote management can in some instances be problematic, due to latency in communications with a remote management device and potential for private information to be inadvertently disclosed either at the remote management device or during communications with the remote management device. These issues may be more prevalent when the embedded devices or thin devices and the remote management device exist on separate communication networks or communicate over public communications networks.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 23 is a flow diagram illustrative of a remote execution messaging routine implemented by a message processing service component in accordance with an illustrative embodiment.

DETAILED DESCRIPTION

Figure 1:
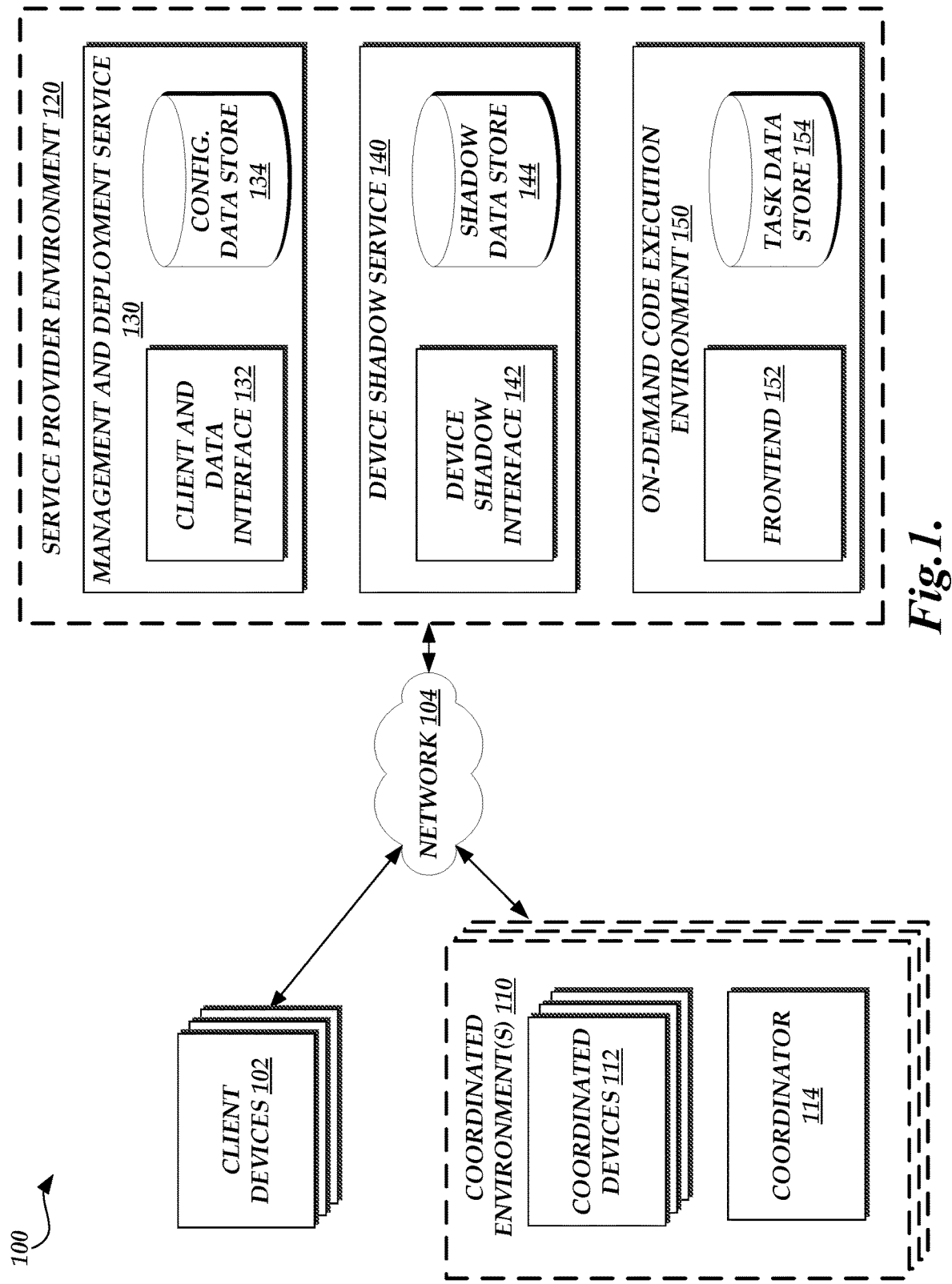
FIG. 1 is a block diagram depicting an illustrative environment in which a coordinator can operate to locally manage and coordinate operation of coordinated devices within a coordinated environment, and wherein the coordinator may communicate with client devices and a service provider environment to modify operation of the coordinator.

Generally described, the present application corresponds to the management of data transmitted between computing devices in a communication network. More specifically, aspects of the present application correspond to the utilization of messaging protocols to facilitate the management of client computing devices. Illustratively, one or more client devices utilize the messaging protocol, such as the MQTT messaging protocol, to exchange content. In accordance with aspects of the present application, an administrative component can configure one or more devices in different portions of the communication path of messages to be exchanged by devices to interpret codes embedded in the communication messages. More specifically, illustratively, a receiving device can review incoming messages for one or more processing codes or instructions that are embedded in the portion of the communication typically utilized solely to identify the subject matter of the communication, generally referred to as the topic portion of the communication. The receiving devices can then process the embedded codes to determine how the communication message will be routed or how the payload of the communication will be processed by the receiving device. By leveraging the existing messaging protocol, aspects of the present application mitigate the need for the client devices and admin device to engage in separate device to device communications.

With reference to an illustrative example, one or more client computing devices are in communication with a service provider that provides one or more message processing services. The message processing services facilitate the exchange of communications with other computing devices by leveraging a standard messaging protocol. In one embodiment, the message processing service can utilize the MQTT messaging protocol. Illustratively, the messaging protocol can include the ability for devices to register with the message processing service to receive content related to messages published by another computing device with regard to specified topics. Generally described, as the message processing service receives content related to a topic, the message processing service would typically forward or publish the content to all the registered devices.

In accordance more typical implementations of messaging protocols, the message processing service would simply match registered topics with the topics identified in incoming messages without additional processing of the topic or any additional information included in the message, generally referred to as the payload portion of the content. As will be explained in detail below, in accordance with aspects of the present application, the message processing services can be configured with executable code or instructions that cause the message processing services to modify one or more aspects of received communications. The message processing services can be prompted to implement such executable code or instructions based on information included in the received communication.

With continued reference to the previous example, to facilitate the delivery of content, the communications received by the message processing services can include information identifying the sender, information describing the subject matter of the communication, generally referred to as a topic portion, and the content of the communication, generally referred to as the payload portion. In accordance with the present application, the topic portion of the communication is made up of one or more labels or levels of text that define the subject matter of communication. Additionally, the topic portion of the communication can include at least one label or level that corresponds to an embedded code or embedded information utilized by the message processing services in processing the received communication. The embedded codes or information can cause the message processing services to modify which computing devices receive the communication even if they are registered for the topic, modify how the communication is transmitted or potentially cause the message processing services to modify a portion of the payload portion.

In accordance with additional aspects of the present disclosure, the processing of the messaging protocol communications with embedded codes can be facilitated in the context of a coordinator present within a coordinated environment to control operation and functionality of coordinated devices within the coordinated environment. In some instances, coordinated devices may correspond to embedded devices or thin devices that have at least one alternative primary function, such as household appliances having a separate primary purpose. Such devices may in some instances be referred to as "Internet-of-Things" devices, or "IoT" devices. Coordinated devices may include limited local user interface capabilities, and may thus benefit from remote management. The coordinator disclosed herein enables such remote management of coordinated devices locally, within an environment including the coordinator and the coordinated devices (such as a local area network, or "LAN," environment). Use of a coordinator can thus enable management of coordinated devices without requiring communications external to the local environment, thereby allowing a reduction in privacy risks and an increase in communication speed over the use of external or public communication networks.

Further, a coordinator as disclosed herein may function as a localized on-demand code execution system, enabling rapid execution of portable segments of code to implement functions on the coordinator. These portable segments of code may be referred to herein as "tasks." In some instances, tasks may be utilized to coordinate functionality of a coordinated device, such as by changing the state of the device. For example, where a coordinated device is a network-enabled light, a task may function to change the state of the light (e.g., to "on" or "off") according to an input to the coordinator, such as the current time, a user input, or the state of another coordinated device. The coordinator may further enable communication coordinated devices and tasks according to a number of different protocols, and in some instances provide translation functions between such protocols. Still further, the coordinator may in some instances manage an execution location of a task, such that the task may be executed on the coordinator, on a coordinated device, or on a device of a remote environment (e.g., a remote network computing environment), according to capabilities of candidate devices and requirements for execution of the task. These tasks may in some instances be user-defined, enabling users to implement a variety of functionalities on the coordinator or coordinated devices, according to user-submitted code corresponding to the task. Thus, a coordinator may provide rapidly reconfigurable localized management of coordinated devices.

In some instances, the coordinator may manage a state of coordinated device via a "device shadow." In general, device shadows may correspond to a data representation of a desired state of a coordinated device, as stored at a location remote from the coordinated device (e.g., a coordinator or a remote device shadow service). A coordinated device may be configured to synchronize with the state represented by a device shadow, and as such, a change to the device shadow may be expected to cause a corresponding change in the state of a coordinated device. In some instances, synchronization of a coordinated device and a corresponding shadow may occur via a "publish/subscribe" model communication protocol, such as the MQTT protocol, which protocol is known in the art. Accordingly, a coordinated device may "subscribe" to a device shadow for that coordinated device. The coordinator may then obtain desired changes to the state of a device shadow via requests to "publish" to the device shadow. The coordinator may notify the coordinated device via the communication protocol of the change in state of the device shadow, and the coordinated device may respond by synchronizing a local state to the state of the device shadow. Use of device shadows may be advantageous, for example, in decoupling requests to read or modify the state of a coordinated device from communications with the coordinated device. Illustratively, requests to read or modify the state of a coordinated device may be considered successful immediately, on reading or modifying the device shadow. Any changes necessary to the coordinated device may then occur asynchronously to the request, according to the communication protocol between the coordinated device and the shadow device. Because requests to interact with the device may be decoupled from actual communications with the device, these requests and device communications may also utilize different communication protocols. For example, requests to read or modify a device state via a device shadow may be transmitted according to a high-overhead, high-reliability protocol, such as the Transmission Control Protocol (TCP), while communications between the device shadow and the coordinated device may occur via a low-overhead protocol such as MQTT.

In accordance with embodiments of the present disclosure, a coordinator may be associated with a user, who may alter the configuration of the coordinator via an environment of a service provider. Illustratively, the service provider environment may be operated by a provider of the coordinator, and enable a user to specify various configuration parameters of the coordinator, such as the location of a coordinated environment for the coordinator, the coordinated devices within the environment, the tasks executable by a coordinator, how the coordinator should manage communications between devices, between tasks, or between devices and tasks, security information for the coordinator, or other parameters of the coordinator (such as metrics to be monitored at a coordinator or logging to be conducted at the coordinator). Because the coordinator itself may in some instances be associated with limited localized user interfaces, the service provider environment by enable a user, via a client device, to submit a configuration for the coordinator, and to cause the coordinator to be automatically provisioned with the configuration. The service provider environment may further enable a single client device to manage multiple coordinators via a unified interface, and to quickly alter the configuration of a coordinator by deploying a new configuration, or by rolling-back or undoing prior deployments of configurations to the coordinator.

In some instances, the service provider environment may provide functionalities similar or identical to the functionalities of the coordinator. For example, a coordinator may function at least in part based on execution of portable segments of code, or "tasks." Similarly, a server provider environment may include an on-demand code execution environment that functions to execute the same or similar tasks. Further details regarding such an on-demand code execution environment can be found within U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 patent"), the entirety of which is hereby incorporated by reference. In brief, to execute tasks, an on-demand code execution environment may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels.

Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager, as described in more detail in the '556 patent, that is configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in the '556 patent.

As discussed above, the coordinator may in some instances be configured to select whether to execute tasks locally (e.g., on the coordinator) or by use of an on-demand code execution environment within a service provider network. For example, the coordinator may function as the message processing services component and process embedded codes within received communications related to tasks to determine how to forward to different coordinated devices registered to receive such communications. As a further example, both a coordinator and a service provider environment may provide a device shadow corresponding to a coordinated device, and users may submit requests to change either or both a device shadow hosted by a coordinator or a device shadow hosted within a service provider environment. In such instances, the coordinator may function to synchronize the various device shadows corresponding to a given coordinated device, as well as the coordinated device itself.

In accordance with still further aspects of the present application, the recipient devices receiving communications can also function as message processing services. As described above, the topic portion of the communication sent from another device can include at least one label or level that corresponds to an embedded code or embedded information utilized by the message processing services in processing the received communication. The embedded can cause the message processing services to modify how the communication is transmitted or potentially cause the message processing services to modify a portion of the payload portion.

Although aspects of some embodiments described in the disclosure will focus, for the purpose of illustration, on the MQTT messaging protocol and other configuration of the devices, one skilled in the relevant art will appreciate that the examples are illustrative only and are not necessarily intended to be limiting. As will be appreciated by one of skill in the art in light of the present disclosure, the embodiments disclosed herein improves the ability of computing systems, and particularly computing systems with limited localized user interfaces, to be coordinated and managed by an external device.

The foregoing aspects and many of the attendant advantages of this disclosure will become more readily appreciated as the same become better understood by reference to the following description, when taken in conjunction with the accompanying drawings. Various embodiments and aspects of the present application will be described with regard to FIGS. 1-24. Nothing in the present application should be interpreted in a manner that requires any specific combination of embodiments or examples. Additionally, one skilled in the relevant art will appreciate that one or more aspects or embodiments of the present application may be readily combined and can result in additional inventive aspects of the present application.

FIG. 1 is a block diagram of an illustrative operating environment 100, including one or more coordinated environments 110 in which a coordinator 114 may operate to control coordinated devices 112, as well client devices 102 that may interact with the coordinated environments 110 (e.g., to request a change in state of a coordinated device 112), and a service provider environment 120 that may assist in communications with or configuration of the coordinators 114 in various coordinated environments 110.

The coordinated environments 110, client devices, and service provider environment 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein. Although all of the components of the network 104 are illustrated in FIG. 1, one or more of the components, such as routers may function as a message processing service.

Each coordinated environment 110 may include a coordinator 114 and any number of coordinated devices 112, in communication via a network of the execution environment 110 (which network is not shown in FIG. 1). Because of their association within the coordinated environment 110, the coordinated devices 112 and coordinator 114 within a given environment 110 may be considered "local" to one another, in terms of communications network. For example, the coordinated devices 112 and coordinator 114 within a given environment 110 may be connected via a LAN or other localized communication network.

Each coordinated device 112 can correspond to a computing device configured to communicate with the coordinator 114 to manage functionality of the coordinated device 112. In some instances, coordinated devices 112 can correspond to fully featured computing devices, such as laptops, desktops, standalone media players, etc., with robust localized user interface capabilities. In other instances, coordinated devices 112 can correspond to thin devices or embedded devices associated with another primary function, such as an device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 112 may include limited local user interfaces, and be configured for remote management. In some instances, coordinated devices 112 may be stateful, and operate to alter their state in response to instructions (e.g., by turning from "off" to "on," etc.).

As described in more detail below (e.g., with respect to FIG. 2), the coordinator 114 can correspond to a computing device executing instructions to coordinate, manage, or control operation of the coordinated devices 112, without requiring that instructions transmitted to the coordinated devices 112 travel outside the coordinated environments 110 (thus increase the security of such instructions and increasing the speed of their transmission). Specifically, the coordinator 114 can include a processor and memory collectively configured to manage communications between any combination of coordinated devices 112, client devices 102, and devices of the service provider network 120. The coordinator can further be configured to enable executions of tasks, in a manner similar to an on-demand code execution environment 120 of the service provider environment 120. These tasks may implement a variety of user-defined or non-user-defined functionalities, including communicating with coordinated devices 112, client devices 102, and devices of the service provider network 120. As such, the coordinator 114 can be configured to allow for manual, automatic, or semi-automatic control of coordinated devices 112. For example, the coordinator 114 may enable a client device 102 to transmit a request to change the state of a coordinated device 112, and cause such a change in state to occur. As a further example, the coordinator 114 may enable a user to specify a criterion under which a state of a coordinated device 112 should be changed, and then automatically operate to change the state of the coordinated device 112 when the criterion is satisfied. As will be discussed below, many functions of the coordinator 114 may be established via tasks, enabling rapid alteration of these functions as desired by a user.

Client devices 102 may include a variety of computing devices enabling a user to communicate with the coordinated environments 110, the service provider environment 120, or both. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The service provider environment 120 may provide the client devices 102 with one or more user interfaces, command-line interfaces (CLI), application programming interfaces (API), and/or other programmatic interfaces for interacting with the service provider environment 120, such as to submit a configuration for a coordinator 114, and control deployment of that configuration, to submit code corresponding to a task to be executed on the coordinator 114 or an on-demand code execution environment 150 of the service provider environment 120, to view logging or monitoring information related to coordinators 114, etc. Similarly, the coordinator 114 may provide the client devices 102 with one or more user interfaces, command-line interfaces (CLI), application programming interfaces (API), and/or other programmatic interfaces for interacting with the coordinator 114, such as to read a state of a coordinated device 112, request a change in state of a coordinated device 112, request that the coordinator 114 cause execution of a task, etc. Although one or more embodiments may be described herein as using a user interface, it should be appreciated that such embodiments may, additionally or alternatively, use any CLIs, APIs, or other programmatic interfaces.

The service provider environment 120 can include a number of elements to enable configuration of, management of, and communications with coordinators 114. Specifically, the service provider environment 120 includes a management and deployment service 130 to enable registration of coordinators 114 with the service provider environment 120 and configuration of such coordinators 114, a device shadow service 140 to enable robust changes to state of coordinators 114 and coordinated devices 112, and an on-demand code execution environment 150 providing on-demand, dynamic execution of tasks, as well as deployment and provisioning of tasks on coordinators 114.

As shown in FIG. 1, the management and deployment service 130 includes a client and data interface 132 and a configuration data store 134 that may operate collectively to enable registration of a coordinator 114 with the management and deployment service 130, generation of configurations for the coordinator 114, and transmission of configuration data to the coordinator 114. Illustratively, the client and data interface 132 may provide one or more user interfaces (e.g., APIs, CLIs, GUIs, etc.) through which a user, via a client device 102, may generate or submit a configuration of a coordinator 114 for storage in the configuration data store 134. The client and data interface 132 may further provide one or more interfaces through which a coordinator 114 may obtain the configuration, such that the coordinator 114 is reconfigured according to the obtained configuration. The configuration data store 134 can correspond to any persistent or substantially persistent data store, such as a hard drive (HDD), a solid state drive (SDD), network attached storage (NAS), a tape drive, or any combination thereof.

The device shadow service 140 can include elements enabling a "shadow state" of a device, such as a coordinator 114 or a coordinated device 112, to be created, maintained, read, altered, or deleted. As discussed above, a shadow state may correspond to data representing a desired state of a correspond device, which may or may not mirror a current state of the device. For example, with respect to a coordinator 114, a shadow state may include a desired configuration version for the coordinator 114. With respect to a coordinated device 112, a shadow state may include a desired state of the coordinated device 112 (e.g., on or off for a switch or bulb, locked or unlocked for a lock, a desired temperature for a thermostat, etc.). The device shadow service 140 may enable users, via client devices 102, or other entities to read from or modify a shadow state for a device, and may further interact with that device to synchronize the device to the shadow state. Illustratively, the device shadow service 140 may include an interface 142 (which may include, e.g., APIs, CLIs, GUIs, etc.) through which requests to read from, write to, create or delete a shadow state may be received, as well as a shadow data store 144 configured to store the shadow states. The shadow data store 134 can correspond to any persistent or substantially persistent data store, such as a hard drive (HDD), a solid state drive (SDD), network attached storage (NAS), a tape drive, or any combination thereof. Further details regarding the use of device shadows generally can be found within U.S. patent application Ser. No. 15/196,700, entitled "Device Representation Management Using Representation Types," and filed Jun. 29, 2016 (the "'700 application"), the entirety of which is incorporated by reference herein.

The on-demand code execution environment 150 can include a number of devices providing on-demand execution of tasks (e.g., portable code segments). Specifically, the on-demand code execution environment 150 can include a frontend 152, through which users, via client device 102, may submit tasks to the on-demand code execution environment 150 and call for execution of tasks on the on-demand code execution environment 150. Such tasks may be stored, for example, in a task data store 154, which can correspond to any persistent or substantially persistent data store, such as a hard drive (HDD), a solid state drive (SDD), network attached storage (NAS), a tape drive, or any combination thereof. While not shown in FIG. 1, the on-demand code execution system 150 can include a variety of additional components to enable execution of tasks, such as a number of execution environments (e.g., containers or virtual machines executing on physical host devices of the on-demand code execution environment 150), a worker manager to manage such execution environments, and a warming pool manager to assist in making execution environments available to the worker manager on a rapid basis (e.g., under 10 ms). Further details regarding the on-demand code execution environment can be found within the '556 patent, incorporated by reference above.

As noted above, tasks may be utilized both at the on-demand code execution environment 150 and at coordinators 114. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 150 or a coordinator 114 in a variety of manners. In one embodiment, a client device 102 or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, an network-accessible storage service, or the task data store 154) prior to the request being received by the coordinator 114 or the on-demand code execution system 150. A request interface of the coordinator 114 or the on-demand code execution system 150 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to a coordinator 114 or the on-demand code execution system 150 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the coordinator 114 or the on-demand code execution system 150 (e.g., standard routines), and/or provided by third parties. In some embodiments, such resource-level constraints (e.g., how much memory is to be allocated for executing a particular user code) are specified for the particular task, and may not vary over each execution of the task. In such cases, the coordinator 140 or the on-demand code execution system 150 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 114 or the on-demand code execution system 150 may inspect the call and look for the flag or the header, and if it is present, the coordinator 114 or the on-demand code execution system 150 may modify the behavior (e.g., logging facilities) of the execution environment in which the task is executed, and cause the output data to be provided back to the user. In some embodiments, the behavior/mode indicators are added to the call by the user interface provided to the user by the coordinator 114 or the on-demand code execution system 150. Other features such as source code profiling, remote debugging, etc. may also be enabled or disabled based on the indication provided in a call.

The service provider environment 120 is depicted in FIG. 1 as operating in a distributed computing environment including several computer systems that are interconnected using one or more computer networks (not shown in FIG. 1). The service provider environment 120 could also operate within a computing environment having a fewer or greater number of devices than are illustrated in FIG. 1. Thus, the depiction of the service provider environment 120 in FIG. 1 should be taken as illustrative and not limiting to the present disclosure. For example, the service provider environment 120 or various constituents thereof could implement various Web services components, hosted or "cloud" computing environments, and/or peer to peer network configurations to implement at least a portion of the processes described herein.

Further, the service provider environment 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
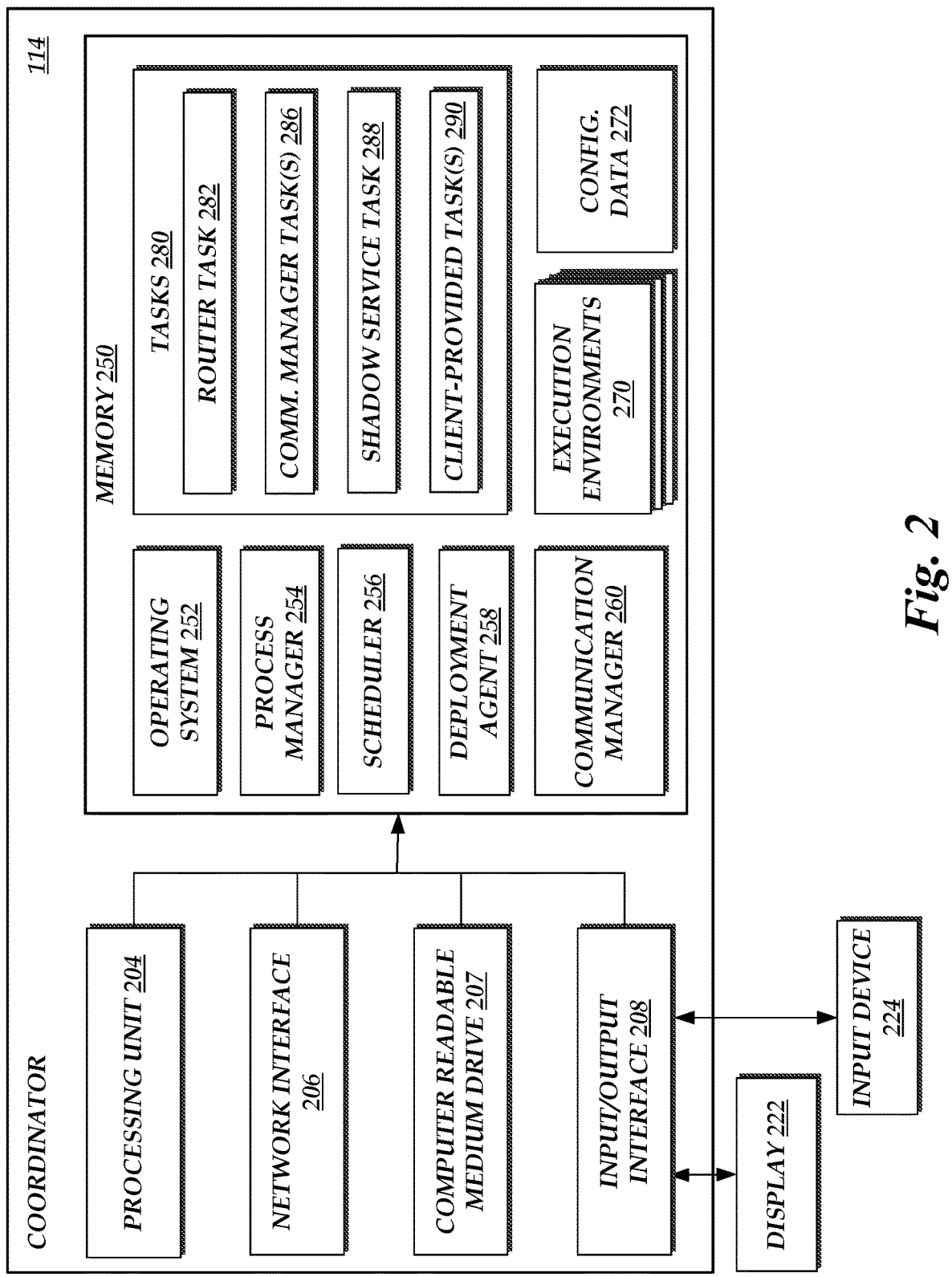
FIG. 2 depicts a general architecture of a computing device providing a coordinator of FIG. 1.

FIG. 2 depicts a general architecture of a computing system (referenced as coordinator 114) that manages coordinated devices 112 within a given coordinated environment 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The coordinator 114 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the coordinator 114 includes a processing unit 204, a network interface 206, a computer readable medium drive 207, and an input/output device interface 208, all of which may communicate with one another by way of a communication bus. The network interface 206 may provide connectivity to one or more networks or computing systems. The processing unit 204 may thus receive information and instructions from other computing systems or services via the network 104. The processing unit 204 may also communicate to and from memory 250 and further provide output information for an optional display (not shown) via the input/output device interface 208. The input/output device interface 208 may also accept input from an optional input device (not shown).

The memory 250 may contain computer program instructions (grouped as modules in some embodiments) that the processing unit 204 executes in order to implement one or more aspects of the present disclosure. The memory 250 generally includes random access memory (RAM), read only memory (ROM) and/or other persistent, auxiliary or non-transitory computer readable media. The memory 250 may store an operating system 252 that provides computer program instructions for use by the processing unit 204 in the general administration and operation of the coordinator 114. The memory 250 may further include computer program instructions and other information for implementing aspects of the present disclosure. For example, in one embodiment, the memory 250 includes a process manager 254, a scheduler 256, a deployment agent 258, and a communication manager 260.

The scheduler 256 and deployment agent 258 may be executed by the processing unit 204 to select tasks for execution by the processing unit 204, and to manage such task executions. Specifically, the scheduler 256 may include instructions to select a tasks for execution at given points in time and to suspend execution of tasks (e.g., under instances of constrained resources at the coordinator 114). The deployment agent 258 may include instructions to select an appropriate execution environment 270 in which to execute a task, to provision that execution environment 270 with appropriate access to resources needed during the task execution, and to cause execution of the task within the execution environment 270. An execution environment 270, as used herein, refers to a logical portion of memory 250 in which to execute a task. In one embodiment, execution environments 270 are programmatically separated, such that execution of code in a first execution environment 270 is prohibited from modifying memory associated with another execution environment 270. Illustratively, an execution environment 270 may correspond to a "container," operating-system-level virtualization environment, or "sand box" environment, such as a "chroot jail" or a Python virtual environment "virtualenv." In other instances, an execution environment 270 may correspond to a virtual machine environment (e.g., a JAVA virtual machine, a virtualized hardware device with distinct operating system, etc.). In still other instances, an execution environment 270 may be a memory space allocated to an execution of a task, without necessarily utilizing virtualization.

Communications between tasks executing on the coordinator, as well as between the coordinator 114 and other devices (e.g., client devices 102 and coordinated devices 112) may be facilitated by the communication manager 260. Specifically, the communication manager 260 may be configured to obtain messages directed to the coordinator 114 and forward the message to the appropriate destination. For example, the communication manager 260 may route messages between any combination of tasks, coordinated devices 112, client devices 102, and devices of the service provider execution environment 120.

Tasks executed by the coordinator 114 are shown as logically grouped within the tasks memory space 280, which may correspond to a logical unit of memory 250 configured to store the code corresponding to each task. As shown in FIG. 2, the tasks memory space 280 can include a number of tasks executable by the processing unit 204 to implement functionalities of the coordinator 114, including a router task 282, one or more communication manager tasks 286, a shadow service task 288, and one or more client-provided tasks 290.

The router task 282 may correspond to a portion of code executable to assist in the routing of messages within, to, and from the coordinator. In one embodiment, the router task 282 implements a "routing table" to determine appropriate destinations for a message. For example, the communication manager 260 may forward messages obtained at the coordinator 114 (e.g., due to generation by a task execution or reception at the input/output interface 208) to the router task 282, which may utilize the routing table to determine that messages addressed to a certain identifier should be routed to a given task, a given client device 102, or a given coordinated device 102. The routing table may further indicate that a message addressed to an identifier should be transmitted to the service provider environment 120 (e.g., to the device shadow service 140 or the on-demand code execution system 150). In one embodiment, the routing table may utilize "topics" as identifiers, such that messages associated with a particular topic are routed according to a routing specified for that topic. The routing table may further include information for how to route messages based on a source of those messages. For example, a message addressed to a given topic may be routed differently, based on whether the message is received from a first task, a second task, a first coordinated device 112, etc. By utilization of a routing table, router task 282 can enable messages to be redirected, without a change in the operation of a sender of such a message (e.g., without rewriting code for a task that generated the message, without modifying the software of a coordinated device 112 that generated the message, etc.).

The communication manager tasks 286 may enable communications between the coordinator 114 and a number of different external devices (e.g., coordinated devices 102) according to a protocol of such communications. For example, a first communication manager task 286 may be configured to manage communications using a BLUETOOTH™ protocol, a second communication manager may be configured to manage communications using an HTTP protocol, etc. In some instances, multiple communication manager tasks 286 may work collectively to implement communications. For example, a first communication manager task 286 may enable communications via the TCP protocol, while a second communication manager task 286 may enable communications via the MQTT protocol (which utilizes the TCP protocol and thus may utilize the a first communication manager task 286). Because different communication manager tasks 286 can vary the ability of the coordinator 114 to communicate via different protocols, and because the tasks of the coordinator 114 may be altered via reconfiguration of the coordinator 114, the coordinator 114 can be rapidly reconfigured to utilize a variety of different communication protocols.

The shadow service task 288 can facilitate management and interaction with device shadows maintained at the coordinator 114. Illustratively, the shadow service task 288 can implement functionality similar to that provided by the device shadow service 140 locally to the coordinator 114. Accordingly, the shadow service task 288 can maintain a shadow state (data representing a desired state) of a coordinated device 112, and allow for reading to or writing to such data. The shadow service task 288 can further enable synchronization of a coordinated device 112 with the device shadow for that device. Accordingly, by modifying a device shadow for a coordinated device 112, the state of the coordinated device 112 can be altered. By reading the device shadow for the coordinated device 112, the state of the coordinated device 112 can be determined. In some instances, the shadow service task 288 may further coordinate with another device shadow for a given device, such as a device shadow maintained by the device shadow service 140. For example, the shadow service task 288 may synchronize a local device shadow with a device shadow stored at the device shadow service 140, resolve conflicts between the local device shadow and the device shadow stored at the device shadow service 140, etc.

In addition to the tasks described above (each of which may illustratively be provided by an entity associated with the service provider environment 120), the tasks memory space 280 may include any number of client-provided tasks 290, which may correspond to executable code generated by a client device 102 and submitted to the service provider environment 120 for deployment to a coordinator 114. As such, functionalities provided by the client-provided tasks 290 may vary according to the desires of a submitting user. In some instances, the client-provided tasks 290 may be written in a coding language for which the memory 250 includes a language runtime. For example, where the coordinator 114 supports language such as node.js, Go, JAVA, and Python, the client-provided tasks 290 may include executable code written in any of those languages.

In addition, the memory 250 includes a configuration data portion 272, representing a logical portion of the memory 250 in which configuration data of the coordinator 114 is stored. The configuration data may include, for example, a current deployment version of the coordinator 114, data stored by the tasks of the task memory space 280, or other data used in the operation of the coordinator 114.

To enable configuration (and reconfiguration) of the coordinator 114, the memory 250 further includes a deployment agent 258. The deployment agent 258 can correspond to code executable to register a coordinator with the service provider environment 120, to determine a desired configuration of the coordinator 114, and in instances where a current configuration of the coordinator 114 does not match a desired configuration, to obtain configuration data for the coordinator 114 and modify the memory 250 to implement the desired configuration.

Figure 3A:
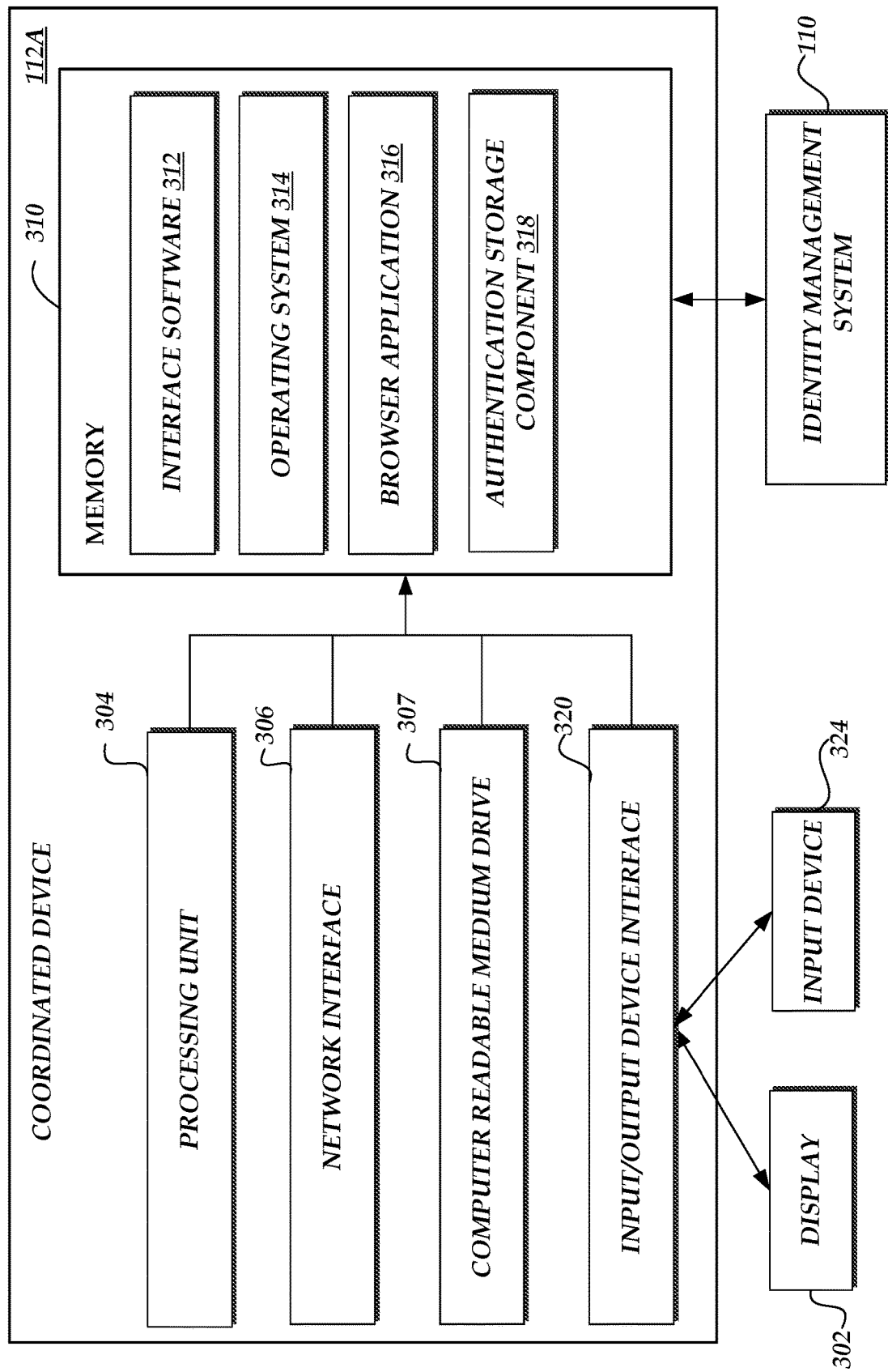
FIGS. 3A and 3B depict general architectures of coordinated devices managed by the coordinator of FIG. 1.

FIG. 3A depicts one embodiment of an architecture of an illustrative coordinated device 112A in accordance with the present application. The general architecture of the coordinated device 112A depicted in FIG. 3A includes an arrangement of computer hardware and software components that may be used to implement aspects of the present disclosure. As illustrated, the coordinated device 112A includes a processing unit 304, a network interface 306, a computer readable medium drive 307, an input/output device interface 320, an optional display 302, and an input device 324, all of which may communicate with one another by way of a communication bus. Illustratively, the coordinated device 112A may have more limited functionality and components, such as inputs or outputs, as embedded devices.

The network interface 306 may provide connectivity to one or more networks or computing systems, such as the network 104 of FIG. 1. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc. In some embodiments, the coordinated device 112A may include more (or fewer) components than those shown in FIG. 3A. For example, some embodiments of the coordinated device 112 may omit the display 302 and input device 324, while providing input/output capabilities through one or more alternative communication channel (e.g., via the network interface 306). Additionally, the coordinated device 112A may omit the input and output interface 320 altogether as well.

The memory 310 may include computer program instructions that the processing unit 204 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the coordinated device 112A. The memory 310 may further include computer program instructions and other information for implementing aspects of the present disclosure. For example, in one embodiment, the memory 310 includes a browser application 316 for accessing content. Illustratively, the browser application 316 may encompass a full software browser application, portions of a browser application or simply be a software application (or executable instructions) that provide for data connectivity.

Figure 3B:
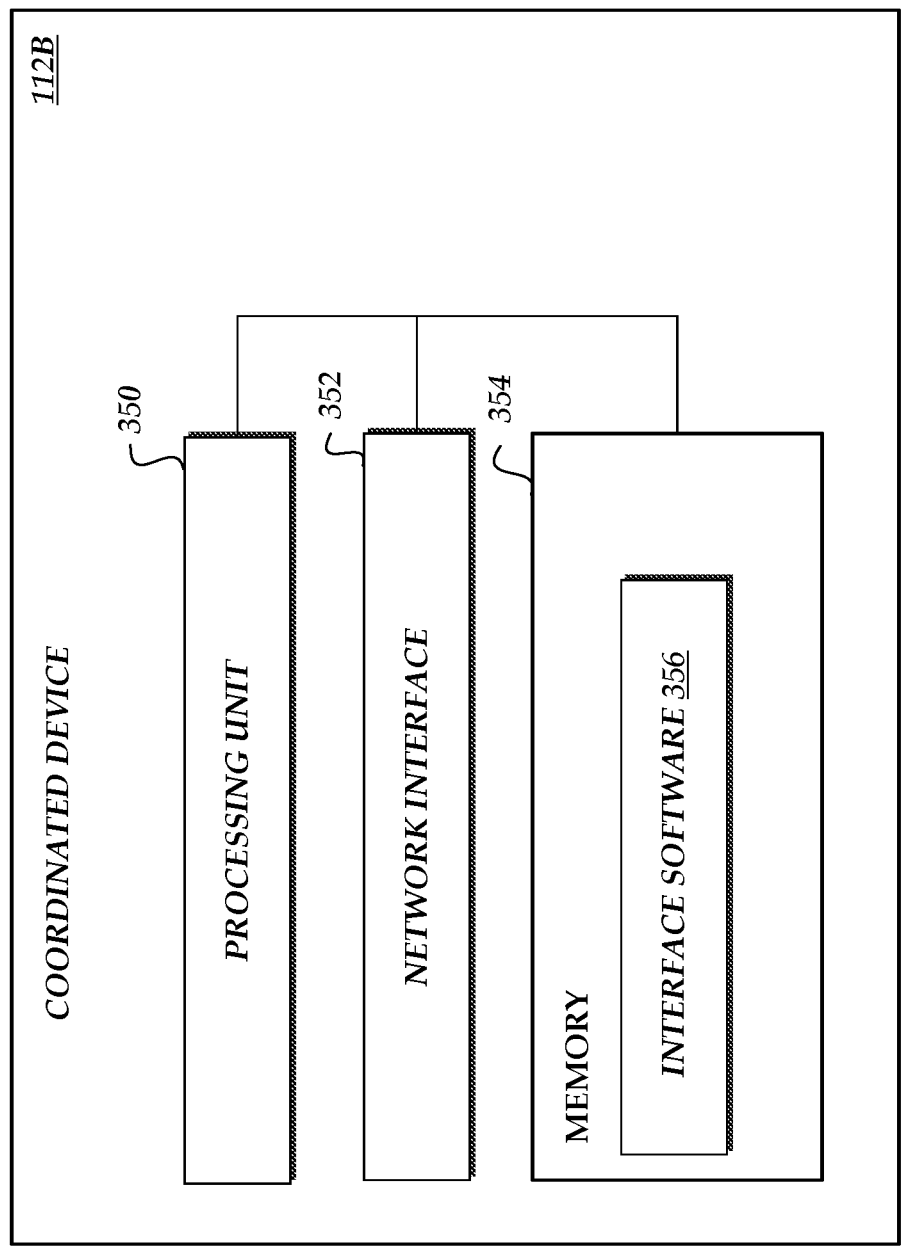

FIG. 3B depicts one embodiment of an alternative architecture of an illustrative coordinated device 112B in accordance with the present application. The general architecture of the coordinated device 112B depicted in FIG. 3B includes an arrangement of computer hardware and software components that may be used to implement aspects of the present disclosure. However, coordinated device 112B may be associated with a reduced of components that may limit the computing functionality and operation of the coordinated device 112B. As illustrated, the coordinated device 112B includes a processing unit 350 and a network interface 352 that communicate with a communication bus. Unlike coordinated device 112BA of FIG. 3A, the coordinated device 112B may not have a computer readable medium drive, an input/output device interface, an optional display, or an input device.

The network interface 352 may provide connectivity to one or more networks or computing systems, such as the network 104 of FIG. 1. The processing unit 350 may thus receive information and instructions from other computing systems or services via a network. The memory 354 may include computer program instructions that the processing unit 350 executes in order to implement one or more embodiments. The memory 354 generally includes RAM, ROM or other persistent or non-transitory memory. In this embodiment, the memory 354 may store necessarily store a full operating system that provides computer program instructions for use by the processing unit 350 in the general administration and operation of the coordinated device 112B. Rather, in one embodiment, the memory 354 includes an interface software component 356 for accessing receiving and processing instructions.

Figure 4:
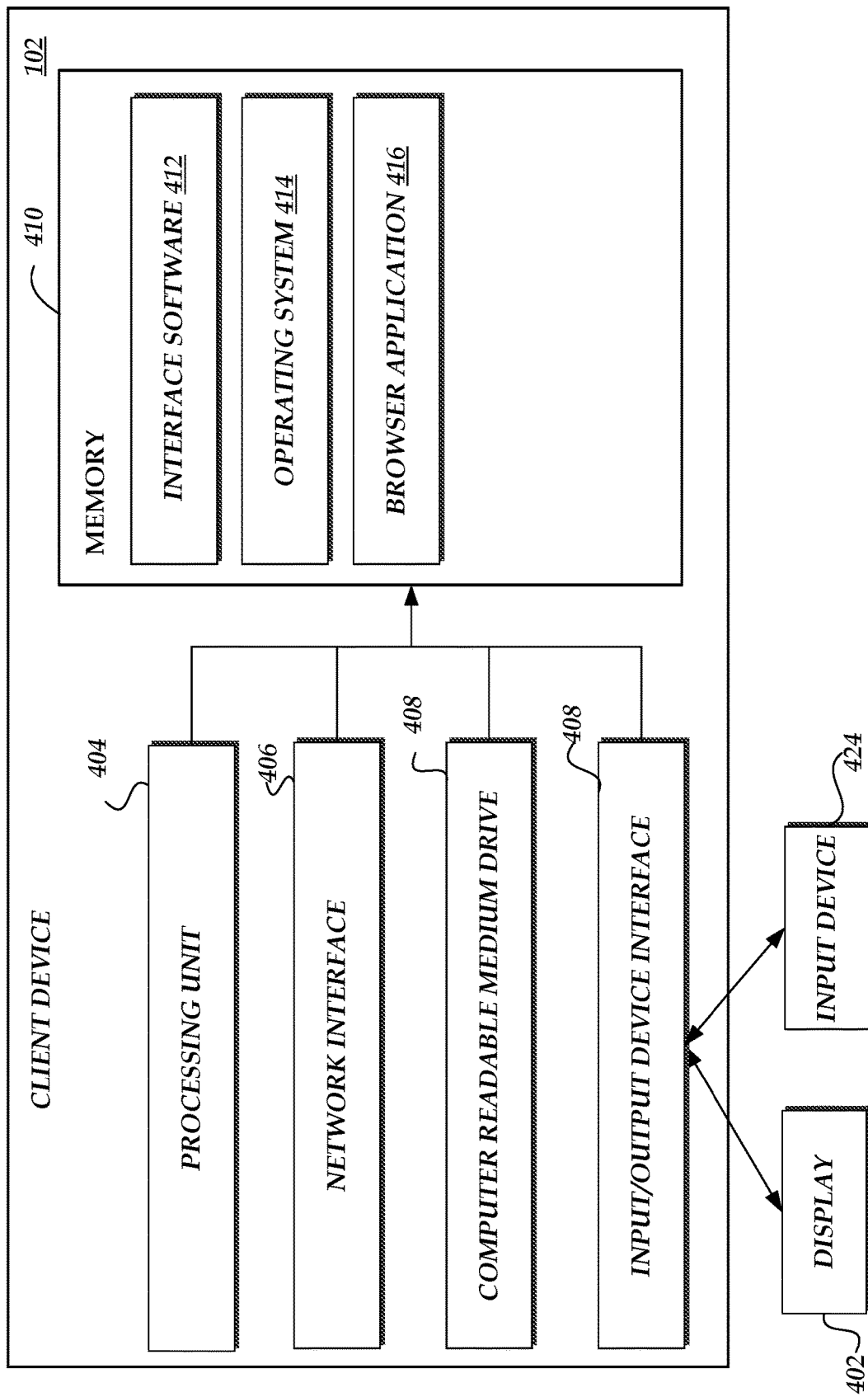
FIG. 4 depicts a general architecture of client device that may be utilized to generate and submit configuration information related to communication protocols.

FIG. 4 depicts one embodiment of an architecture of an illustrative client device 102 in accordance with the present application. The general architecture of the client device 102 depicted in FIG. 4 includes an arrangement of computer hardware and software components that may be used to implement aspects of the present disclosure. As illustrated, the client device 102 includes a processing unit 404, a network interface 406, a computer readable medium drive 407, an input/output device interface 420, an optional display 402, and an input device 424, all of which may communicate with one another by way of a communication bus.

The network interface 406 may provide connectivity to one or more networks or computing systems, such as the network 104 of FIG. 1. The processing unit 404 may thus receive information and instructions from other computing systems or services via a network. The processing unit 404 may also communicate to and from memory 410 and further provide output information for an optional display 402 via the input/output device interface 420. The input/output device interface 420 may also accept input from the optional input device 424, such as a keyboard, mouse, digital pen, etc. In some embodiments, the client device 102 may include more (or fewer) components than those shown in FIG. 4. For example, some embodiments of the coordinated device 112 may omit the display 402 and input device 424, while providing input/output capabilities through one or more alternative communication channel (e.g., via the network interface 406). Additionally, the client device 102 may omit the input and output interface 420 altogether as well.

The memory 410 may include computer program instructions that the processing unit 204 executes in order to implement one or more embodiments. The memory 410 generally includes RAM, ROM or other persistent or non-transitory memory. The memory 410 may store an operating system 414 that provides computer program instructions for use by the processing unit 404 in the general administration and operation of the client device 102. The memory 410 may further include computer program instructions and other information for implementing aspects of the present disclosure. For example, in one embodiment, the memory 410 includes a browser application 416 for accessing content. Illustratively, the browser application 416 may encompass a full software browser application, portions of a browser application or simply be a software application (or executable instructions) that provide for data connectivity.

Figure 5:
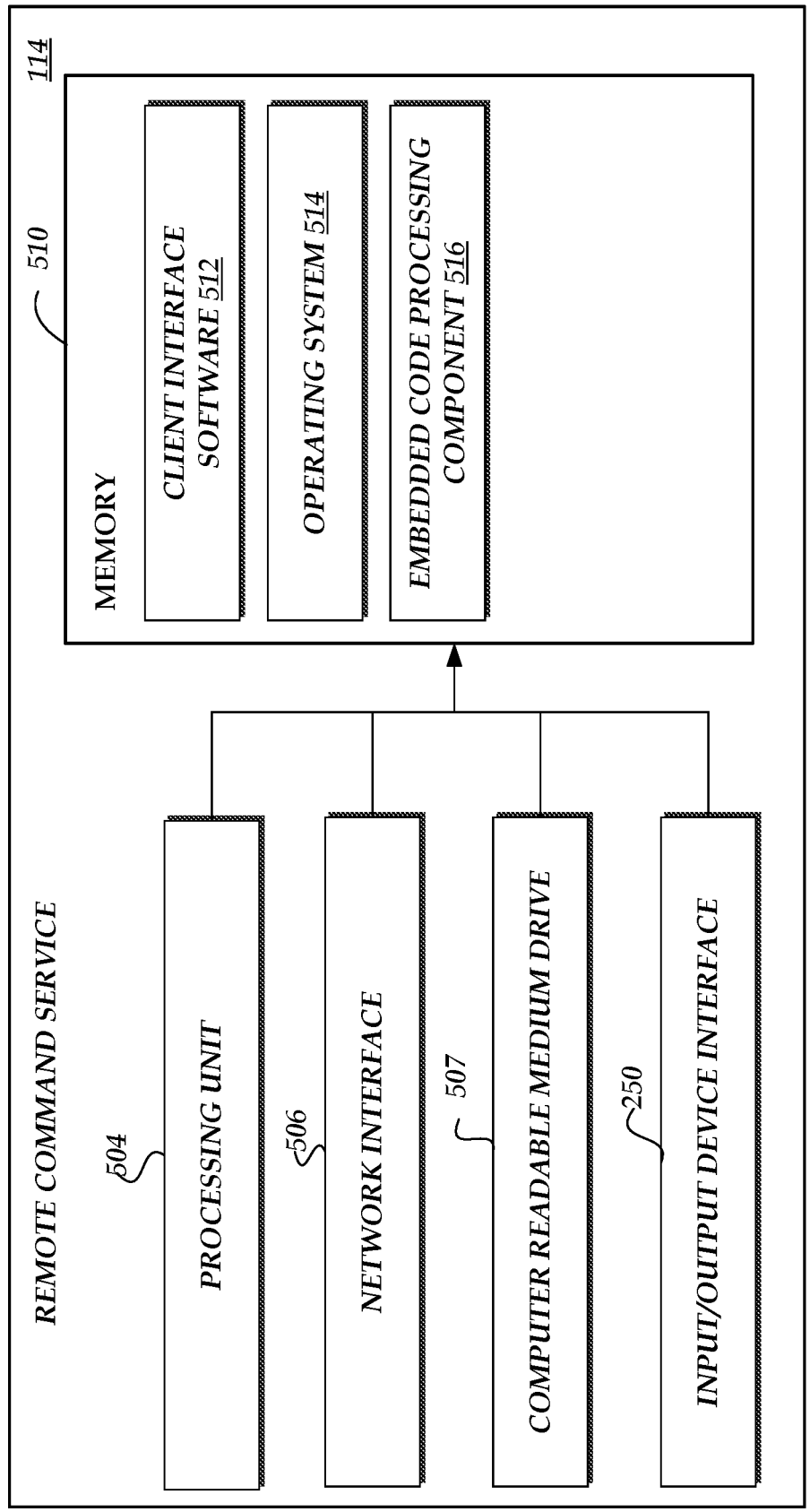
FIG. 5 is depicted a general architecture of a computing device that may be utilized to process communications sent in accordance with a messaging protocol and utilizing embedded codes.

FIG. 5 depicts one embodiment of an architecture of an illustrative computing device for implementing the message processing services component described herein. As previously described, one or more computing devices in the environment can function as a message processing services, such as MQTT broker. In other embodiments, the message processing services may be implemented in networking components. Accordingly, the general architecture of the message processing services depicted in FIG. 5 includes an arrangement of computer hardware and software components that may be used to implement aspects of the present disclosure. As illustrated, the remote command services 114 includes a processing unit 504, a network interface 506, a computer readable medium drive 507, an input/output device interface 520, an optional display 502, and an input device 524, all of which may communicate with one another by way of a communication bus. The components of the remote command services 114 may be physical hardware components or implemented in a virtualized environment.

The network interface 506 may provide connectivity to one or more networks or computing systems, such as the network 150 of FIG. 1. The processing unit 504 may thus receive information and instructions from other computing systems or services via a network. The processing unit 504 may also communicate to and from memory 510 and further provide output information for an optional display 502 via the input/output device interface 520. The input/output device interface 520 may also accept input from the optional input device 524, such as a keyboard, mouse, digital pen, etc. In some embodiments, the remote command services 114 may include more (or fewer) components than those shown in FIG. 5. For example, some embodiments of the remote command services 114 may omit the display 202 and input device 224, while providing input/output capabilities through one or more alternative communication channel (e.g., via the network interface 506).

The memory 510 may include computer program instructions that the processing unit 504 executes in order to implement one or more embodiments. The memory 510 generally includes RAM, ROM or other persistent or non-transitory memory. The memory 510 may store an operating system 514 that provides computer program instructions for use by the processing unit 504 in the general administration and operation of the intermediary server 114. The memory 510 may further include computer program instructions and other information for implementing aspects of the present disclosure. For example, in one embodiment, the memory 510 includes client interface software 512 for receiving and processing content requests from client devices 102. Additionally, the memory 510 includes an embedded code processing component 516 for processing embedded codes received in communications. Illustratively, the embedded code processing component 516 can include instructions for processing the topic portion communications to parse embedded codes and instructions for implementing actions or functions that have been configured for the specific codes.

Turning now to FIGS. 6A-6D, illustrative interactions between the components of the content management system 110 to process content messages will be described. More specifically, FIGS. 6A-6C will be described with regard to interactions between coordinated devices 112, a client device 102 and a message processing service 600. As previously indicated, the message processing service 600 can be implemented by a variety of devices including the coordinator 114 or other network equipment. Additionally, the coordinated devices 112 can correspond to the coordinated devices 112 (FIG. 3A), coordinated devices 112 (FIG. 3B) or combinations thereof. However, reference to interactions should not be limited to any particular device or combination of devices, even if used for illustrative purposes.

Figure 6A:
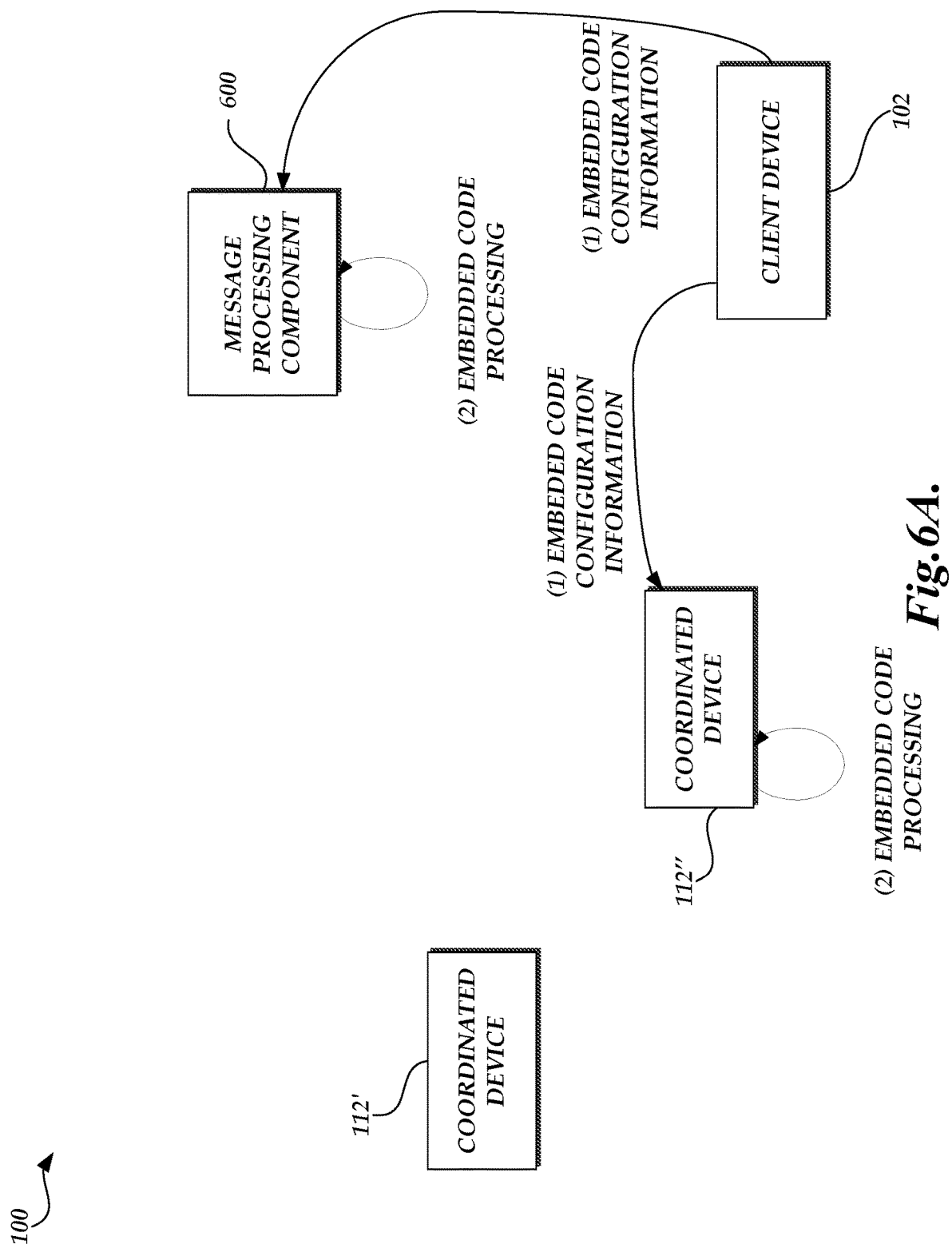
FIGS. 6A-6D are block diagrams of the illustrative environment of FIG. 1 depicting illustrative interactions for exchanging communications in accordance with a messaging protocol utilizing embedded codes.

With reference to FIG. 6A, the initial configuration of a message processing service 600 will be described. Illustratively, a client or system administrator configures the message processing service 600 with information that facilitates the interpretation of embedded codes in the topic portions of received communications. In accordance with an illustrative embodiment, the communications can be formed in accordance with the MQTT messaging protocol, regardless of the actual communication protocol that is utilized to transmit the message across the communication network 104. Specific to the MQTT protocol, each message is associated with a topic portion that has one or more levels defining or otherwise associated with the communication. An example below includes a first level, "base level", followed by a series of additional levels, "level 1"-"level n." Each additional level is delineated by a topic separator.

base level/level 1/level 2/level 3 . . . /level n

As previously described, in the traditional MQTT protocol, a message processing service 600 receiving a message will attempt to match the topic with one or more recipient devices that have registered to receive messages published by topic. The message processing service 600 can limit a determination to an exact matching of all levels or partial matching of one or more levels.

In accordance with the present application, in addition to the traditional identification of multiple levels describing a subject matter of the communication, the topic portion of the communication includes one or more embedded codes or instructions. The embedded codes or instructions may be in the form of a level of the topic portion delineated by a topic separator. The embedded codes can include keywords or characters that identify it as an embedded code rather than an additional level. In other embodiments, the embedded codes can be allocated at particular location in the topic portion, e.g., the first level. Examples of such topic portions can include, but are not limited to:

code/base level/level 1/level 2/level 3 . . . /level n
    code . . . code/base level/level 1/level 2/level 3 . . . /level n
    special character_code/base level/level 1/level 2/level 3 . . . /level n With reference now to FIG. 6A, at (1), a client device 102 corresponding to an administrator or customer can transmit configuration information to the message processing service 600. Illustratively, the configuration information corresponds to one or more instructions, logical rules, or processing steps that define a set of actions the message processing service 600 can take on a message based on matching an embedded code or identifier in the topic portion of a received message. For example, one configuration of the message processing service 600 can include a definition of whether communications corresponding to an assigned task should be implemented by a local coordinated device 112 if no network connectivity is available or whether an assigned task should be implemented by a network device if network connectivity is available. In this example, both devices may be subscribed to receive content messages with a corresponding topic, but which device receives the message may depend on the evaluation of the rules identified by the embedded codes.

In another example, the message processing service 600 may be configured to obtain additional information, such as cost information, routing information, workload, service level information, and the like based on identifying one or more embedded codes that correspond to instructions to obtain such information. In still further example, the message processing service 600 can be configured to modify portions of the payload portion of the received message based on obtaining an embedded code that instructs the message processing service 600 to execute executable code or instructions to effectuate such a modification. Illustratively, the modification of the payload portion can include the selection of particular portions of executable code based on evaluation of criteria or the addition/exclusion of executable code. For example, the message processing service 600 may execute a first portion of code based on time criteria (e.g., before noon) or based on some condition precedent (e.g., another device has completed execution of code. In this regard, the message processing service 600 in traditional implementations of messaging protocols does not conduct any additional processing of the received messages. Additionally, in accordance with the present application, the message processing service 600 can be configured with a wide variety of additional functionality as specified by the administrator via the client device 102.

At (2), the message processing service 600 processes the configuration information and stores the configuration for subsequent processing. In this regard, the message processing service 600 can maintain a database or matrix of embedded codes for matching. Additionally, the message processing service 600 can maintain the additional processing instructions or executable code that will be executed when a matching embedded code is identified. In other embodiments, the message processing service 600 can obtain the additional instructions or executable code utilizing an interface, such as an API, at the time that an embedded code is identified.

Figure 6B:
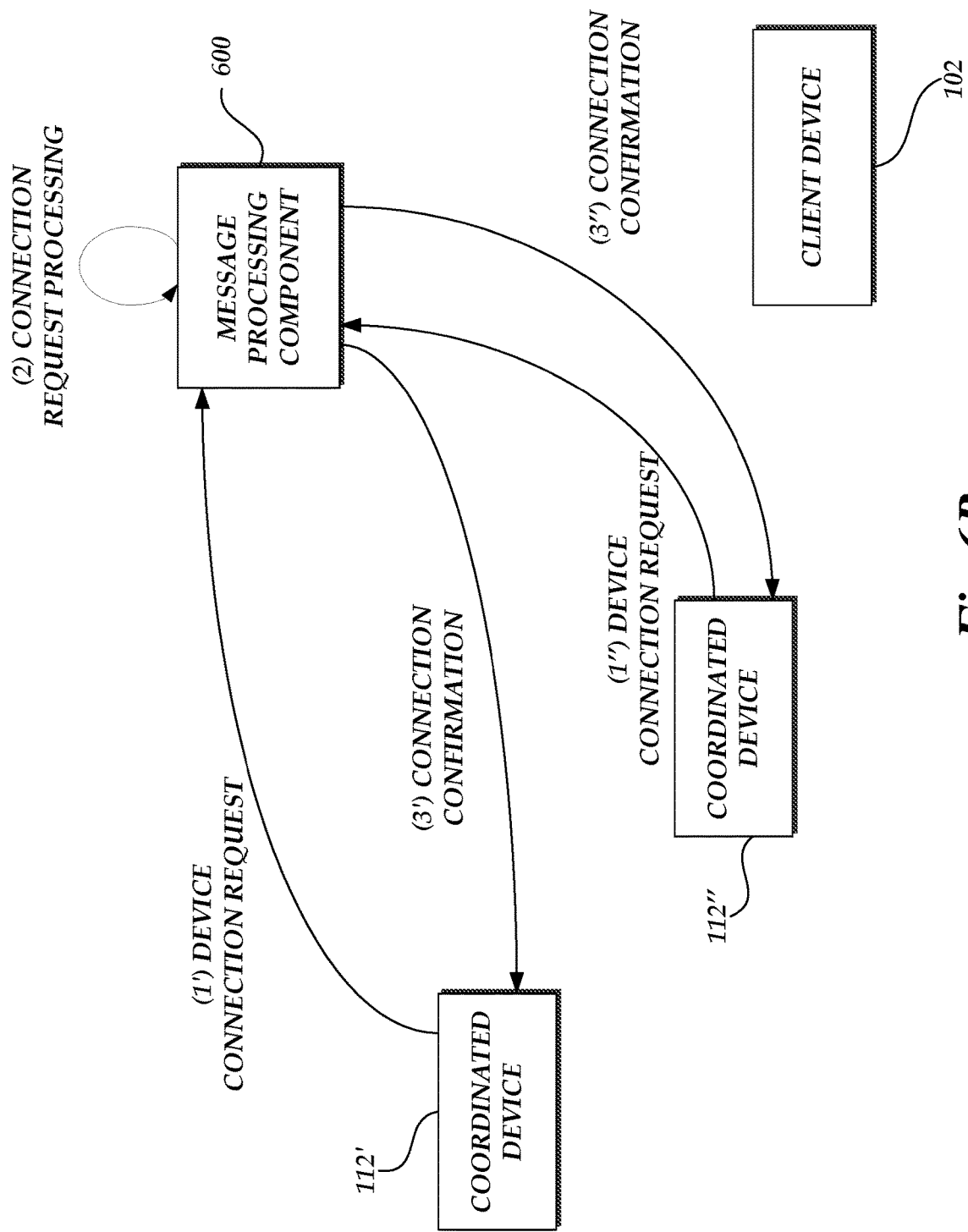

With reference to FIG. 6B, the initial configuration of recipient devices, coordinated devices 112' and 112" will be described. At (1), the coordinated devices 112' and 112" generate a device connection request and transmit the request to the message processing services 600. Illustratively, the device connection request corresponds to establish procedures associated with the authentication and authorization of the coordinated devices 112' and 112" with the message processing service 600. Still further, in some embodiments, the logical network 100 can include additional gateway components that independently, or as part of the content management system 110, manage the transmission of the messages to the message processing services 600. Such gateway components can implement security functionality, load balancing or other network processing services.

At (2), the message processing services 600 processes the connection request such as by validating security information, requesting additional information or determining the characteristics of the requesting client computing device 102. At (3), if the connection request is acceptable and authorized, the message processing services 600 transmits a connection confirmation to the requesting message processing service 600. In this regarding, once authorized, the client computing device and message processing services 600 can begin communication within the procedures defined in a messaging protocol, such as MQTT.

Figure 6C:
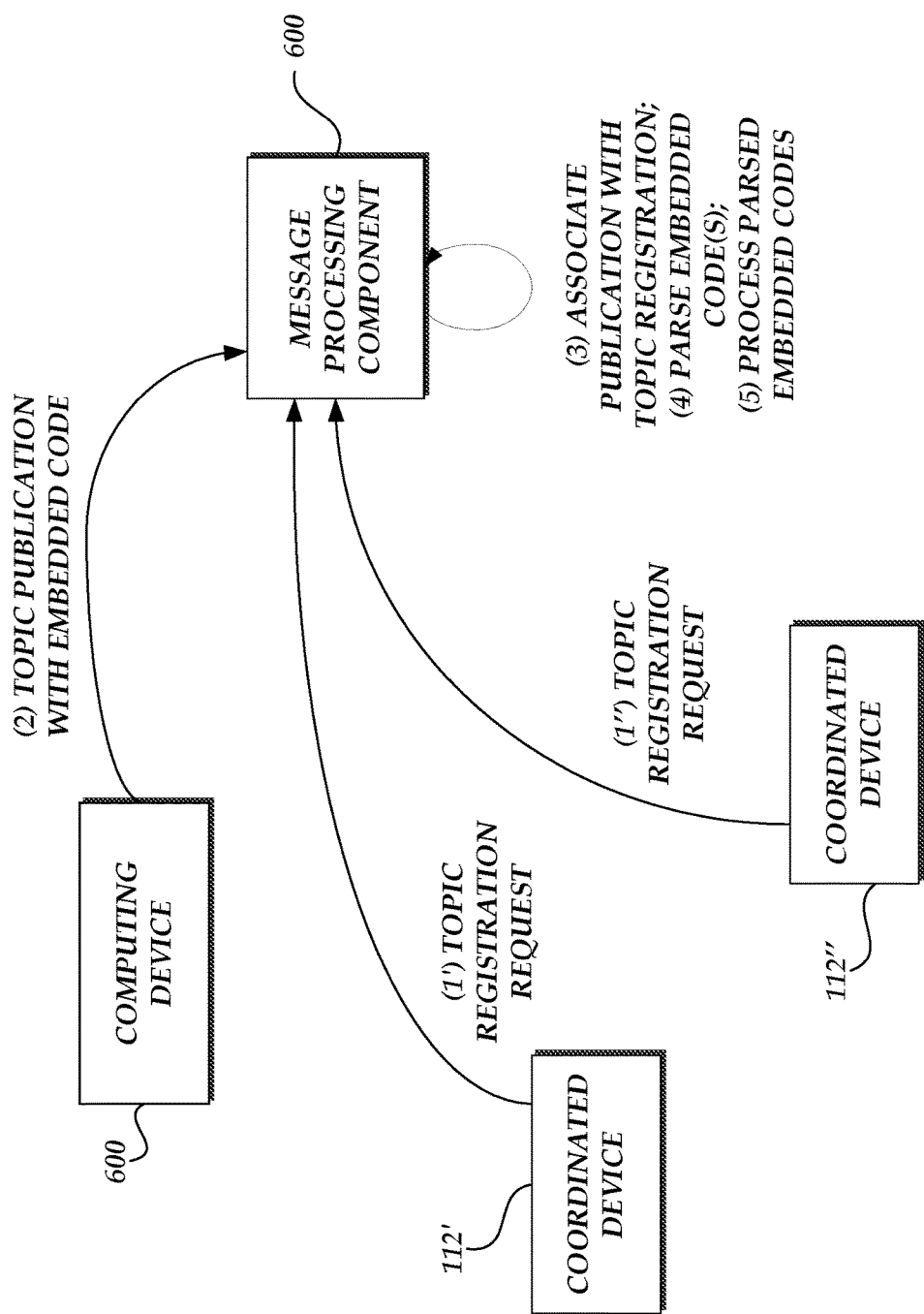

With reference now to FIG. 6C, after receiving the connection confirmation, at (1), the coordinated devices 112' and 112" transmit one or more topic registration requests to the message processing services 600. Illustratively, the topic registration is defined in accordance with the messaging protocol such that the coordinated devices 112' and 112" can register to receive content published according to specific topics by any number of content providers. As applied to the present application, the coordinated devices 112' and 112" register for one or more topics. For purposes of illustration, examples will be provide such that the forwarding of message to the registered coordinated devices 112' and 112" will be different based on embedded codes in the messages.

At some point after registration, at (2), a separate computing device 602 publishes one or more pieces content to the message processing services 600. Illustratively, the computing device 600 can correspond to a coordinated device, network based devices, and the like. Each published piece of content is associated with a topic. For purpose of an illustrative example, at least one published content is associated with an embedded code in the topic portion of the content/message.

At (3), the message processing services 600 matches the registered topics with the published topics to determine that the client computing devices 102 should receive the published content with the update topic. At (4), the message processing services 600 parses the topic portion of the communication to identify one or more embedded codes. In some embodiments, the message processing service 600 can include functionality to parses the topic portion. In other embodiments, the message processing service 600 can utilize additional services or components to facilitate the parsing.

At (5), the message processing service 600 processes the parsed embedded code. As described above, the message processing service 600 can match the embedded code and then execute code or instructions that have been configured based on a matching embedded code. For purposes of illustration of utilizing embedded codes for message routing functionality, with reference to FIG. 6D, at (6), the message processing service 600 can forward the message to coordinate device 112" and not coordinated device 112'. For example, if the embedded code corresponds to a determination of whether network connectivity is available at the coordinated devices 112' and 112", a coordinator component 114 functioning as the message processing service 600 can determine that the message corresponding to a task should be sent to a local coordinated device rather than a network based task processor.

Figure 6D:
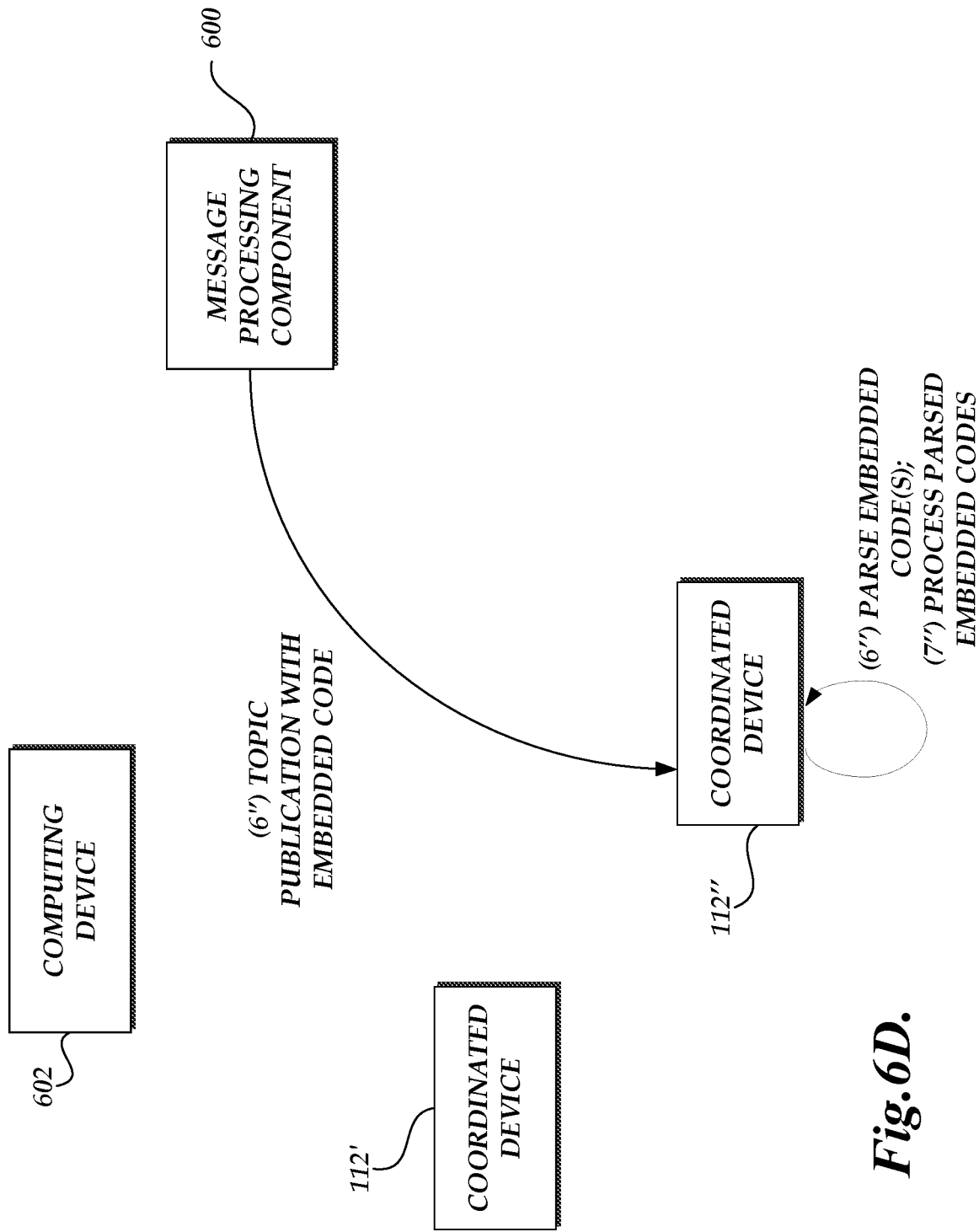
Figure 7:
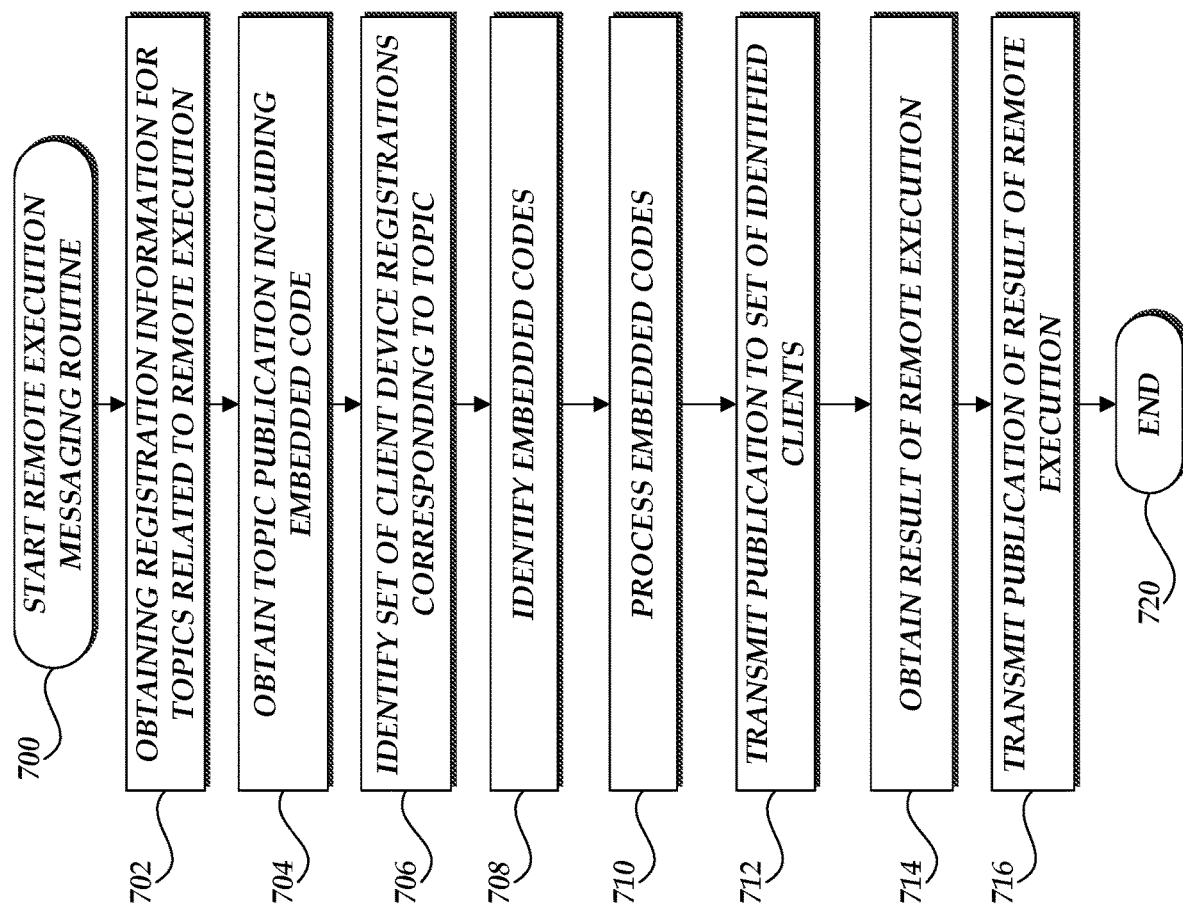
FIG. 7 is a flow diagram illustrative of a remote execution messaging routine implemented by a message processing service component in accordance with an illustrative embodiment.

As previously described, in other embodiments, the recipient devices may also be configured to processed embedded code or other information in the topic portion of the message. Similar to the process described above, in this regard, the coordinate device 112" can function as the message processing component 600 to parse the topic portion of the message at (6) and process the parsed embedded code at (7). As described above, the message processing service 600 can match the embedded code and then execute code or instructions that have been configured based on a matching embedded code. Additionally, in this portion of the illustrative example, the coordinated device 112" can utilize the embedded code to process the payload portion of the message, such as by modifying executable code portions, excluding or selecting specific executable code portions, applying timing considerations to the execution of executable portions, applying logical rules or considering additional criteria as conditions precedent to executing code portions, and the like. One skilled in the relevant art will appreciate that while FIG. 6D illustrates the processing of embedded codes to affect routing of messages and processing of the payload utilizing the embedded codes, both embodiments need not be practiced together. Accordingly, the processing of embedded codes to affect routing may be implemented without additional processing of the embedded codes by the recipient devices. Likewise, processing of embedded code information by a recipient device may be implemented without requiring utilization of the embedded codes to affect routing. FIG. 7 is a flow diagram illustrative of a remote execution messaging routine 700 implemented by a message processing service 600 in accordance with an illustrative embodiment. Routine 700 illustrates the utilization of embedded code information in a messaging protocol during the message routing. At block 702, the message processing service 600 obtains registration information including at least one topic related to the remote execution of content by a device, such as a coordinated device 112 or any other computing device 102 As described previous, the devices transmit one or more topic registration requests to the message processing service 600. Illustratively, the topic registration is defined in accordance with the messaging protocol such that the device can register to receive content published according to specific topics by any number of content providers.

At some point after registration, at block 704, the message processing service 600 obtains one or more publications having a topic portion. Illustratively, some computing device 602 (FIG. 6C) publishes one or more pieces content to the message processing service 600. Each published piece of content is associated with a topic. For purpose of an illustrative example, at least one published content is associated with an embedded code that corresponds to a registered topic of the client computing devices 102. Additionally, the published piece of content associated with the topic includes a payload portion of content. Examples of such payload portions can include tasks to be executed by a coordinated device or network device.

At block 706, the message processing service 600 matches the registered topics with the published topics to determine that one or more devices should receive the published content with the topic to form the set of client devices that should receive the published topic. Illustratively, since the message processing service 600 are configured in accordance with the messaging protocol, such as MQTT, matching registrations to topic publication can be accomplished in the manner dictated by the messaging protocol.

At block 708, the message processing service 600 identifies one or more embedded codes in the topic portion of the message. Illustratively, the message processing service 600 parses the topic portion of the communication to identify one or more embedded codes. In some embodiments, the message processing service 600 can include functionality to parses the topic portion. For example, the message processing service 600 can utilize a lookup table to identify the corresponding embedded codes. In other embodiments, the message processing service 600 can utilize additional services or components to facilitate the parsing.

At block 710 the message processing service 600 processes the parsed embedded code. As described above, the message processing service 600 can match the embedded code and then execute code or instructions that have been configured based on a matching embedded code. Various examples have been identified in terms of the results of the processing of the embedded codes including, but not limited to, selection of registered devices to receive messages, timing related to the transmission of the messages, modification of the messages, consideration of additional criteria, and the like.

At block 712, the message processing service 600 transmits the published content. Similarly, the transmittal of the published content is done in accordance with the procedures and capabilities of the messaging protocol, such as MQTT, and does not require additional or alternative communications to cause the transmission of the executable code. In other example, the message processing service 600 can utilize a separate transport protocol. The recipient devices process the received published content.

At block 714, the message processing service 600 obtains processing results corresponding to the processing of the message. Illustratively, the client computing devices generates and publishes, via the messaging protocol, content related to information indicative of the processing results of the code. In some embodiments, the processing result can correspond to a binary determination of whether the execution of the code was successfully carried out. In another embodiment, the processing result can include one or more values indicative of the execution of the code/instruction or a log detailing information about the execution of the code/instructions. In a manner similar to that described with the publication of update topics, the publication of the processing result(s) can be associated with a particular topic, generally referred to as "processing result topic."

At block 716, the message processing service 600 matches the registered topics with the published topics to determine that the admin device 104 should receive the published content with the processing result topic and transmits the published content. Illustratively, the transmittal of the published content is also done in accordance with the procedures and capabilities of the messaging protocol, such as MQTT, and does not require additional or alternative communications to cause the transmission of the executable code. At block 720, the routine 600 terminates.

Figure 8:
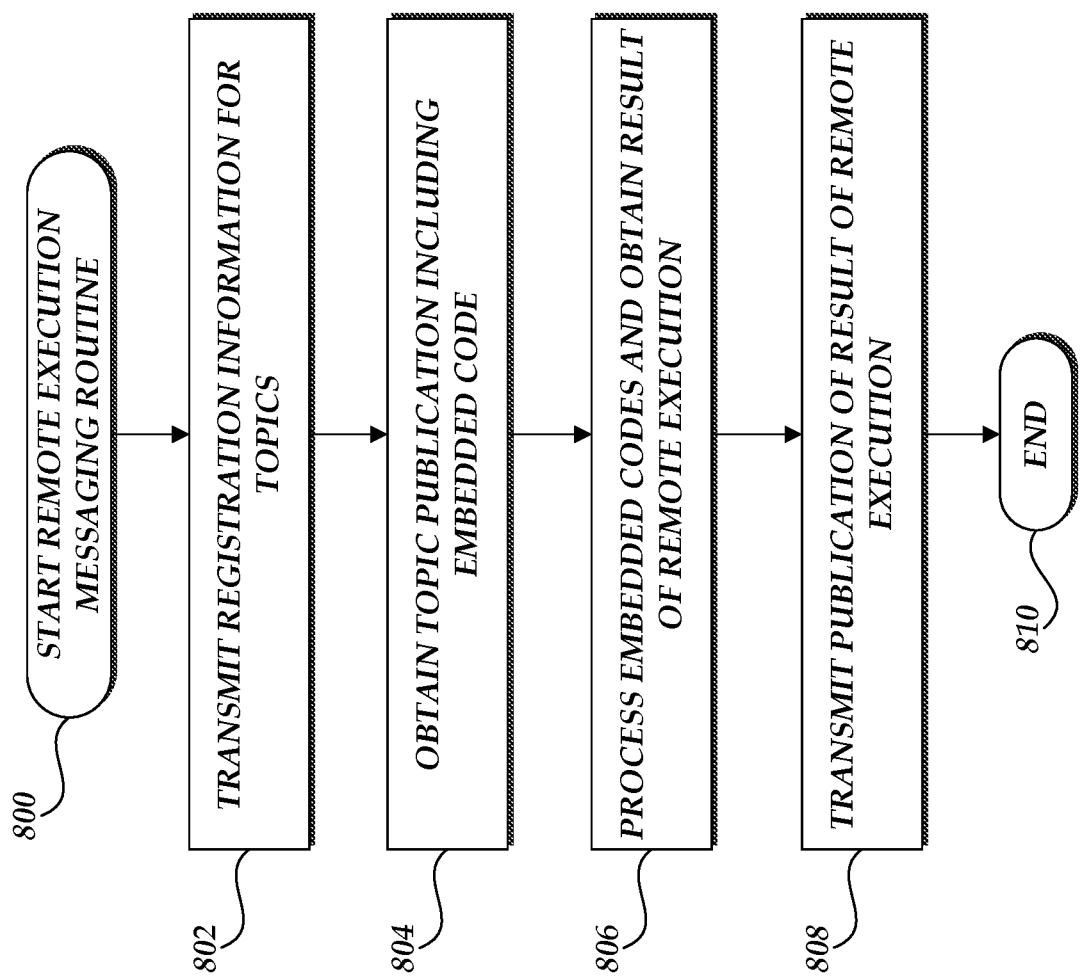
FIG. 8 is a flow diagram illustrative of a remote execution messaging routine implemented by a client computing device or coordinated device in accordance with an illustrative embodiment.

FIG. 8 is a flow diagram illustrative of a remote execution messaging routine 800 implemented by a coordinated device 112 or other computing device in accordance with an illustrative embodiment. As previously described, in this application, the coordinated device 112 or other computing device can be considered as a message processing service 600 to utilize embedded code information in the processing of messages independent of whether other components also utilized the embedded code information in routing of messages. The identification of a coordinated device 112 in this example, however, should not be construed as limiting for the application of routine 800. At block 802, the coordinated device 112 transmits one or more topic registration requests to the message processing services 600. As described above, the topic registration is defined in accordance with the messaging protocol such that the coordinated device 112 can register to receive content published according to specific topics by any number of content providers.

In response to receiving published content, the message processing services 600 matches the registered topics with the published topics to determine that the client coordinated device 112 should receive the published content with the update topic. As previously described, the message processing service 600 also processes any embedded codes in the topic portion. At block 804, the coordinated device 112 receives published content from the message processing services 600. Illustratively, the transmittal of the published content is done in accordance with the procedures and capabilities of the messaging protocol, such as MQTT, and does not require additional or alternative communications to cause the transmission of the executable code.

As part of the execution of the execution of content or after the execution of content, at block 806, the coordinated device 112 processes embedded code and obtains the results of the remote execution. In some embodiments, the processing result can correspond to a binary determination of whether the execution of the code was successfully carried out. In another embodiment, the processing result can include one or more values indicative of the execution of the code/instruction or a log detailing information about the execution of the code/instructions. In some embodiments, the coordinated device 112 can also utilize the embedded codes to modify how the payload portion of the messages are processed. In such an example, the coordinated device 112 can implement similar functionality to the functionality attributed to the message processing service 600 to parse embedded codes and implement the result. For example, the coordinate device 112 can utilize the embedded code to process the payload portion of the message, such as by modifying executable code portions, excluding or selecting specific executable code portions, applying timing considerations to the execution of executable portions, applying logical rules or considering additional criteria as conditions precedent to executing code portions, and the like.

At block 808, the coordinated device 112 publishes, via the messaging protocol, content related to information indicative of the processing results of the code. Illustratively, the transmittal of the published content is done in accordance with the procedures and capabilities of the messaging protocol, such as MQTT, and does not require additional or alternative communications to cause the transmission of the executable code. At block 810, the routine 800 terminates.

Figure 9:
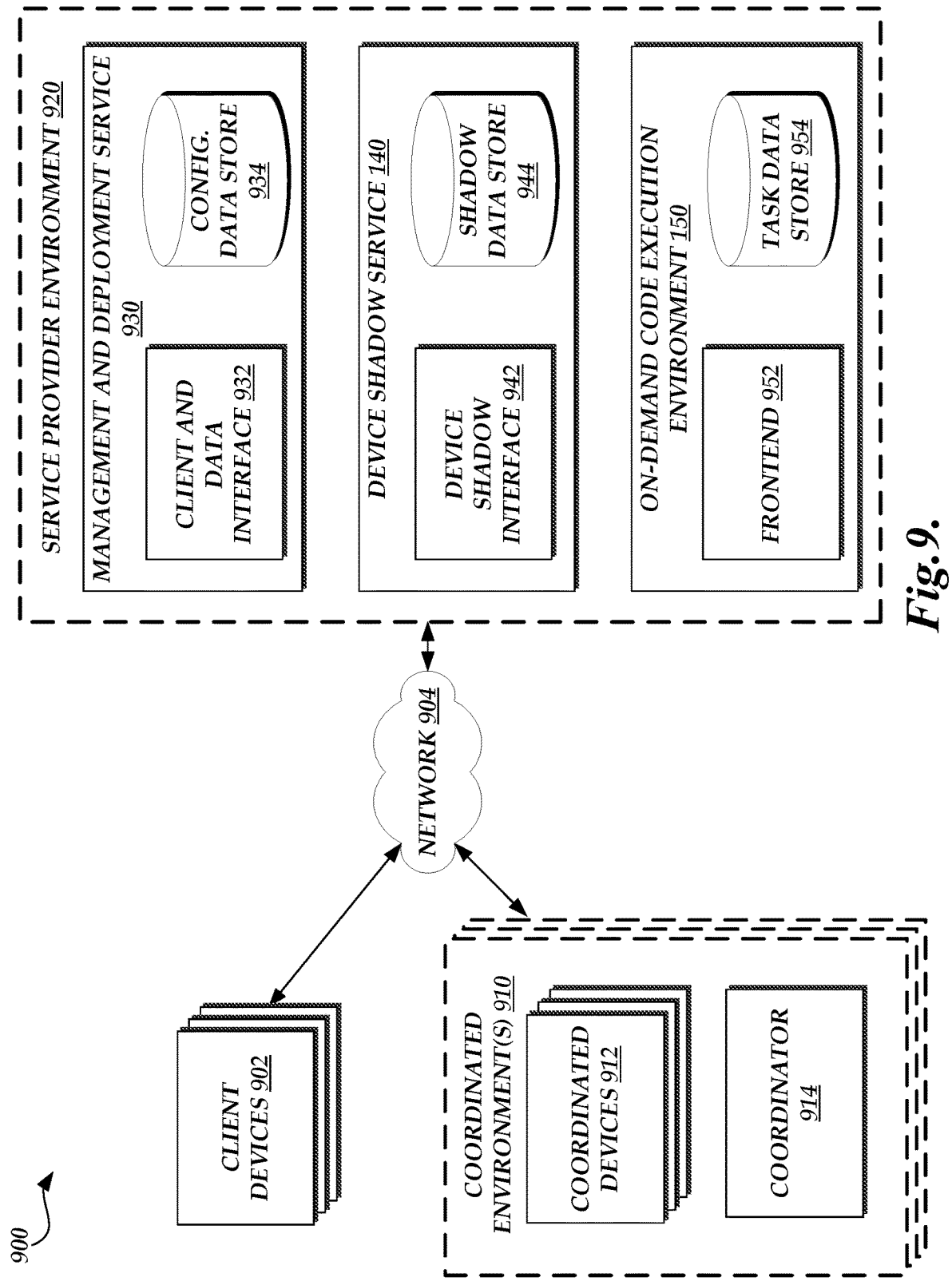
FIG. 9 is a block diagram depicting an illustrative environment in which a coordinator can operate to locally manage and coordinate operation of coordinated devices within a coordinated environment, and wherein the coordinator may communicate with client devices and a service provider environment to modify operation of the coordinator.

FIG. 9 is a block diagram of an illustrative operating environment 100, including one or more coordinated environments 910 in which a coordinator 914 may operate to control coordinated devices 912, as well client devices 902 that may interact with the coordinated environments 910 (e.g., to request a change in state of a coordinated device 912), and a service provider environment 920 that may assist in communications with or configuration of the coordinators 914 in various coordinated environments 910.

The coordinated environments 910, client devices, and service provider environment 920 may communicate via a network 904, which may include any wired network, wireless network, or combination thereof. For example, the network 904 may be a personal area network, local area network, wide area network, over-the-air broadcast network (e.g., for radio or television), cable network, satellite network, cellular telephone network, or combination thereof. As a further example, the network 904 may be a publicly accessible network of linked networks, possibly operated by various distinct parties, such as the Internet. In some embodiments, the network 904 may be a private or semi-private network, such as a corporate or university intranet. The network 904 may include one or more wireless networks, such as a Global System for Mobile Communications (GSM) network, a Code Division Multiple Access (CDMA) network, a Long Term Evolution (LTE) network, or any other type of wireless network. The network 904 can use protocols and components for communicating via the Internet or any of the other aforementioned types of networks. For example, the protocols used by the network 904 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein. Although all of the components of the network 904 are illustrated in FIG. 1, one or more of the components, such as routers may function as a message processing service.

Each coordinated environment 910 may include a coordinator 914 and any number of coordinated devices 912, in communication via a network of the execution environment 910 (which network is not shown in FIG. 1). Because of their association within the coordinated environment 910, the coordinated devices 912 and coordinator 914 within a given environment 910 may be considered "local" to one another, in terms of communications network. For example, the coordinated devices 912 and coordinator 914 within a given environment 910 may be connected via a LAN or other localized communication network.

Each coordinated device 912 can correspond to a computing device configured to communicate with the coordinator 914 to manage functionality of the coordinated device 912. In some instances, coordinated devices 912 can correspond to fully featured computing devices, such as laptops, desktops, standalone media players, etc., with robust localized user interface capabilities. In other instances, coordinated devices 912 can correspond to thin devices or embedded devices associated with another primary function, such as an device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 912 may include limited local user interfaces, and be configured for remote management. In some instances, coordinated devices 912 may be stateful, and operate to alter their state in response to instructions (e.g., by turning from "off" to "on," etc.).

As described in more detail below (e.g., with respect to FIG. 10), the coordinator 914 can correspond to a computing device executing instructions to coordinate, manage, or control operation of the coordinated devices 912, without requiring that instructions transmitted to the coordinated devices 912 travel outside the coordinated environments 910 (thus increase the security of such instructions and increasing the speed of their transmission). Specifically, the coordinator 914 can include a processor and memory collectively configured to manage communications between any combination of coordinated devices 912, client devices 902, and devices of the service provider network 920. The coordinator can further be configured to enable executions of tasks, in a manner similar to an on-demand code execution environment 920 of the service provider environment 920. These tasks may implement a variety of user-defined or non-user-defined functionalities, including communicating with coordinated devices 912, client devices 902, and devices of the service provider network 920. As such, the coordinator 914 can be configured to allow for manual, automatic, or semi-automatic control of coordinated devices 912. For example, the coordinator 914 may enable a client device 902 to transmit a request to change the state of a coordinated device 912, and cause such a change in state to occur. As a further example, the coordinator 914 may enable a user to specify a criterion under which a state of a coordinated device 912 should be changed, and then automatically operate to change the state of the coordinated device 912 when the criterion is satisfied. As will be discussed below, many functions of the coordinator 914 may be established via tasks, enabling rapid alteration of these functions as desired by a user.

Client devices 902 may include a variety of computing devices enabling a user to communicate with the coordinated environments 910, the service provider environment 920, or both. In general, the client devices 902 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The service provider environment 920 may provide the client devices 902 with one or more user interfaces, command-line interfaces (CLI), application programming interfaces (API), and/or other programmatic interfaces for interacting with the service provider environment 920, such as to submit a configuration for a coordinator 914, and control deployment of that configuration, to submit code corresponding to a task to be executed on the coordinator 914 or an on-demand code execution environment 950 of the service provider environment 920, to view logging or monitoring information related to coordinators 914, etc. Similarly, the coordinator 914 may provide the client devices 902 with one or more user interfaces, command-line interfaces (CLI), application programming interfaces (API), and/or other programmatic interfaces for interacting with the coordinator 914, such as to read a state of a coordinated device 912, request a change in state of a coordinated device 912, request that the coordinator 914 cause execution of a task, etc. Although one or more embodiments may be described herein as using a user interface, it should be appreciated that such embodiments may, additionally or alternatively, use any CLIs, APIs, or other programmatic interfaces.

The service provider environment 920 can include a number of elements to enable configuration of, management of, and communications with coordinators 914. Specifically, the service provider environment 920 includes a management and deployment service 930 to enable registration of coordinators 914 with the service provider environment 920 and configuration of such coordinators 914, a device shadow service 940 to enable robust changes to state of coordinators 914 and coordinated devices 912, and an on-demand code execution environment 950 providing on-demand, dynamic execution of tasks, as well as deployment and provisioning of tasks on coordinators 914.

As shown in FIG. 9, the management and deployment service 930 includes a client and data interface 932 and a configuration data store 934 that may operate collectively to enable registration of a coordinator 914 with the management and deployment service 930, generation of configurations for the coordinator 914, and transmission of configuration data to the coordinator 914. Illustratively, the client and data interface 932 may provide one or more user interfaces (e.g., APIs, CLIs, GUIs, etc.) through which a user, via a client device 902, may generate or submit a configuration of a coordinator 914 for storage in the configuration data store 934. The client and data interface 932 may further provide one or more interfaces through which a coordinator 914 may obtain the configuration, such that the coordinator 914 is reconfigured according to the obtained configuration. The configuration data store 934 can correspond to any persistent or substantially persistent data store, such as a hard drive (HDD), a solid state drive (SDD), network attached storage (NAS), a tape drive, or any combination thereof.

The device shadow service 940 can include elements enabling a "shadow state" of a device, such as a coordinator 914 or a coordinated device 912, to be created, maintained, read, altered, or deleted. As discussed above, a shadow state may correspond to data representing a desired state of a correspond device, which may or may not mirror a current state of the device. For example, with respect to a coordinator 914, a shadow state may include a desired configuration version for the coordinator 914. With respect to a coordinated device 912, a shadow state may include a desired state of the coordinated device 912 (e.g., on or off for a switch or bulb, locked or unlocked for a lock, a desired temperature for a thermostat, etc.). The device shadow service 940 may enable users, via client devices 902, or other entities to read from or modify a shadow state for a device, and may further interact with that device to synchronize the device to the shadow state. Illustratively, the device shadow service 940 may include an interface 942 (which may include, e.g., APIs, CLIs, GUIs, etc.) through which requests to read from, write to, create or delete a shadow state may be received, as well as a shadow data store 944 configured to store the shadow states. The shadow data store 934 can correspond to any persistent or substantially persistent data store, such as a hard drive (HDD), a solid state drive (SDD), network attached storage (NAS), a tape drive, or any combination thereof. Further details regarding the use of device shadows generally can be found within U.S. patent application Ser. No. 15/196,700, entitled "Device Representation Management Using Representation Types," and filed Jun. 29, 2016 (the "'700 application"), the entirety of which is incorporated by reference herein.

The on-demand code execution environment 950 can include a number of devices providing on-demand execution of tasks (e.g., portable code segments). Specifically, the on-demand code execution environment 950 can include a frontend 952, through which users, via client device 902, may submit tasks to the on-demand code execution environment 950 and call for execution of tasks on the on-demand code execution environment 950. Such tasks may be stored, for example, in a task data store 954, which can correspond to any persistent or substantially persistent data store, such as a hard drive (HDD), a solid state drive (SDD), network attached storage (NAS), a tape drive, or any combination thereof. While not shown in FIG. 9, the on-demand code execution system 950 can include a variety of additional components to enable execution of tasks, such as a number of execution environments (e.g., containers or virtual machines executing on physical host devices of the on-demand code execution environment 950), a worker manager to manage such execution environments, and a warming pool manager to assist in making execution environments available to the worker manager on a rapid basis (e.g., under 10 ms). Further details regarding the on-demand code execution environment can be found within the '556 patent, incorporated by reference above.

As noted above, tasks may be utilized both at the on-demand code execution environment 950 and at coordinators 914. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 950 or a coordinator 914 in a variety of manners. In one embodiment, a client device 902 or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 914, an network-accessible storage service, or the task data store 954) prior to the request being received by the coordinator 914 or the on-demand code execution system 950. A request interface of the coordinator 914 or the on-demand code execution system 950 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 922.

A call to execute a task may specify one or more third-party libraries (including native libraries) to be used along with the user code corresponding to the task. In one embodiment, the call may provide to a coordinator 914 or the on-demand code execution system 950 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the coordinator 914 or the on-demand code execution system 950 (e.g., standard routines), and/or provided by third parties. In some embodiments, such resource-level constraints (e.g., how much memory is to be allocated for executing a particular user code) are specified for the particular task, and may not vary over each execution of the task. In such cases, the coordinator 940 or the on-demand code execution system 950 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 910 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 914 or the on-demand code execution system 950 may inspect the call and look for the flag or the header, and if it is present, the coordinator 914 or the on-demand code execution system 950 may modify the behavior (e.g., logging facilities) of the execution environment in which the task is executed, and cause the output data to be provided back to the user. In some embodiments, the behavior/mode indicators are added to the call by the user interface provided to the user by the coordinator 914 or the on-demand code execution system 950. Other features such as source code profiling, remote debugging, etc. may also be enabled or disabled based on the indication provided in a call.

The service provider environment 920 is depicted in FIG. 9 as operating in a distributed computing environment including several computer systems that are interconnected using one or more computer networks (not shown in FIG. 9). The service provider environment 920 could also operate within a computing environment having a fewer or greater number of devices than are illustrated in FIG. 9. Thus, the depiction of the service provider environment 920 in FIG. 9 should be taken as illustrative and not limiting to the present disclosure. For example, the service provider environment 920 or various constituents thereof could implement various Web services components, hosted or "cloud" computing environments, and/or peer to peer network configurations to implement at least a portion of the processes described herein.

Further, the service provider environment 920 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 10:
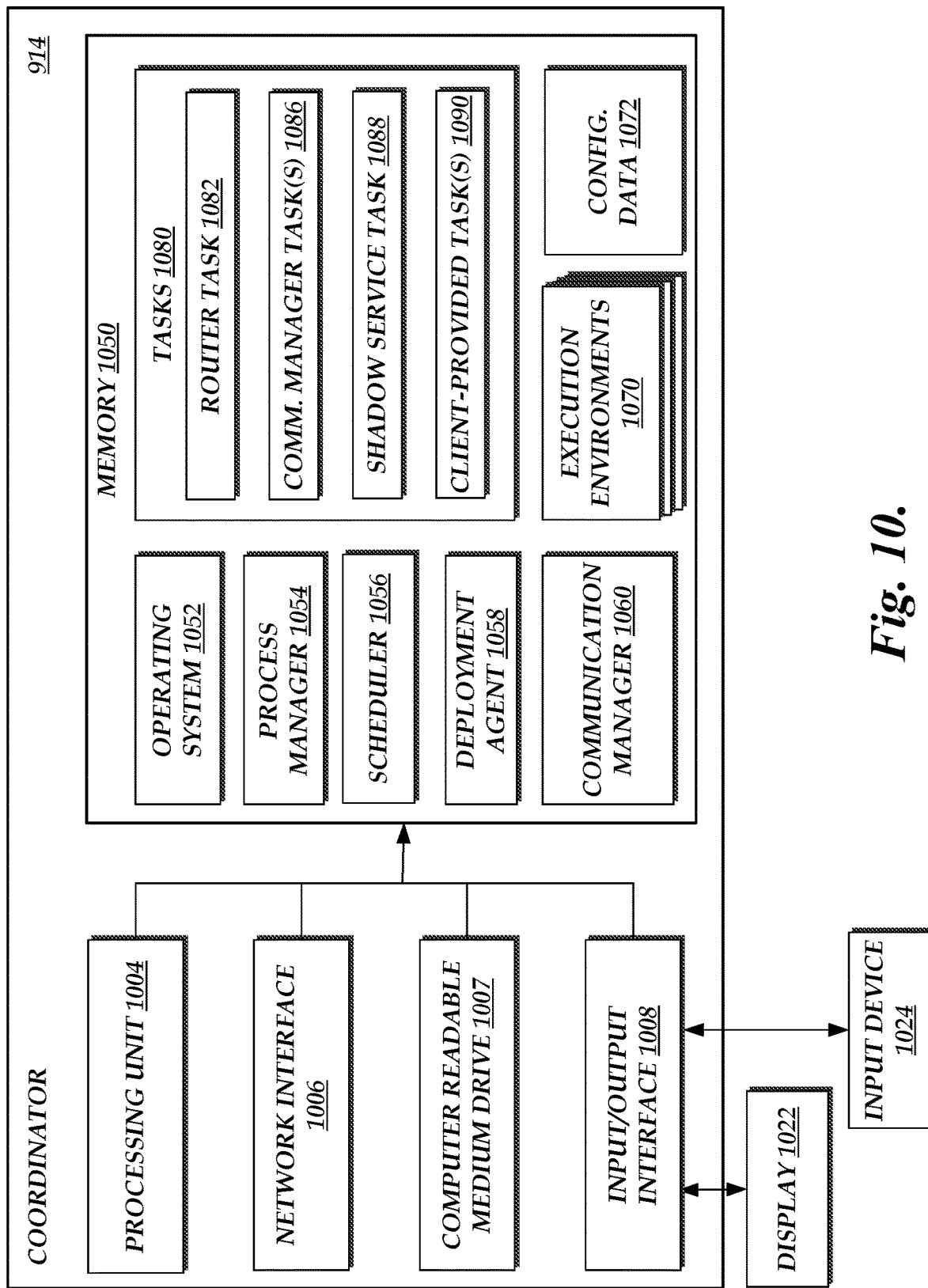
FIG. 10 depicts a general architecture of a computing device providing a coordinator of FIG. 1.

FIG. 10 depicts a general architecture of a computing system (referenced as coordinator 914) that manages coordinated devices 912 within a given coordinated environment 910. The general architecture of the worker manager 940 depicted in FIG. 10 includes an arrangement of computer hardware and software modules that may be used to implement aspects of the present disclosure. The hardware modules may be implemented with physical electronic devices, as discussed in greater detail below. The coordinator 914 may include many more (or fewer) elements than those shown in FIG. 10. It is not necessary, however, that all of these generally conventional elements be shown in order to provide an enabling disclosure. Additionally, the general architecture illustrated in FIG. 10 may be used to implement one or more of the other components illustrated in FIG. 9. As illustrated, the coordinator 914 includes a processing unit 1004, a network interface 1006, a computer readable medium drive 1007, and an input/output device interface 1008, all of which may communicate with one another by way of a communication bus. The network interface 1006 may provide connectivity to one or more networks or computing systems. The processing unit 1004 may thus receive information and instructions from other computing systems or services via the network 904. The processing unit 1004 may also communicate to and from memory 1050 and further provide output information for an optional display (not shown) via the input/output device interface 1008. The input/output device interface 1008 may also accept input from an optional input device (not shown).

The memory 1050 may contain computer program instructions (grouped as modules in some embodiments) that the processing unit 1004 executes in order to implement one or more aspects of the present disclosure. The memory 1050 generally includes random access memory (RAM), read only memory (ROM) and/or other persistent, auxiliary or non-transitory computer readable media. The memory 1050 may store an operating system 1052 that provides computer program instructions for use by the processing unit 1004 in the general administration and operation of the coordinator 914. The memory 1050 may further include computer program instructions and other information for implementing aspects of the present disclosure. For example, in one embodiment, the memory 1050 includes a process manager 1054, a scheduler 1056, a deployment agent 1058, and a communication manager 1060.

The scheduler 1056 and deployment agent 1058 may be executed by the processing unit 1004 to select tasks for execution by the processing unit 1004, and to manage such task executions. Specifically, the scheduler 1056 may include instructions to select a tasks for execution at given points in time and to suspend execution of tasks (e.g., under instances of constrained resources at the coordinator 914). The deployment agent 1058 may include instructions to select an appropriate execution environment 1070 in which to execute a task, to provision that execution environment 2150 with appropriate access to resources needed during the task execution, and to cause execution of the task within the execution environment 1070. An execution environment 1070, as used herein, refers to a logical portion of memory 250 in which to execute a task. In one embodiment, execution environments 1070 are programmatically separated, such that execution of code in a first execution environment 1070 is prohibited from modifying memory associated with another execution environment 1070. Illustratively, an execution environment 1070 may correspond to a "container," operating-system-level virtualization environment, or "sand box" environment, such as a "chroot jail" or a Python virtual environment "virtualenv." In other instances, an execution environment 1070 may correspond to a virtual machine environment (e.g., a JAVA virtual machine, a virtualized hardware device with distinct operating system, etc.). In still other instances, an execution environment 1070 may be a memory space allocated to an execution of a task, without necessarily utilizing virtualization.

Communications between tasks executing on the coordinator, as well as between the coordinator 914 and other devices (e.g., client devices 902 and coordinated devices 912) may be facilitated by the communication manager 1060. Specifically, the communication manager 1060 may be configured to obtain messages directed to the coordinator 914 and forward the message to the appropriate destination. For example, the communication manager 260 may route messages between any combination of tasks, coordinated devices 912, client devices 902, and devices of the service provider execution environment 920. As will be explained in greater detail below, the communication manager 260 can translate messages associated with a specific topic such that they are directed to a topic subscribed to by a smaller subset of devices.

Tasks executed by the coordinator 914 are shown as logically grouped within the tasks memory space 1080, which may correspond to a logical unit of memory 1050 configured to store the code corresponding to each task. As shown in FIG. 10, the tasks memory space 1080 can include a number of tasks executable by the processing unit 1004 to implement functionalities of the coordinator 914, including a router task 1082, one or more communication manager tasks 1086, a shadow service task 1088, and one or more client-provided tasks 1090.

The router task 1082 may correspond to a portion of code executable to assist in the routing of messages within, to, and from the coordinator. In one embodiment, the router task 1082 implements a "routing table" to determine appropriate destinations for a message. For example, the communication manager 1060 may forward messages obtained at the coordinator 914 (e.g., due to generation by a task execution or reception at the input/output interface 1008) to the router task 1082, which may utilize the routing table to determine that messages addressed to a certain identifier should be routed to a given task, a given client device 902, or a given coordinated device 902. The routing table may further indicate that a message addressed to an identifier should be transmitted to the service provider environment 920 (e.g., to the device shadow service 940 or the on-demand code execution system 950). In one embodiment, the routing table may utilize "topics" as identifiers, such that messages associated with a particular topic are routed according to a routing specified for that topic. The routing table may further include information for how to route messages based on a source of those messages. For example, a message addressed to a given topic may be routed differently, based on whether the message is received from a first task, a second task, a first coordinated device 912, etc. By utilization of a routing table, router task 282 can enable messages to be redirected, without a change in the operation of a sender of such a message (e.g., without rewriting code for a task that generated the message, without modifying the software of a coordinated device 912 that generated the message, etc.).

The communication manager tasks 1086 may enable communications between the coordinator 914 and a number of different external devices (e.g., coordinated devices 902) according to a protocol of such communications. For example, a first communication manager task 1086 may be configured to manage communications using a BLUETOOTH™ protocol, a second communication manager may be configured to manage communications using an HTTP protocol, etc. In some instances, multiple communication manager tasks 1086 may work collectively to implement communications. For example, a first communication manager task 1086 may enable communications via the TCP protocol, while a second communication manager task 1086 may enable communications via the MQTT protocol (which utilizes the TCP protocol and thus may utilize the a first communication manager task 1086). Because different communication manager tasks 286 can vary the ability of the coordinator 914 to communicate via different protocols, and because the tasks of the coordinator 914 may be altered via reconfiguration of the coordinator 914, the coordinator 914 can be rapidly reconfigured to utilize a variety of different communication protocols.

The shadow service task 1088 can facilitate management and interaction with device shadows maintained at the coordinator 914. Illustratively, the shadow service task 288 can implement functionality similar to that provided by the device shadow service 940 locally to the coordinator 914. Accordingly, the shadow service task 1088 can maintain a shadow state (data representing a desired state) of a coordinated device 912, and allow for reading to or writing to such data. The shadow service task 288 can further enable synchronization of a coordinated device 912 with the device shadow for that device. Accordingly, by modifying a device shadow for a coordinated device 912, the state of the coordinated device 912 can be altered. By reading the device shadow for the coordinated device 912, the state of the coordinated device 912 can be determined. In some instances, the shadow service task 1088 may further coordinate with another device shadow for a given device, such as a device shadow maintained by the device shadow service 940. For example, the shadow service task 1088 may synchronize a local device shadow with a device shadow stored at the device shadow service 940, resolve conflicts between the local device shadow and the device shadow stored at the device shadow service 940, etc.

In addition to the tasks described above (each of which may illustratively be provided by an entity associated with the service provider environment 920), the tasks memory space 1080 may include any number of client-provided tasks 1090, which may correspond to executable code generated by a client device 902 and submitted to the service provider environment 920 for deployment to a coordinator 914. As such, functionalities provided by the client-provided tasks 1090 may vary according to the desires of a submitting user. In some instances, the client-provided tasks 1090 may be written in a coding language for which the memory 1050 includes a language runtime. For example, where the coordinator 914 supports language such as node.js, Go, JAVA, and Python, the client-provided tasks 290 may include executable code written in any of those languages.

In addition, the memory 1050 includes a configuration data portion 1052, representing a logical portion of the memory 1050 in which configuration data of the coordinator 914 is stored. The configuration data may include, for example, a current deployment version of the coordinator 914, data stored by the tasks of the task memory space 1080, or other data used in the operation of the coordinator 914.

To enable configuration (and reconfiguration) of the coordinator 914, the memory 1050 further includes a deployment agent 1058. The deployment agent 1058 can correspond to code executable to register a coordinator with the service provider environment 920, to determine a desired configuration of the coordinator 914, and in instances where a current configuration of the coordinator 914 does not match a desired configuration, to obtain configuration data for the coordinator 914 and modify the memory 1050 to implement the desired configuration.

Figure 11A:
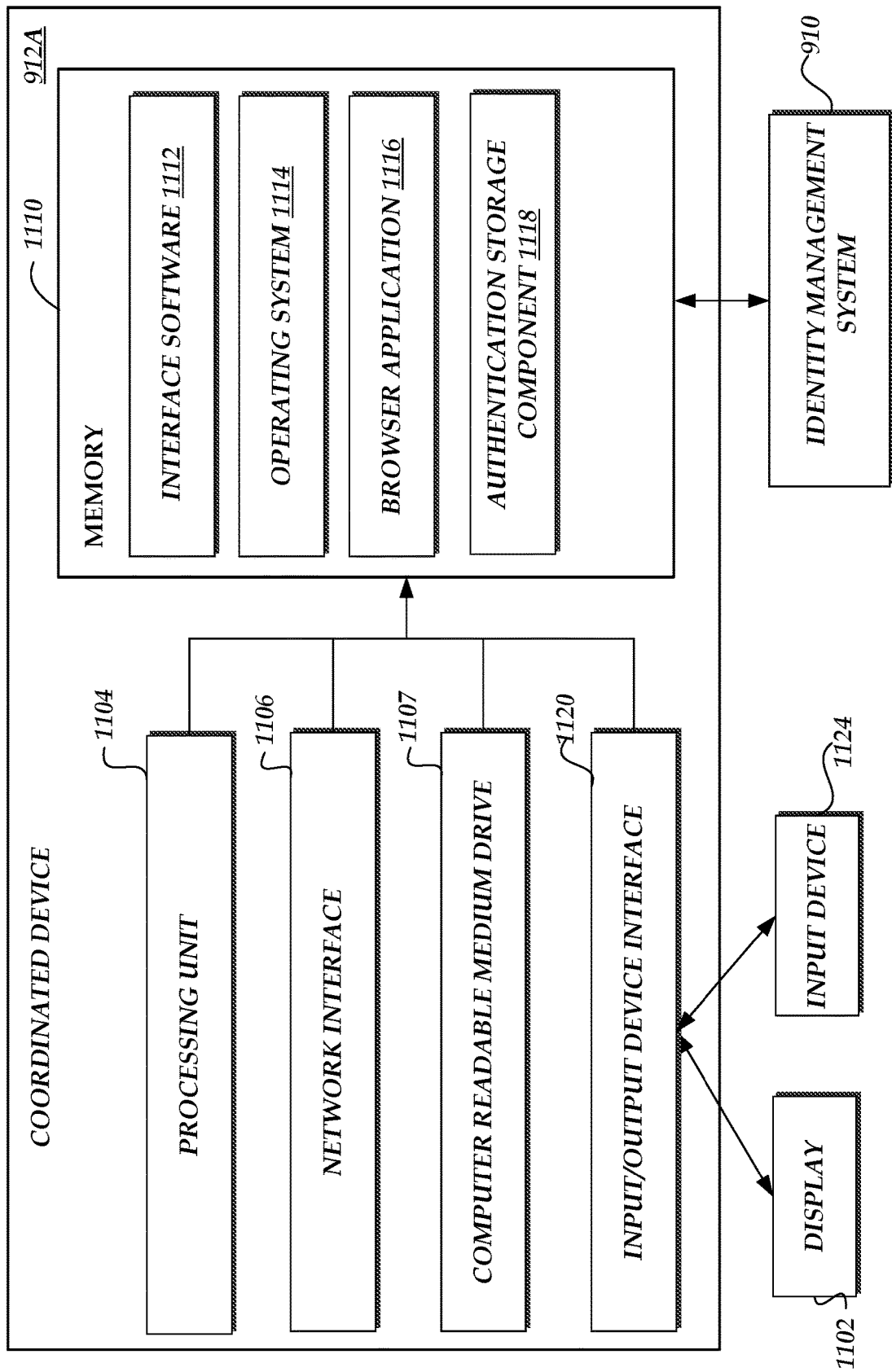
FIGS. 11A and 11B depict general architectures of coordinated devices managed by the coordinator of FIG. 9.

FIG. 11A depicts one embodiment of an architecture of an illustrative coordinated device 912A in accordance with the present application. The general architecture of the coordinated device 912A depicted in FIG. 11A includes an arrangement of computer hardware and software components that may be used to implement aspects of the present disclosure. As illustrated, the coordinated device 912A includes a processing unit 1104, a network interface 1106, a computer readable medium drive 1107, an input/output device interface 1120, an optional display 1102, and an input device 1124, all of which may communicate with one another by way of a communication bus. Illustratively, the coordinated device 912A may have more limited functionality and components, such as inputs or outputs, as embedded devices.

The network interface 1106 may provide connectivity to one or more networks or computing systems, such as the network 904 of FIG. 9. The processing unit 1104 may thus receive information and instructions from other computing systems or services via a network. The processing unit 1104 may also communicate to and from memory 1110 and further provide output information for an optional display 1102 via the input/output device interface 1120. The input/output device interface 1120 may also accept input from the optional input device 1124, such as a keyboard, mouse, digital pen, etc. In some embodiments, the coordinated device 912A may include more (or fewer) components than those shown in FIG. 11A. For example, some embodiments of the coordinated device 912 may omit the display 1102 and input device 1124, while providing input/output capabilities through one or more alternative communication channel (e.g., via the network interface 1106). Additionally, the coordinated device 912A may omit the input and output interface 1120 altogether as well.

The memory 1110 may include computer program instructions that the processing unit 1904 executes in order to implement one or more embodiments. The memory 1110 generally includes RAM, ROM or other persistent or non-transitory memory. The memory 1110 may store an operating system 1114 that provides computer program instructions for use by the processing unit 1104 in the general administration and operation of the coordinated device 912A. The memory 1110 may further include computer program instructions and other information for implementing aspects of the present disclosure. For example, in one embodiment, the memory 1110 includes a browser application 1116 for accessing content. Illustratively, the browser application 1116 may encompass a full software browser application, portions of a browser application or simply be a software application (or executable instructions) that provide for data connectivity.

Figure 11B:
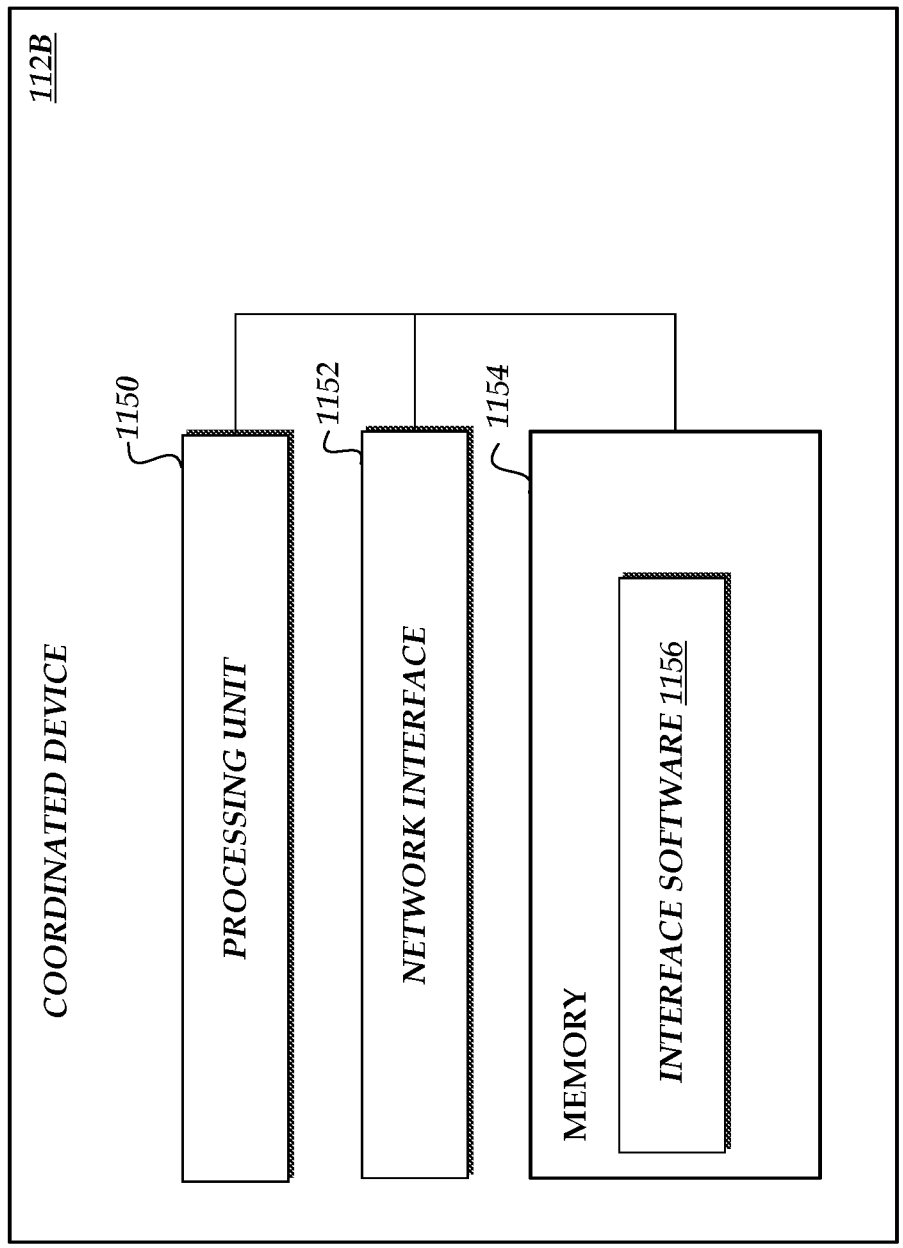

FIG. 11B depicts one embodiment of an alternative architecture of an illustrative coordinated device 912B in accordance with the present application. The general architecture of the coordinated device 912B depicted in FIG. 11B includes an arrangement of computer hardware and software components that may be used to implement aspects of the present disclosure. However, coordinated device 912B may be associated with a reduced of components that may limit the computing functionality and operation of the coordinated device 912B. As illustrated, the coordinated device 912B includes a processing unit 1150 and a network interface 1152 that communicate with a communication bus. Unlike coordinated device 912BA of FIG. 11A, the coordinated device 912B may not have a computer readable medium drive, an input/output device interface, an optional display, or an input device.

The network interface 1152 may provide connectivity to one or more networks or computing systems, such as the network 904 of FIG. 9. The processing unit 1150 may thus receive information and instructions from other computing systems or services via a network. The memory 1154 may include computer program instructions that the processing unit 1150 executes in order to implement one or more embodiments. The memory 1154 generally includes RAM, ROM or other persistent or non-transitory memory. In this embodiment, the memory 1154 may store necessarily store a full operating system that provides computer program instructions for use by the processing unit 1150 in the general administration and operation of the coordinated device 912B. Rather, in one embodiment, the memory 1154 includes an interface software component 1156 for accessing receiving and processing instructions.

Figure 12:
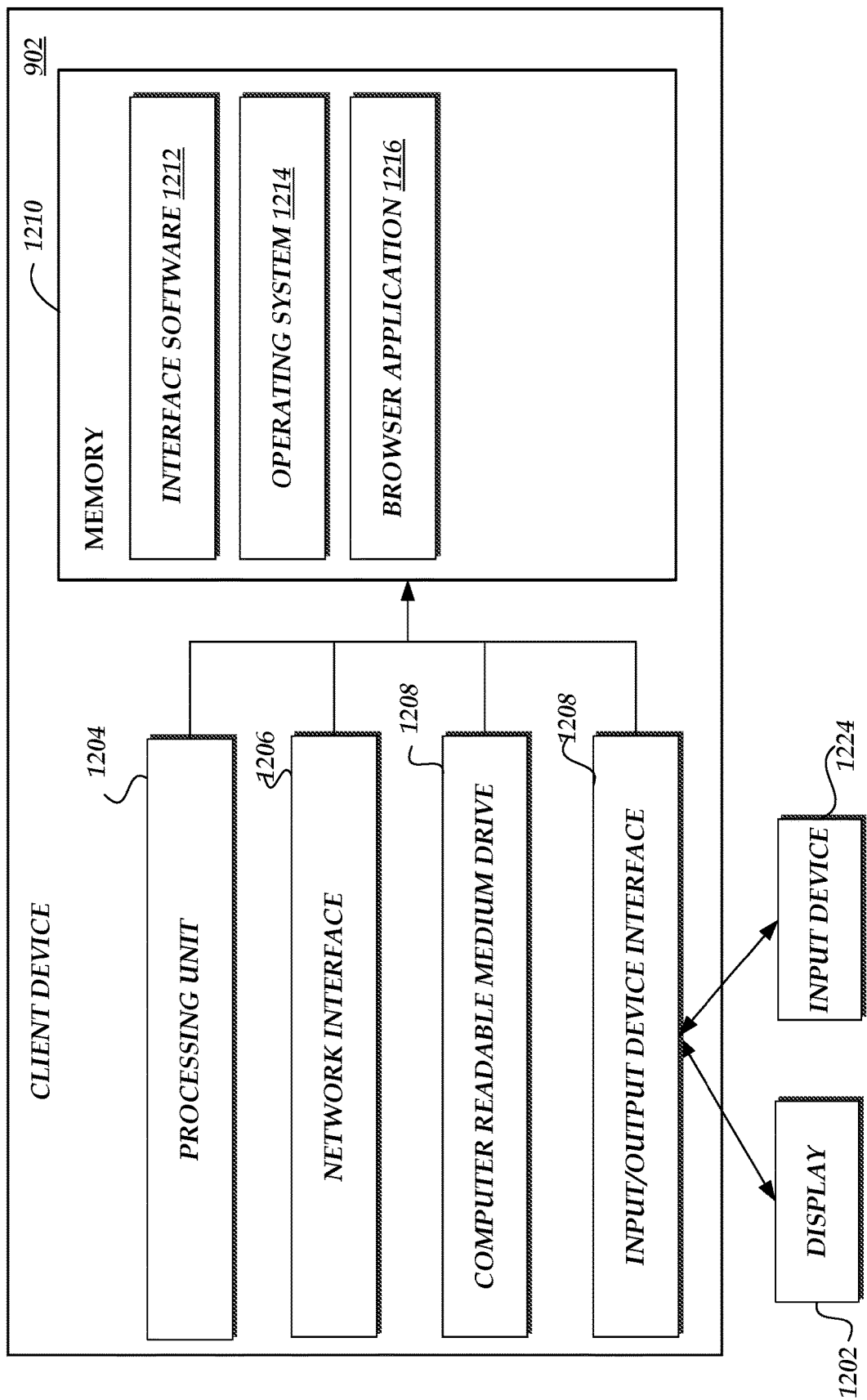
FIG. 12 depicts a general architecture of client device that may be utilized to generate and submit configuration information related to communication protocols.

FIG. 12 depicts one embodiment of an architecture of an illustrative client device 902 in accordance with the present application. The general architecture of the client device 902 depicted in FIG. 12 includes an arrangement of computer hardware and software components that may be used to implement aspects of the present disclosure. As illustrated, the client device 902 includes a processing unit 1204, a network interface 1206, a computer readable medium drive 1207, an input/output device interface 420, an optional display 1202, and an input device 1224, all of which may communicate with one another by way of a communication bus.

The network interface 1206 may provide connectivity to one or more networks or computing systems, such as the network 904 of FIG. 9. The processing unit 121204 may thus receive information and instructions from other computing systems or services via a network. The processing unit 121204 may also communicate to and from memory 1210 and further provide output information for an optional display 1202 via the input/output device interface 1220. The input/output device interface 420 may also accept input from the optional input device 1224, such as a keyboard, mouse, digital pen, etc. In some embodiments, the client device 902 may include more (or fewer) components than those shown in FIG. 12. For example, some embodiments of the coordinated device 912 may omit the display 1202 and input device 1224, while providing input/output capabilities through one or more alternative communication channel (e.g., via the network interface 1206). Additionally, the client device 902 may omit the input and output interface 420 altogether as well.

The memory 1210 may include computer program instructions that the processing unit 1904 executes in order to implement one or more embodiments. The memory 1210 generally includes RAM, ROM or other persistent or non-transitory memory. The memory 1210 may store an operating system 1214 that provides computer program instructions for use by the processing unit 121204 in the general administration and operation of the client device 902. The memory 1210 may further include computer program instructions and other information for implementing aspects of the present disclosure. For example, in one embodiment, the memory 1210 includes a browser application 1216 for accessing content. Illustratively, the browser application 1216 may encompass a full software browser application, portions of a browser application or simply be a software application (or executable instructions) that provide for data connectivity.

Figure 13:
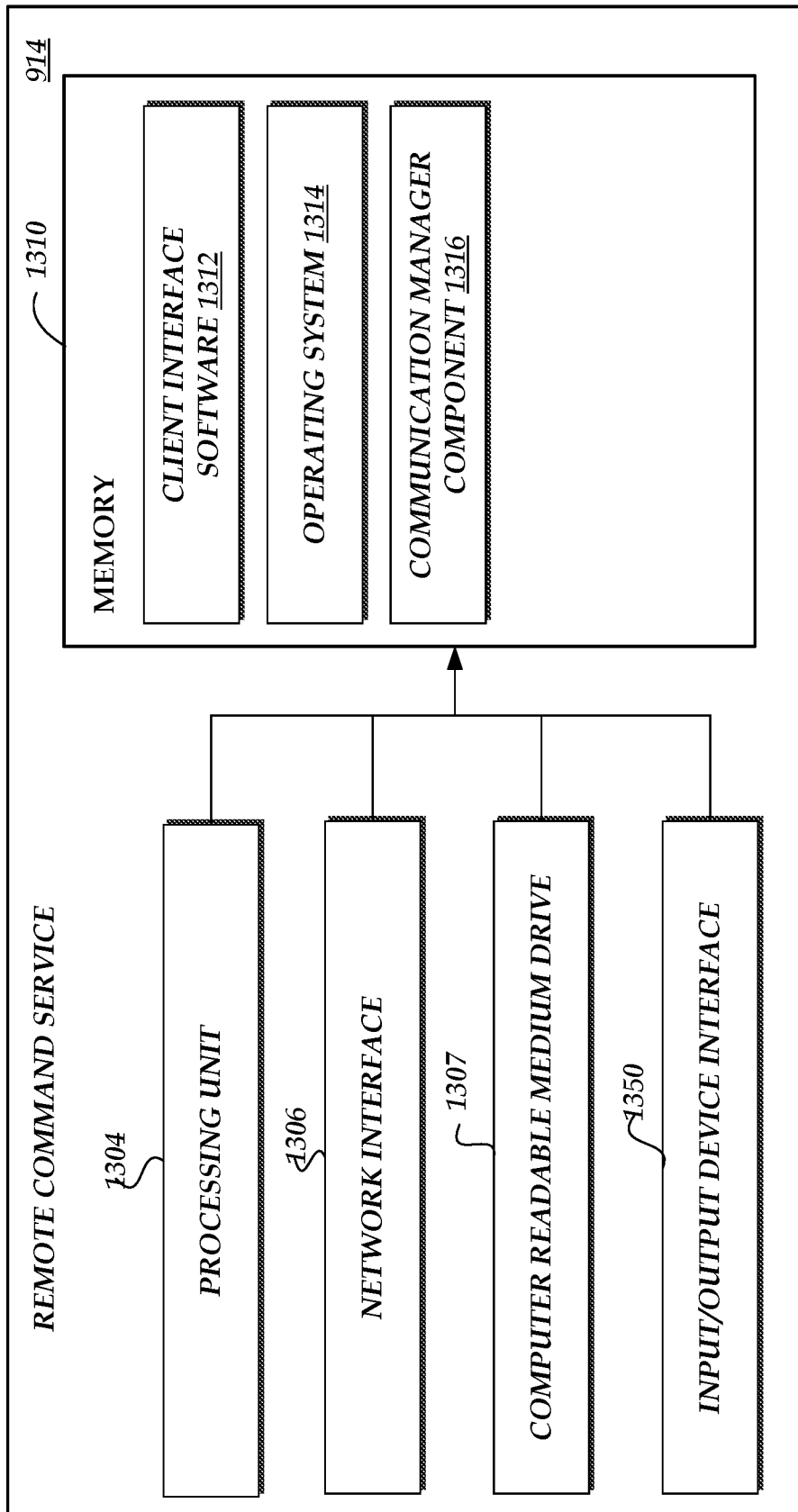
FIG. 13 is depicted a general architecture of a computing device that may be utilized to process communications sent in accordance with a messaging protocol and utilizing embedded codes.

FIG. 13 depicts one embodiment of an architecture of an illustrative computing device for implementing the message processing services component described herein. As previously described, one or more computing devices in the environment can function as a message processing services, such as MQTT broker. In other embodiments, the message processing services may be implemented in networking components. Accordingly, the general architecture of the message processing services depicted in FIG. 13 includes an arrangement of computer hardware and software components that may be used to implement aspects of the present disclosure. As illustrated, the remote command services 914 includes a processing unit 1304, a network interface 1306, a computer readable medium drive 1307, an input/output device interface 520, an optional display 1302, and an input device 1324, all of which may communicate with one another by way of a communication bus. The components of the remote command services 914 may be physical hardware components or implemented in a virtualized environment.

The network interface 1306 may provide connectivity to one or more networks or computing systems, such as the network 950 of FIG. 9. The processing unit 1304 may thus receive information and instructions from other computing systems or services via a network. The processing unit 1304 may also communicate to and from memory 1310 and further provide output information for an optional display 1302 via the input/output device interface 520. The input/output device interface 520 may also accept input from the optional input device 524, such as a keyboard, mouse, digital pen, etc. In some embodiments, the remote command services 914 may include more (or fewer) components than those shown in FIG. 13. For example, some embodiments of the remote command services 914 may omit the display 1302 and input device 1324, while providing input/output capabilities through one or more alternative communication channel (e.g., via the network interface 1306).

The memory 1310 may include computer program instructions that the processing unit 1304 executes in order to implement one or more embodiments. The memory 1310 generally includes RAM, ROM or other persistent or non-transitory memory. The memory 1310 may store an operating system 13141314 that provides computer program instructions for use by the processing unit 1304 in the general administration and operation of the intermediary server 914. The memory 1310 may further include computer program instructions and other information for implementing aspects of the present disclosure. For example, in one embodiment, the memory 1310 includes client interface software 1312 for receiving and processing content requests from client devices 902. Additionally, the memory 1310 includes a communication manager component 1316 for processing received communications. Illustratively, the communication manager 1316 can translate messages associated with a specific topic such that they are directed to a topic subscribed to by a smaller subset of devices.

Turning now to FIGS. 14A-14D, illustrative interactions between the components of the content management system 910 to process content messages will be described. More specifically, FIGS. 14A-14D will be described with regard to interactions between coordinated devices 912, a client device 902 and a message processing service. As previously indicated, the message processing service can be implemented by a variety of devices including the coordinator 914 or other network equipment. Additionally, the coordinated devices 912 can correspond to the coordinated devices 912 (FIG. 11A), coordinated devices 912 (FIG. 11B) or combinations thereof. However, reference to interactions should not be limited to any particular device or combination of devices, even if used for illustrative purposes.

Figure 14A:
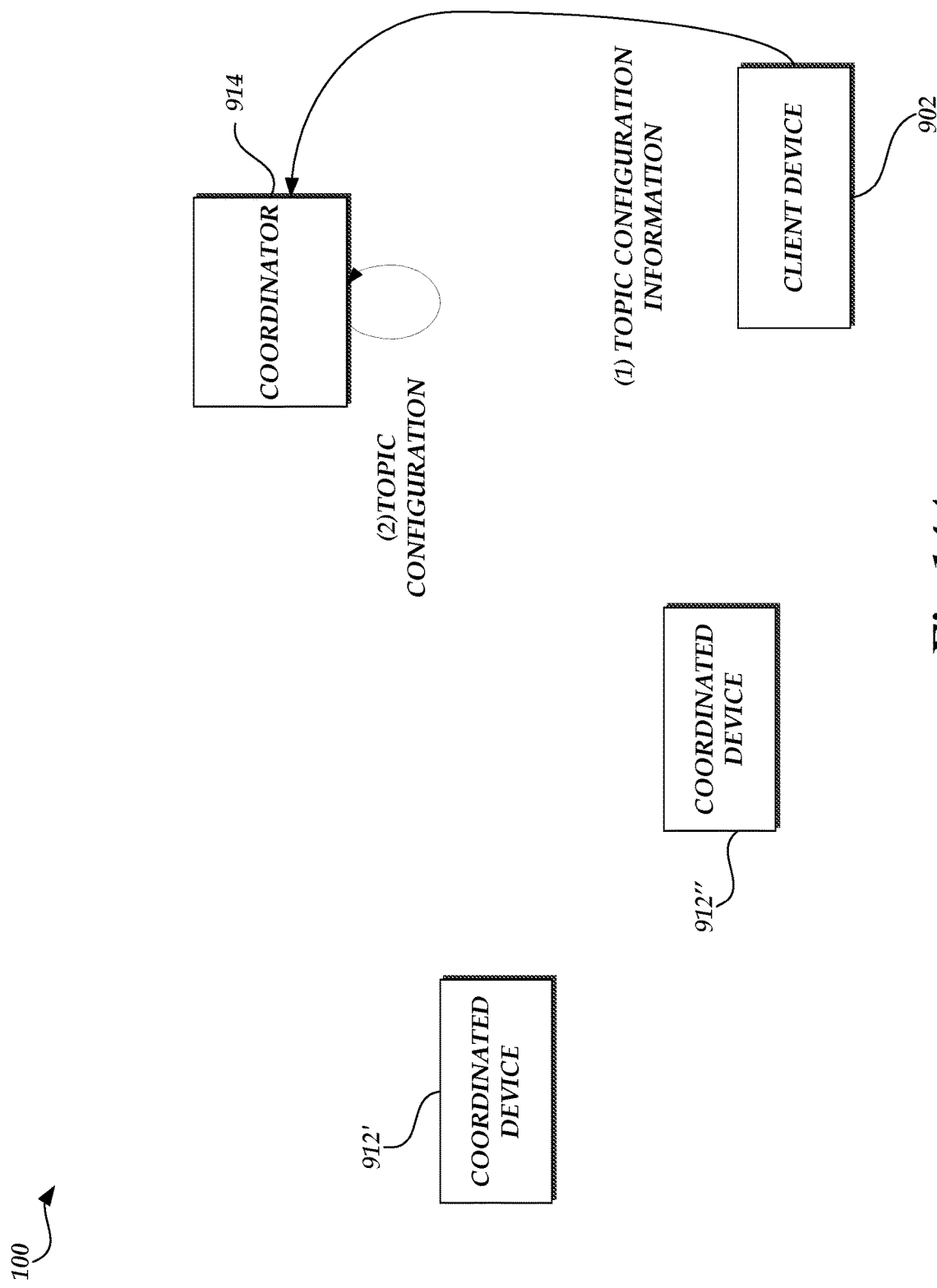
FIGS. 14A-14D are block diagrams of the illustrative environment of FIG. 9 depicting illustrative interactions for exchanging communications in accordance with a messaging protocol utilizing embedded codes.

With reference to FIG. 14A, the initial configuration of a message processing service will be described. Illustratively, a client or system administrator configures the message processing service with information that facilitates the interpretation of received communications. In one embodiment, the message processing service can be implemented by the service provider environment 920 to provide communications to one of several potential coordinated environments 910. In another embodiment, the message processing service can be implemented by the coordinator 914 to provide communications to one of several coordinated devices 912. Accordingly, FIGS. 14A-14D should not be limited to implementation solely on either embodiments or other variations. However, for purposes of illustration, FIGS. 14A-14D will be described with regard to interactions between a coordinator 914 and a set of coordinated devices.

In accordance with an illustrative embodiment, the communications can be formed in accordance with the MQTT messaging protocol, regardless of the actual communication protocol that is utilized to transmit the message across the communication network 904. Specific to the MQTT protocol, each message is associated with a topic portion that has one or more grouping of words defining or otherwise associated with the communication. Each separable grouping of words can be generally referred to as a level and a topic portion may have multiple levels. An example below includes a first level, "base level", followed by a series of additional levels, "level 1"-"level n." Each level is delineated by a topic separator.

base level/level 1/level 2/level 3 . . . /level n

As previously described, in the traditional MQTT protocol, a message coordinator 914 receiving a message will attempt to match the topic with one or more recipient devices that have registered to receive messages published by topic. For example, the message coordinator 914 will look for the one or more topic portions of the message to match (entirely or partially) with the topic registrations. The coordinator 914 message processing service can limit a determination to an exact matching of all levels or partial matching of one or more levels.

With reference now to FIG. 14A14A, at (1), a client device 902 corresponding to an administrator or customer can transmit configuration information to the coordinator 914. Illustratively, the configuration information corresponds to one or more instructions, logical rules, or processing steps that define a set of actions the coordinator 914 message processing service can take on a message based on matching the topic portion of a received message, the source of the message and the like. For example, one configuration of the coordinator 914 message processing service can include a definition of whether communications corresponding to an assigned task should be implemented by specific coordinated devices 912. In this example, a set of coordinated devices 912 may be subscribed to receive content messages with a corresponding topic, but which device receives the message may depend on the evaluation of the rules identified by the coordinator 914.

In another example, the coordinator 914 may be configured to obtain additional information, such as cost information, routing information, workload, service level information, security information and the like based on processing the received messages. In this regard, the coordinator 914 message processing service in traditional implementations of messaging protocols does not conduct any additional processing of the received messages or may require additional external network communications or components to make routing decisions. Additionally, in accordance with the present application, the coordinator 914 can be configured with a wide variety of additional routing and selection functionality as specified by the administrator via the client device 902. Although illustrated as a direct communication to configure the coordinator 914, in some embodiments, the client computing device 902 would interact indirectly with the coordinator 914 via the message processing system 920.

At (2), the coordinator 914 processes the configuration information and stores the configuration for subsequent processing. In this regard, the coordinator 914 can maintain routing and selection information for use in determining how received messages should be published to potential recipients. Illustratively, the stored configuration information can be in the form of business rules, logical rules or routing tables that allow the coordinator 914 to obtain a set of inputs or information, evaluate the set of inputs based on the rules or logic and determine a subset or finite set of potential recipients that should receive the publish messages. In this regard, the evaluation of the rules or logic facilitate excluding or withholding publication of messages to a different subset of potential recipients or validates that all potential recipients should receive the message. In other embodiments, the coordinator 914 can obtain the additional instructions or executable code utilizing an interface, such as an API, at the time that the information is processed. For example, the coordinator 914 can access third party security service providers that can facilitate the configuration of the coordinator 914 or provide information utilized by the coordinator 914 to evaluate the published messages.

Figure 14B:
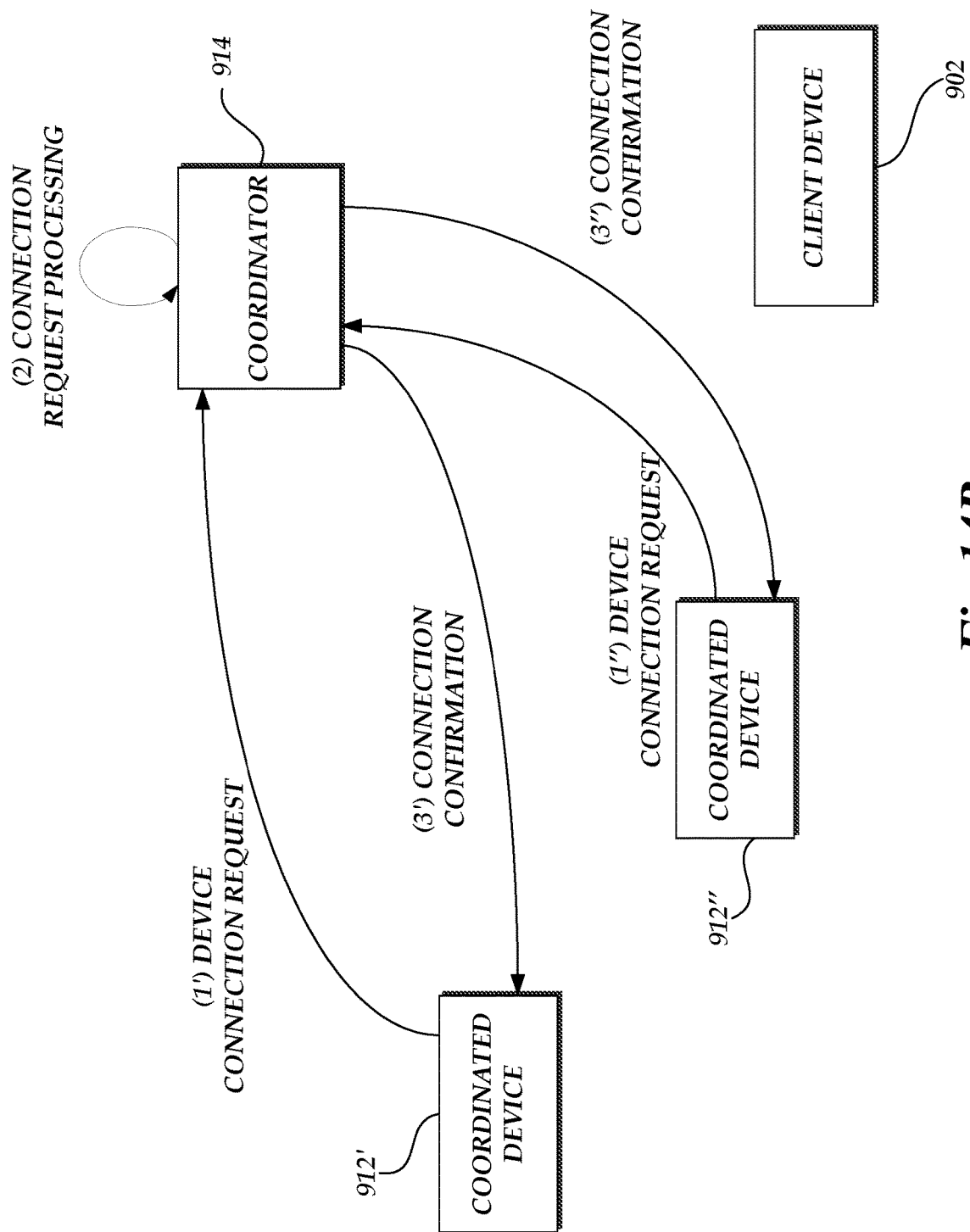

With reference to FIG. 14B, the initial configuration of recipient devices, coordinated devices 912' and 912'' will be described. At (1), the coordinated devices 912' and 912'' generate a device connection request and transmit the request to the coordinator 914. Illustratively, the device connection request corresponds to establish procedures associated with the authentication and authorization of the coordinated devices 912' and 912'' with the coordinator 914. Still further, in some embodiments, the logical network 100 can include additional gateway components that independently, or as part of the content management system 910, manage the transmission of the messages to the coordinator 914. Such gateway components can implement security functionality, load balancing or other network processing services.

At (2), the coordinator 914 processes the connection request such as by validating security information, requesting additional information or determining the characteristics of the requesting client computing device 902. At (3), if the connection request is acceptable and authorized, the message processing services 1400 transmits a connection confirmation to the requesting coordinator 914. In this regarding, once authorized, the coordinating devices 912 and 912' and coordinator 914 can begin communication within the procedures defined in a messaging protocol, such as MQTT. Additionally, the coordinating devices 912 and 912' can provide additional security information that facilitates the routing processes described above.

Figure 14C:
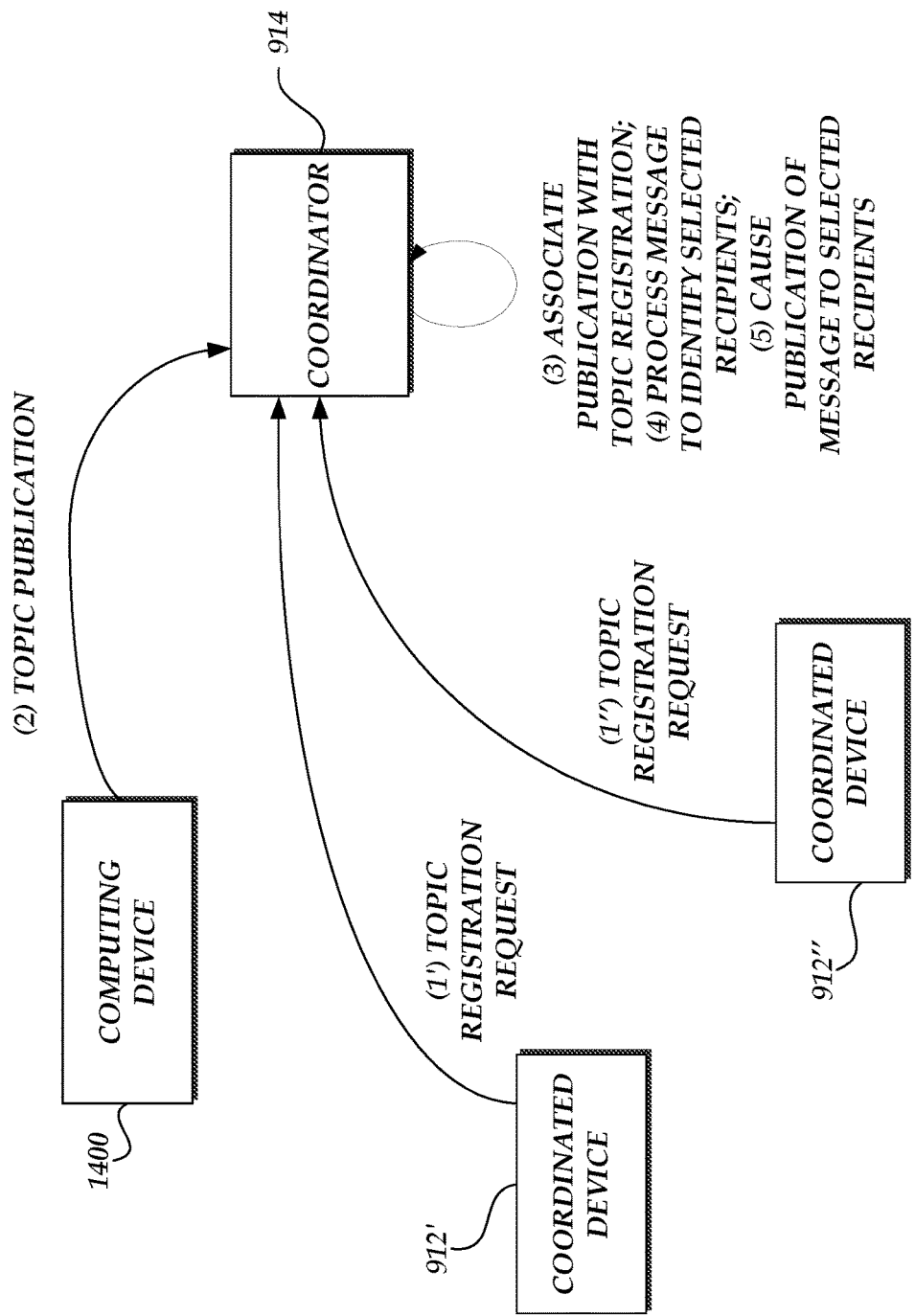
Figure 14D:
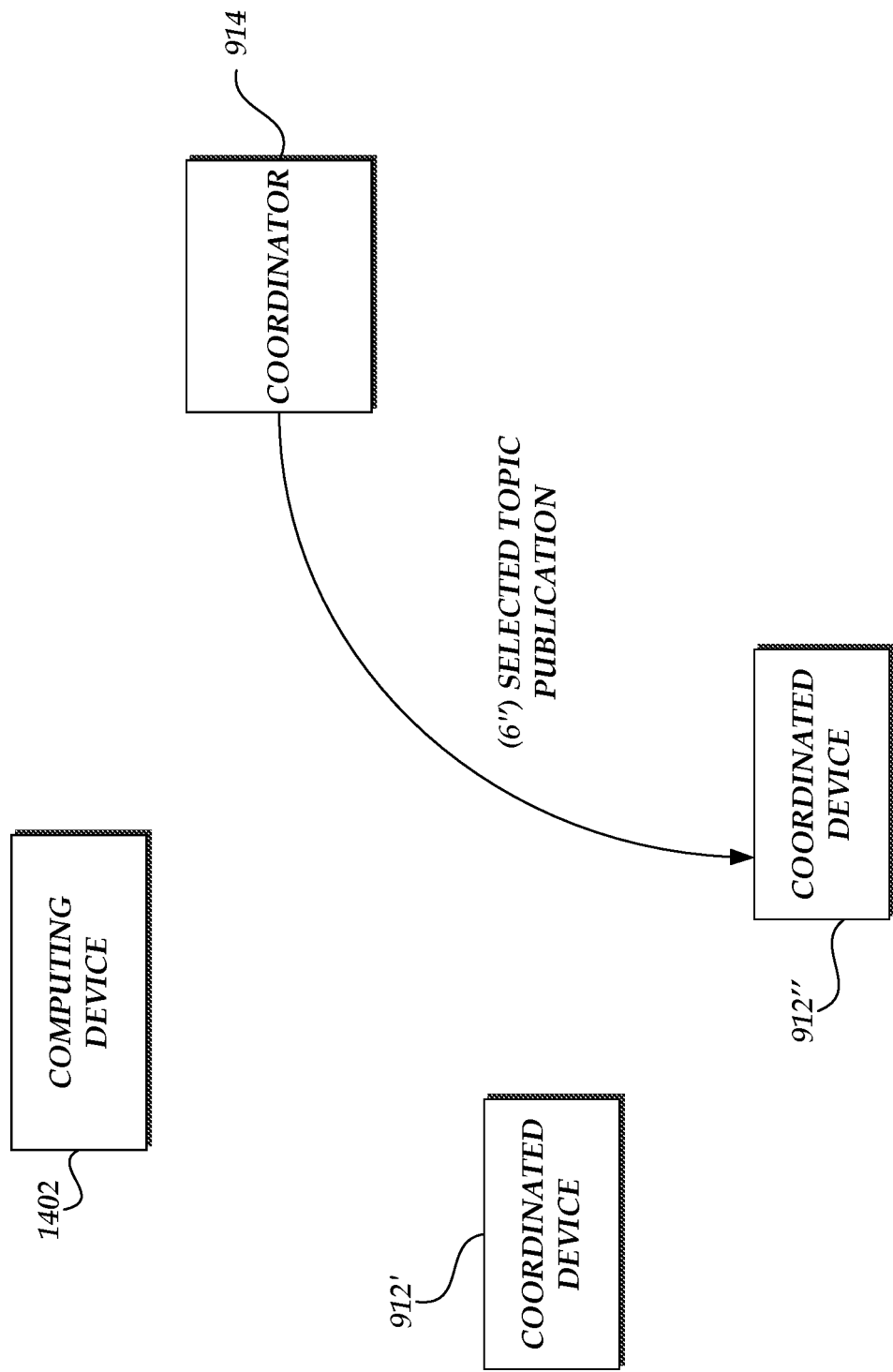

With reference now to FIG. 14C, after receiving the connection confirmation, at (1), the coordinated devices 912' and 912'' transmit one or more topic registration requests to the coordinator 914. Illustratively, the topic registration is defined in accordance with the messaging protocol such that the coordinated devices 912' and 912'' can register to receive content published according to specific topics by any number of content providers. As applied to the present application, the coordinated devices 912' and 912'' register for one or more topics. For purposes of illustration, examples will be provide such that the forwarding of message to the registered coordinated devices 912' and 912'' will be different based on embedded codes in the messages.

At some point after registration, at (2), a separate computing device 1402 publishes one or more pieces content to the coordinator 914. Illustratively, the coordinator 914 can receive the messages can correspond to communications transmitted from the service provider environment 920. Each published piece of content is associated with a topic. For purpose of an illustrative example, at least one published content is associated with a topic portion of the content/message that corresponds to the topic registered by the coordinated devices 912 and 912' with the coordinator 914. In this regard, the message can include one or more levels in the topic portion that can be utilized to match received messages with registered coordinating devices.

At (3), the coordinator 914 matches the registered topics with the published topics to determine that the coordinated devices should receive. In this regard, the coordinator 914 can determine the set of coordinated devices 912 that have registered to receive the message. One skilled in the relevant art will appreciate that in traditional implementations of the MQTT messaging protocol, or other messaging protocols, the coordinator 914 would send the received messages to all registered coordinated devices. At (4), the coordinator 914 processes the topic portion of the communication to identify one or more coordinated devices from the identified set of registered coordinated devices that should receive the published message. In some embodiments, the coordinator 914 can include functionality to process the topic portion, such as communication manager component 260. In other embodiments, the coordinator 914 can utilize additional services or components to facilitate the parsing. More specifically, the coordinator 914 can utilize various business rules or routing tables to identify a subset of registered coordinated devices 912 that will receive the message. Accordingly, the coordinator 914 can evaluate the business rules or routing tables to identify which of the registered coordinated devices 912 that will not receive the published message.

At (5), the coordinator 914 message processing service and can cause the message to be directed to the selected subset of registered devices. In one embodiment, the coordinator 914 can be configured to transmit messages directly to the selected, registered devices. In this embodiment, the coordinator 914 can utilize the same messaging protocol or a different communication protocol as specified in the business rules or logic. In another embodiment, the coordinator 914 can associate one or more secondary topic publications that would be applicable or match the selected, registered devices. In this embodiment, the secondary topic publications would not be registered for the non-selected devices, such as secondary topic publications for individual devices. For purposes of illustration of utilizing secondary topic publications, with reference to FIG. 14D14D, at (6), the message processing service can cause the forwarding of the message to coordinate device 912'' and not coordinated device 912'912. Additionally, in some embodiments, the coordinator 914 can select a coordinated device 912 that may not have registered to receive messages according to the original topic, but that is nonetheless selected by the coordinator 914.

Figure 15:
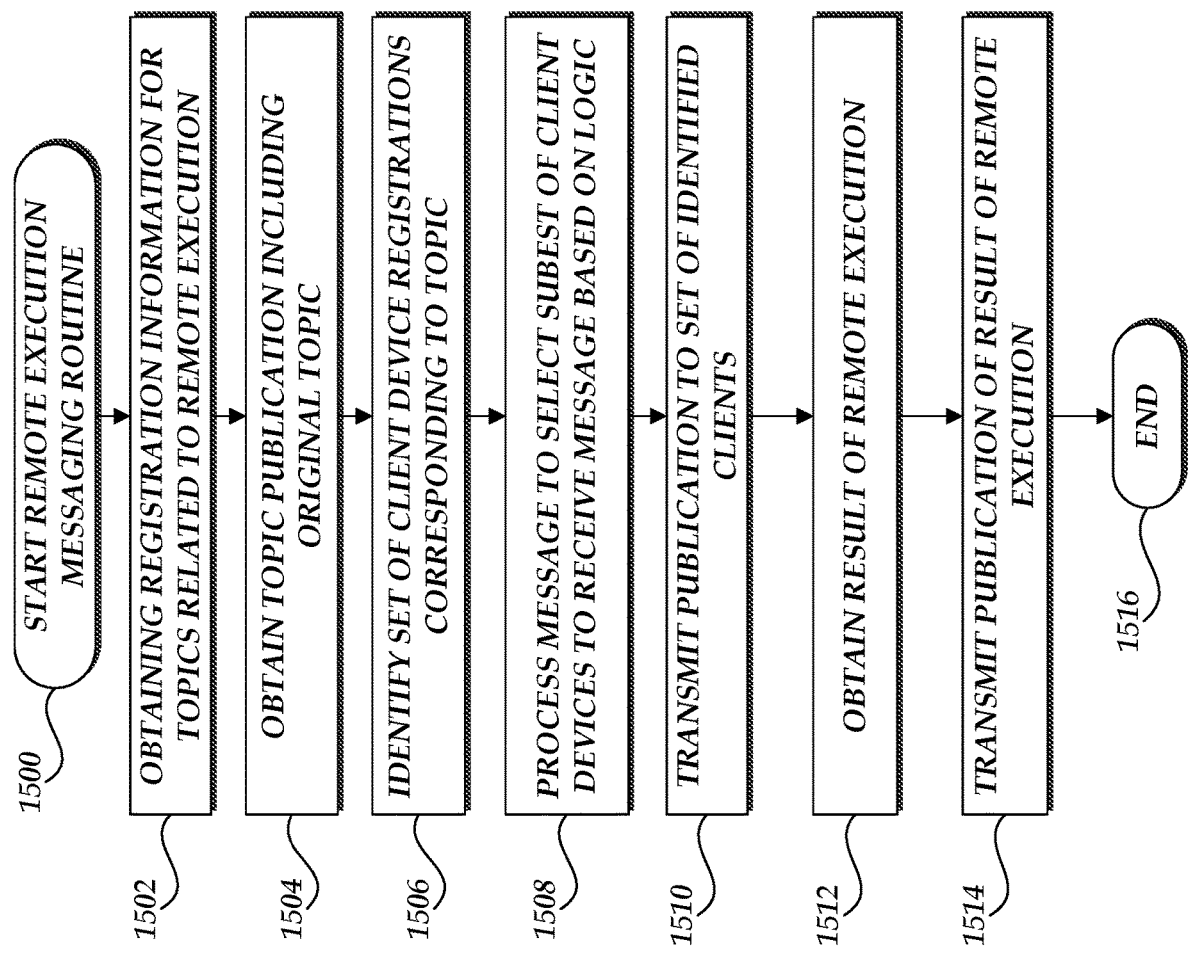
FIG. 15 is a flow diagram illustrative of a remote execution messaging routine implemented by a message processing service component in accordance with an illustrative embodiment.

FIG. 15 is a flow diagram illustrative of a remote execution messaging routine 1500 implemented by a message processing service in accordance with an illustrative embodiment. Routine 1500 illustrates the utilization of business rules, routing tables or other logical information in a messaging protocol during the message routing. At block 1502, the message processing service obtains registration information including at least one topic related to the remote execution of content by a device, such as a coordinated device 912 or any other computing device 902 As described previous, the devices transmit one or more topic registration requests to the message processing service. Illustratively, the topic registration is defined in accordance with the messaging protocol such that the device can register to receive content published according to specific topics by any number of content providers. As previously specified, the topic registrations can correspond to individual devices or a set of devices.

At some point after registration, at block 1504, the message processing service obtains one or more publications having a topic portion. Illustratively, some computing device 1402 (FIG. 14C14C) publishes one or more pieces content to the message processing service. Each published piece of content is associated with a topic. For purpose of an illustrative example, at least one published content is associated with an embedded code that corresponds to a registered topic of the client computing devices 902. Additionally, the published piece of content associated with the topic includes a payload portion of content. Examples of such payload portions can include tasks to be executed by a coordinated device or network device.

At block 1506, the message processing service matches the registered topics with the published topics to determine that one or more devices should receive the published content with the topic to form the set of client devices that should receive the published topic. Illustratively, since the message processing service is configured in accordance with the messaging protocol, such as MQTT, matching registrations to topic publication can be accomplished in the manner dictated by the messaging protocol. Illustratively, the matching of the topic portion can correspond to a matching of all levels of the topic portion or a partial matching of at least one level. Still further, the matching can correspond to a matching of a base level, while other levels may be ignored or utilized for secondary matching.

At block 1508, the coordinator 914 processes the topic portion to select a subset of devices that should receive the message. In some embodiments, the message processing service can include functionality, such as business rules, routing tables, logical rules, and the like to select the subset of registered devices. In one aspect, the coordinator 914 can evaluate business rules or routing table that identifies the subset of coordinated devices 912 that should receive the received messages. Illustratively, the business rules or routing tables can incorporate information such as source address of the originator, identification information in one or more levels of the topic portion, security configuration information of the identified recipient devices 912, timestamp information, utilization information regarding the coordinated devices, financial cost information and the like. In other examples, the business rules can include random selection or a weighted selection algorithm if one or more recipient devices 912 may otherwise be eligible or available to receive the message. For example, the coordinator 914 can be configured with business rules that associate a source identifier, such as the network address of the source of the message with one or more selected recipient devices 912. In another example, the coordinator 914 can be configured with security specification information that determines a minimum security configuration or specifies a type of security specification for a received message. In this example, the coordinator 914 can then utilize the security information of one or more registered security devices and determine which of the recipient device satisfies the specified security specifications. In still a further example, the coordinator 914 can configured with a white list that identifies all available recipient devices based on a time of day, type of message, or other information or a black list the identifies one or more recipient devices that should be excluded.

In other aspects, the coordinator 914 can receive information from the individual coordinated devices 912 that indicate their availability to receive the message or otherwise provide some of the above-identified information. In other embodiments, the message processing service can utilize additional services or components to facilitate the processing. Additionally, at block 1508, the message processing service then selects a secondary topic that has been associated with the selected recipient devices and not with the non-selected recipient devices.

At block 1510, the coordinator 914 transmits the published content in accordance with the selection of the subset of the topic. Similarly, the transmittal of the published content is done in accordance with the procedures and capabilities of the messaging protocol, such as MQTT, and does not require additional or alternative communications to cause the transmission of the executable code. In other example, the message processing service can utilize a separate transport protocol. The recipient devices process the received published content. In still other examples, the coordinator 914 can utilize one or more secondary topic publications that will cause the message to be published to the selected subset of coordinated devices 912.

At block 1512, the message processing service obtains processing results corresponding to the processing of the message. Illustratively, the client computing devices generates and publishes, via the messaging protocol, content related to information indicative of the processing results of the code. In some embodiments, the processing result can correspond to a binary determination of whether the execution of the code was successfully carried out. In another embodiment, the processing result can include one or more values indicative of the execution of the code/instruction or a log detailing information about the execution of the code/instructions. In a manner similar to that described with the publication of update topics, the publication of the processing result(s) can be associated with a particular topic, generally referred to as "processing result topic."

At block 1514, the message processing service matches the registered topics with the published topics to determine that the admin device 904 should receive the published content with the processing result topic and transmits the published content. Illustratively, the transmittal of the published content is also done in accordance with the procedures and capabilities of the messaging protocol, such as MQTT, and does not require additional or alternative communications to cause the transmission of the executable code. At block 1516, the routine 1500 terminates.

Figure 16:
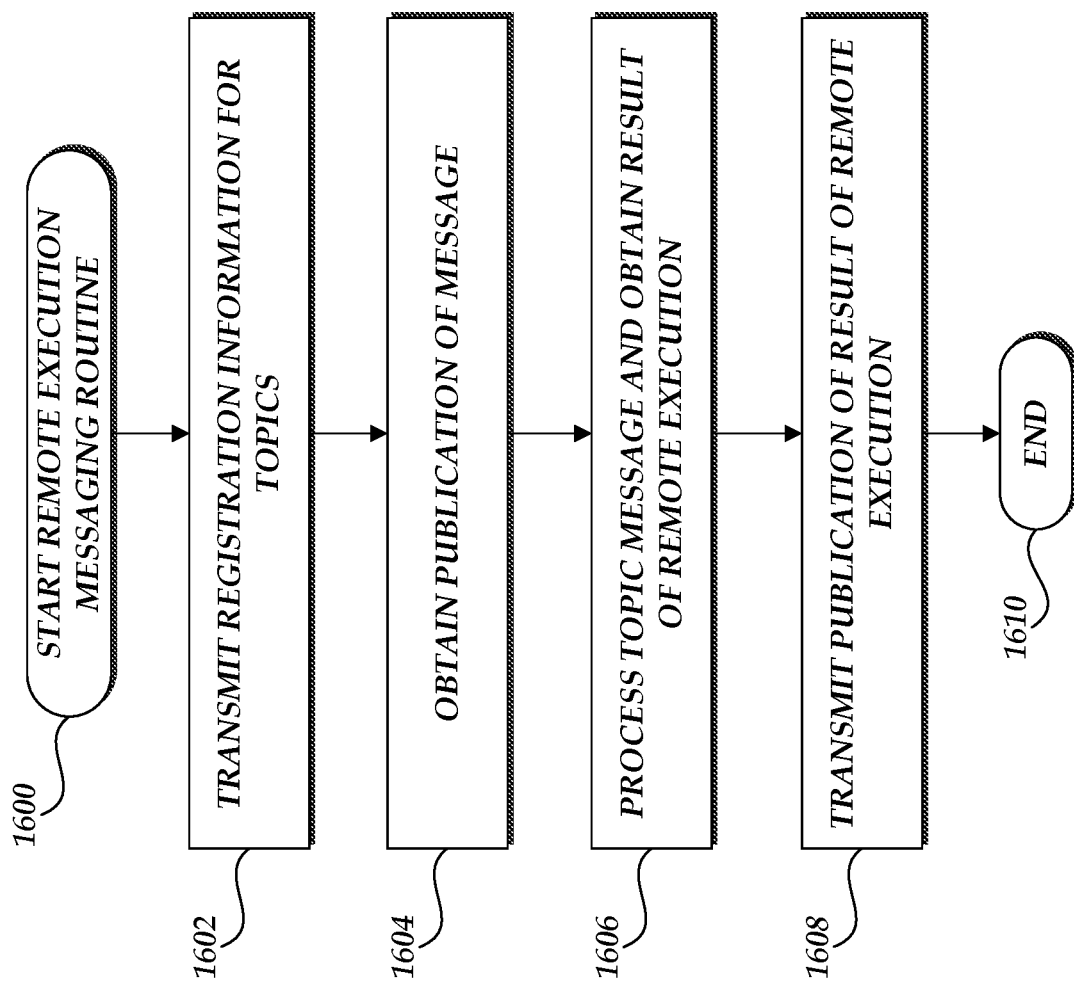
FIG. 16 is a flow diagram illustrative of a remote execution messaging routine implemented by a client computing device or coordinated device in accordance with an illustrative embodiment.

FIG. 16 is a flow diagram illustrative of a remote execution messaging routine 1600 implemented by a coordinated device 912 or other computing device in accordance with an illustrative embodiment. As previously described, in this application, the coordinated device 912 or other computing device can be considered as a message processing service to utilize embedded code information in the processing of messages independent of whether other components also utilized the embedded code information in routing of messages. The identification of a coordinated device 912 in this example, however, should not be construed as limiting for the application of routine 1600. At block 1602, the coordinated device 912 transmits one or more topic registration requests to the message processing services 1400. As described above, the topic registration is defined in accordance with the messaging protocol such that the coordinated device 912 can register to receive content published according to specific topics by any number of content providers.

In response to receiving published content, the message processing services 1400 matches the registered topics with the published topics to determine that the client coordinated device 912 should receive the published content. As previously described, the message processing service processes content with an original registration and then forwards the message to the selected coordinated device 912. At block 1604, the coordinated device 912 receives published content from the coordinator 9141400. Illustratively, the transmittal of the published content is done in accordance with the procedures and capabilities of the messaging protocol, such as MQTT, and does not require additional or alternative communications to cause the transmission of the executable code.

As part of the execution of the execution of content or after the execution of content, at block 1606, the coordinated device 912 processes embedded code and obtains the results of the remote execution. In some embodiments, the processing result can correspond to a binary determination of whether the execution of the code was successfully carried out. In another embodiment, the processing result can include one or more values indicative of the execution of the code/instruction or a log detailing information about the execution of the code/instructions.

At block 1608, the coordinated device 912 publishes, via the messaging protocol, content related to information indicative of the processing results of the code. Illustratively, the transmittal of the published content is done in accordance with the procedures and capabilities of the messaging protocol, such as MQTT, and does not require additional or alternative communications to cause the transmission of the executable code. At block 1610, the routine 1600 terminates.

Figure 17:
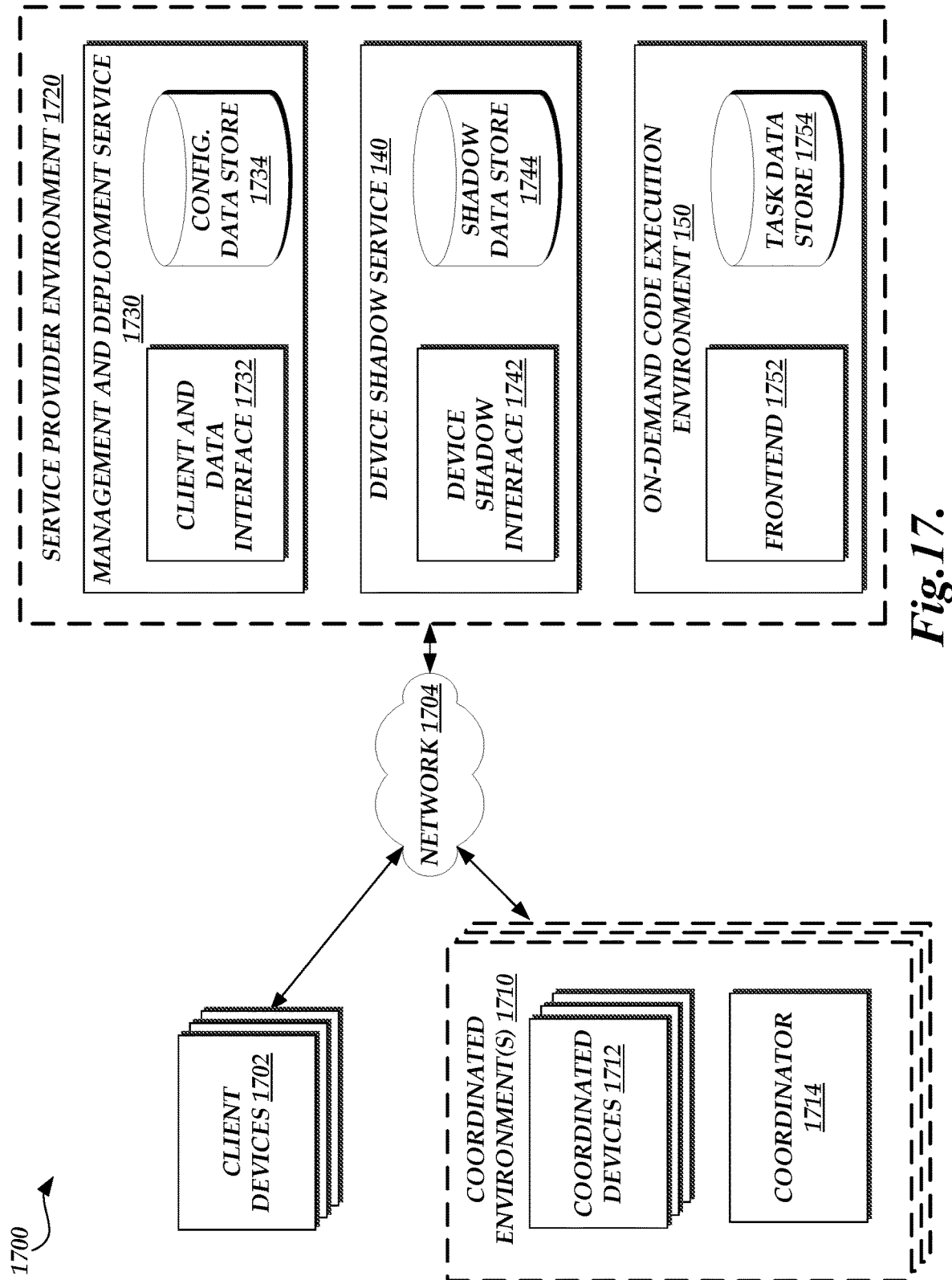
FIG. 17 is a block diagram depicting an illustrative environment in which a coordinator can operate to locally manage and coordinate operation of coordinated devices within a coordinated environment, and wherein the coordinator may communicate with client devices and a service provider environment to modify operation of the coordinator.

FIG. 17 is a block diagram of an illustrative operating environment 100, including one or more coordinated environments 1710 in which a coordinator 1714 may operate to control coordinated devices 1712, as well client devices 1702 that may interact with the coordinated environments 1710 (e.g., to request a change in state of a coordinated device 1712), and a service provider environment 1720 that may assist in communications with or configuration of the coordinators 1714 in various coordinated environments 1710.

The coordinated environments 1710, client devices, and service provider environment 1720 may communicate via a network 1704, which may include any wired network, wireless network, or combination thereof. For example, the network 1704 may be a personal area network, local area network, wide area network, over-the-air broadcast network (e.g., for radio or television), cable network, satellite network, cellular telephone network, or combination thereof. As a further example, the network 1704 may be a publicly accessible network of linked networks, possibly operated by various distinct parties, such as the Internet. In some embodiments, the network 1704 may be a private or semi-private network, such as a corporate or university intranet. The network 1704 may include one or more wireless networks, such as a Global System for Mobile Communications (GSM) network, a Code Division Multiple Access (CDMA) network, a Long Term Evolution (LTE) network, or any other type of wireless network. The network 1704 can use protocols and components for communicating via the Internet or any of the other aforementioned types of networks. For example, the protocols used by the network 1704 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein. Although all of the components of the network 1704 are illustrated in FIG. 17, one or more of the components, such as routers may function as a message processing service.

Each coordinated environment 1710 may include a coordinator 1714 and any number of coordinated devices 1712, in communication via a network of the execution environment 1710 (which network is not shown in FIG. 17). Because of their association within the coordinated environment 1710, the coordinated devices 1712 and coordinator 1714 within a given environment 1710 may be considered "local" to one another, in terms of communications network. For example, the coordinated devices 1712 and coordinator 1714 within a given environment 1710 may be connected via a LAN or other localized communication network.

Each coordinated device 1712 can correspond to a computing device configured to communicate with the coordinator 1714 to manage functionality of the coordinated device 1712. In some instances, coordinated devices 1712 can correspond to fully featured computing devices, such as laptops, desktops, standalone media players, etc., with robust localized user interface capabilities. In other instances, coordinated devices 1712 can correspond to thin devices or embedded devices associated with another primary function, such as an device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 1712 may include limited local user interfaces, and be configured for remote management. In some instances, coordinated devices 1712 may be stateful, and operate to alter their state in response to instructions (e.g., by turning from "off" to "on," etc.).

As described in more detail below (e.g., with respect to FIG. 18), the coordinator 1714 can correspond to a computing device executing instructions to coordinate, manage, or control operation of the coordinated devices 1712, without requiring that instructions transmitted to the coordinated devices 1712 travel outside the coordinated environments 1710 (thus increase the security of such instructions and increasing the speed of their transmission). Specifically, the coordinator 1714 can include a processor and memory collectively configured to manage communications between any combination of coordinated devices 1712, client devices 1702, and devices of the service provider network 1720. The coordinator can further be configured to enable executions of tasks, in a manner similar to an on-demand code execution environment 1720 of the service provider environment 1720. These tasks may implement a variety of user-defined or non-user-defined functionalities, including communicating with coordinated devices 1712, client devices 1702, and devices of the service provider network 1720. As such, the coordinator 1714 can be configured to allow for manual, automatic, or semi-automatic control of coordinated devices 1712. For example, the coordinator 1714 may enable a client device 1702 to transmit a request to change the state of a coordinated device 1712, and cause such a change in state to occur. As a further example, the coordinator 1714 may enable a user to specify a criterion under which a state of a coordinated device 1712 should be changed, and then automatically operate to change the state of the coordinated device 1712 when the criterion is satisfied. As will be discussed below, many functions of the coordinator 1714 may be established via tasks, enabling rapid alteration of these functions as desired by a user.

Client devices 1702 may include a variety of computing devices enabling a user to communicate with the coordinated environments 1710, the service provider environment 1720, or both. In general, the client devices 1702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The service provider environment 1720 may provide the client devices 1702 with one or more user interfaces, command-line interfaces (CLI), application programming interfaces (API), and/or other programmatic interfaces for interacting with the service provider environment 1720, such as to submit a configuration for a coordinator 1714, and control deployment of that configuration, to submit code corresponding to a task to be executed on the coordinator 1714 or an on-demand code execution environment 1750 of the service provider environment 1720, to view logging or monitoring information related to coordinators 1714, etc. Similarly, the coordinator 1714 may provide the client devices 1702 with one or more user interfaces, command-line interfaces (CLI), application programming interfaces (API), and/or other programmatic interfaces for interacting with the coordinator 1714, such as to read a state of a coordinated device 1712, request a change in state of a coordinated device 1712, request that the coordinator 1714 cause execution of a task, etc. Although one or more embodiments may be described herein as using a user interface, it should be appreciated that such embodiments may, additionally or alternatively, use any CLIs, APIs, or other programmatic interfaces.

The service provider environment 1720 can include a number of elements to enable configuration of, management of, and communications with coordinators 1714. Specifically, the service provider environment 1720 includes a management and deployment service 1730 to enable registration of coordinators 1714 with the service provider environment 1720 and configuration of such coordinators 1714, a device shadow service 1740 to enable robust changes to state of coordinators 1714 and coordinated devices 1712, and an on-demand code execution environment 1750 providing on-demand, dynamic execution of tasks, as well as deployment and provisioning of tasks on coordinators 1714.

As shown in FIG. 17, the management and deployment service 1730 includes a client and data interface 1732 and a configuration data store 1734 that may operate collectively to enable registration of a coordinator 1714 with the management and deployment service 1730, generation of configurations for the coordinator 1714, and transmission of configuration data to the coordinator 1714. Illustratively, the client and data interface 1732 may provide one or more user interfaces (e.g., APIs, CLIs, GUIs, etc.) through which a user, via a client device 1702, may generate or submit a configuration of a coordinator 1714 for storage in the configuration data store 1734. The client and data interface 1732 may further provide one or more interfaces through which a coordinator 1714 may obtain the configuration, such that the coordinator 1714 is reconfigured according to the obtained configuration. The configuration data store 1734 can correspond to any persistent or substantially persistent data store, such as a hard drive (HDD), a solid state drive (SDD), network attached storage (NAS), a tape drive, or any combination thereof.

The device shadow service 1740 can include elements enabling a "shadow state" of a device, such as a coordinator 1714 or a coordinated device 1712, to be created, maintained, read, altered, or deleted. As discussed above, a shadow state may correspond to data representing a desired state of a correspond device, which may or may not mirror a current state of the device. For example, with respect to a coordinator 1714, a shadow state may include a desired configuration version for the coordinator 1714. With respect to a coordinated device 1712, a shadow state may include a desired state of the coordinated device 1712 (e.g., on or off for a switch or bulb, locked or unlocked for a lock, a desired temperature for a thermostat, etc.). The device shadow service 1740 may enable users, via client devices 1702, or other entities to read from or modify a shadow state for a device, and may further interact with that device to synchronize the device to the shadow state. Illustratively, the device shadow service 1740 may include an interface 1742 (which may include, e.g., APIs, CLIs, GUIs, etc.) through which requests to read from, write to, create or delete a shadow state may be received, as well as a shadow data store 1744 configured to store the shadow states. The shadow data store 1734 can correspond to any persistent or substantially persistent data store, such as a hard drive (HDD), a solid state drive (SDD), network attached storage (NAS), a tape drive, or any combination thereof. Further details regarding the use of device shadows generally can be found within U.S. patent application Ser. No. 15/196,700, entitled "Device Representation Management Using Representation Types," and filed Jun. 29, 2016 (the "'700 application"), the entirety of which is incorporated by reference herein.

The on-demand code execution environment 1750 can include a number of devices providing on-demand execution of tasks (e.g., portable code segments). Specifically, the on-demand code execution environment 1750 can include a frontend 1752, through which users, via client device 1702, may submit tasks to the on-demand code execution environment 1750 and call for execution of tasks on the on-demand code execution environment 1750. Such tasks may be stored, for example, in a task data store 1754, which can correspond to any persistent or substantially persistent data store, such as a hard drive (HDD), a solid state drive (SDD), network attached storage (NAS), a tape drive, or any combination thereof. While not shown in FIG. 17, the on-demand code execution system 1750 can include a variety of additional components to enable execution of tasks, such as a number of execution environments (e.g., containers or virtual machines executing on physical host devices of the on-demand code execution environment 1750), a worker manager to manage such execution environments, and a warming pool manager to assist in making execution environments available to the worker manager on a rapid basis (e.g., under 10 ms). Further details regarding the on-demand code execution environment can be found within the '556 patent, incorporated by reference above.

As noted above, tasks may be utilized both at the on-demand code execution environment 1750 and at coordinators 1714. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 1750 or a coordinator 1714 in a variety of manners. In one embodiment, a client device 1702 or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 1714, an network-accessible storage service, or the task data store 1754) prior to the request being received by the coordinator 1714 or the on-demand code execution system 1750. A request interface of the coordinator 1714 or the on-demand code execution system 1750 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 1722.

A call to execute a task may specify one or more third-party libraries (including native libraries) to be used along with the user code corresponding to the task. In one embodiment, the call may provide to a coordinator 1714 or the on-demand code execution system 1750 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the coordinator 1714 or the on-demand code execution system 1750 (e.g., standard routines), and/or provided by third parties. In some embodiments, such resource-level constraints (e.g., how much memory is to be allocated for executing a particular user code) are specified for the particular task, and may not vary over each execution of the task. In such cases, the coordinator 1740 or the on-demand code execution system 1750 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 1710 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 1714 or the on-demand code execution system 1750 may inspect the call and look for the flag or the header, and if it is present, the coordinator 1714 or the on-demand code execution system 1750 may modify the behavior (e.g., logging facilities) of the execution environment in which the task is executed, and cause the output data to be provided back to the user. In some embodiments, the behavior/mode indicators are added to the call by the user interface provided to the user by the coordinator 1714 or the on-demand code execution system 1750. Other features such as source code profiling, remote debugging, etc. may also be enabled or disabled based on the indication provided in a call.

The service provider environment 1720 is depicted in FIG. 17 as operating in a distributed computing environment including several computer systems that are interconnected using one or more computer networks (not shown in FIG. 17). The service provider environment 1720 could also operate within a computing environment having a fewer or greater number of devices than are illustrated in FIG. 17. Thus, the depiction of the service provider environment 1720 in FIG. 17 should be taken as illustrative and not limiting to the present disclosure. For example, the service provider environment 1720 or various constituents thereof could implement various Web services components, hosted or "cloud" computing environments, and/or peer to peer network configurations to implement at least a portion of the processes described herein.

Further, the service provider environment 1720 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 18:
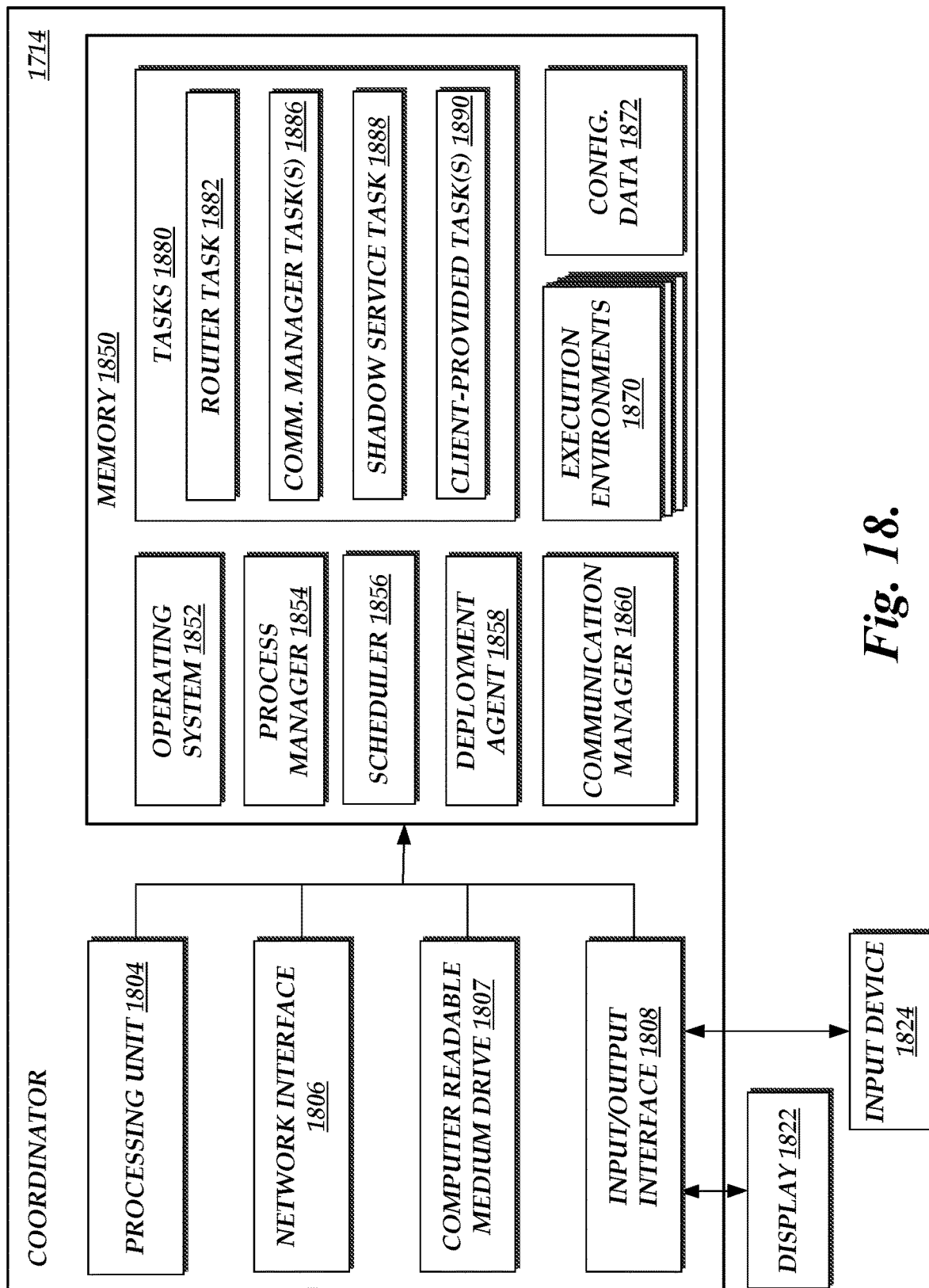
FIG. 18 depicts a general architecture of a computing device providing a coordinator of FIG. 17.

FIG. 18 depicts a general architecture of a computing system (referenced as coordinator 1714) that manages coordinated devices 1712 within a given coordinated environment 1710. The general architecture of the worker manager 1740 depicted in FIG. 18 includes an arrangement of computer hardware and software modules that may be used to implement aspects of the present disclosure. The hardware modules may be implemented with physical electronic devices, as discussed in greater detail below. The coordinator 1714 may include many more (or fewer) elements than those shown in FIG. 18. It is not necessary, however, that all of these generally conventional elements be shown in order to provide an enabling disclosure. Additionally, the general architecture illustrated in FIG. 18 may be used to implement one or more of the other components illustrated in FIG. 17. As illustrated, the coordinator 1714 includes a processing unit 204, a network interface 206, a computer readable medium drive 207, and an input/output device interface 208, all of which may communicate with one another by way of a communication bus. The network interface 12406 may provide connectivity to one or more networks or computing systems. The processing unit 12404 may thus receive information and instructions from other computing systems or services via the network 1704. The processing unit 12404 may also communicate to and from memory 250 and further provide output information for an optional display (not shown) via the input/output device interface 208. The input/output device interface 12408 may also accept input from an optional input device (not shown).

The memory 250 may contain computer program instructions (grouped as modules in some embodiments) that the processing unit 12404 executes in order to implement one or more aspects of the present disclosure. The memory 250 generally includes random access memory (RAM), read only memory (ROM) and/or other persistent, auxiliary or non-transitory computer readable media. The memory 250 may store an operating system 1852 that provides computer program instructions for use by the processing unit 1804 in the general administration and operation of the coordinator 1714. The memory 250 may further include computer program instructions and other information for implementing aspects of the present disclosure. For example, in one embodiment, the memory 1850 includes a process manager 1854, a scheduler 1856, a deployment agent 1858, and a communication manager 1860.

The scheduler 1856 and deployment agent 1858 may be executed by the processing unit 12404 to select tasks for execution by the processing unit 204, and to manage such task executions. Specifically, the scheduler 1856 may include instructions to select a tasks for execution at given points in time and to suspend execution of tasks (e.g., under instances of constrained resources at the coordinator 1714). The deployment agent 1858 may include instructions to select an appropriate execution environment 1870 in which to execute a task, to provision that execution environment 1870 with appropriate access to resources needed during the task execution, and to cause execution of the task within the execution environment 1870. An execution environment 1870, as used herein, refers to a logical portion of memory 250 in which to execute a task. In one embodiment, execution environments 1870 are programmatically separated, such that execution of code in a first execution environment 1870 is prohibited from modifying memory associated with another execution environment 1870. Illustratively, an execution environment 1870 may correspond to a "container," operating-system-level virtualization environment, or "sand box" environment, such as a "chroot jail" or a Python virtual environment "virtualenv." In other instances, an execution environment 1870 may correspond to a virtual machine environment (e.g., a JAVA virtual machine, a virtualized hardware device with distinct operating system, etc.). In still other instances, an execution environment 1870 may be a memory space allocated to an execution of a task, without necessarily utilizing virtualization.

Communications between tasks executing on the coordinator, as well as between the coordinator 1714 and other devices (e.g., client devices 1702 and coordinated devices 1712) may be facilitated by the communication manager 1860. Specifically, the communication manager 1860 may be configured to obtain messages directed to the coordinator 1714 and forward the message to the appropriate destination. For example, the communication manager 1860 may route messages between any combination of tasks, coordinated devices 1712, client devices 1702, and devices of the service provider execution environment 1720. As will be explained in greater detail below, the communication manager 1860 can translate messages associated with a specific topic such that they are directed to a topic subscribed to by a smaller subset of devices.

Tasks executed by the coordinator 1714 are shown as logically grouped within the tasks memory space 1880, which may correspond to a logical unit of memory 250 configured to store the code corresponding to each task. As shown in FIG. 18, the tasks memory space 1880 can include a number of tasks executable by the processing unit 12404 to implement functionalities of the coordinator 1714, including a router task 1882, one or more communication manager tasks 1886, a shadow service task 1888, and one or more client-provided tasks 1890.

The router task 1882 may correspond to a portion of code executable to assist in the routing of messages within, to, and from the coordinator. In one embodiment, the router task 1882 implements a "routing table" to determine appropriate destinations for a message. For example, the communication manager 1860 may forward messages obtained at the coordinator 1714 (e.g., due to generation by a task execution or reception at the input/output interface 208) to the router task 1882, which may utilize the routing table to determine that messages addressed to a certain identifier should be routed to a given task, a given client device 1702, or a given coordinated device 1702. The routing table may further indicate that a message addressed to an identifier should be transmitted to the service provider environment 1720 (e.g., to the device shadow service 1740 or the on-demand code execution system 1750). In one embodiment, the routing table may utilize "topics" as identifiers, such that messages associated with a particular topic are routed according to a routing specified for that topic. The routing table may further include information for how to route messages based on a source of those messages. For example, a message addressed to a given topic may be routed differently, based on whether the message is received from a first task, a second task, a first coordinated device 1712, etc. By utilization of a routing table, router task 1882 can enable messages to be redirected, without a change in the operation of a sender of such a message (e.g., without rewriting code for a task that generated the message, without modifying the software of a coordinated device 1712 that generated the message, etc.).

The communication manager tasks 1886 may enable communications between the coordinator 1714 and a number of different external devices (e.g., coordinated devices 1702) according to a protocol of such communications. For example, a first communication manager task 1886 may be configured to manage communications using a BLUETOOTH™ protocol, a second communication manager may be configured to manage communications using an HTTP protocol, etc. In some instances, multiple communication manager tasks 1886 may work collectively to implement communications. For example, a first communication manager task 1886 may enable communications via the TCP protocol, while a second communication manager task 1886 may enable communications via the MQTT protocol (which utilizes the TCP protocol and thus may utilize the a first communication manager task 1886). Because different communication manager tasks 1886 can vary the ability of the coordinator 1714 to communicate via different protocols, and because the tasks of the coordinator 1714 may be altered via reconfiguration of the coordinator 1714, the coordinator 1714 can be rapidly reconfigured to utilize a variety of different communication protocols.

The shadow service task 1888 can facilitate management and interaction with device shadows maintained at the coordinator 1714. Illustratively, the shadow service task 1888 can implement functionality similar to that provided by the device shadow service 1740 locally to the coordinator 1714. Accordingly, the shadow service task 1888 can maintain a shadow state (data representing a desired state) of a coordinated device 1712, and allow for reading to or writing to such data. The shadow service task 1888 can further enable synchronization of a coordinated device 1712 with the device shadow for that device. Accordingly, by modifying a device shadow for a coordinated device 1712, the state of the coordinated device 1712 can be altered. By reading the device shadow for the coordinated device 1712, the state of the coordinated device 1712 can be determined. In some instances, the shadow service task 1888 may further coordinate with another device shadow for a given device, such as a device shadow maintained by the device shadow service 1740. For example, the shadow service task 1888 may synchronize a local device shadow with a device shadow stored at the device shadow service 1740, resolve conflicts between the local device shadow and the device shadow stored at the device shadow service 1740, etc.

In addition to the tasks described above (each of which may illustratively be provided by an entity associated with the service provider environment 1720), the tasks memory space 1880 may include any number of client-provided tasks 1890, which may correspond to executable code generated by a client device 1702 and submitted to the service provider environment 1720 for deployment to a coordinator 1714. As such, functionalities provided by the client-provided tasks 1890 may vary according to the desires of a submitting user. In some instances, the client-provided tasks 1890 may be written in a coding language for which the memory 250 includes a language runtime. For example, where the coordinator 1714 supports language such as node.js, Go, JAVA, and Python, the client-provided tasks 1890 may include executable code written in any of those languages.

In addition, the memory 250 includes a configuration data portion 1872, representing a logical portion of the memory 250 in which configuration data of the coordinator 1714 is stored. The configuration data may include, for example, a current deployment version of the coordinator 1714, data stored by the tasks of the task memory space 1880, or other data used in the operation of the coordinator 1714.

To enable configuration (and reconfiguration) of the coordinator 1714, the memory 250 further includes a deployment agent 1858. The deployment agent 1858 can correspond to code executable to register a coordinator with the service provider environment 1720, to determine a desired configuration of the coordinator 1714, and in instances where a current configuration of the coordinator 1714 does not match a desired configuration, to obtain configuration data for the coordinator 1714 and modify the memory 250 to implement the desired configuration.

Figure 19A:
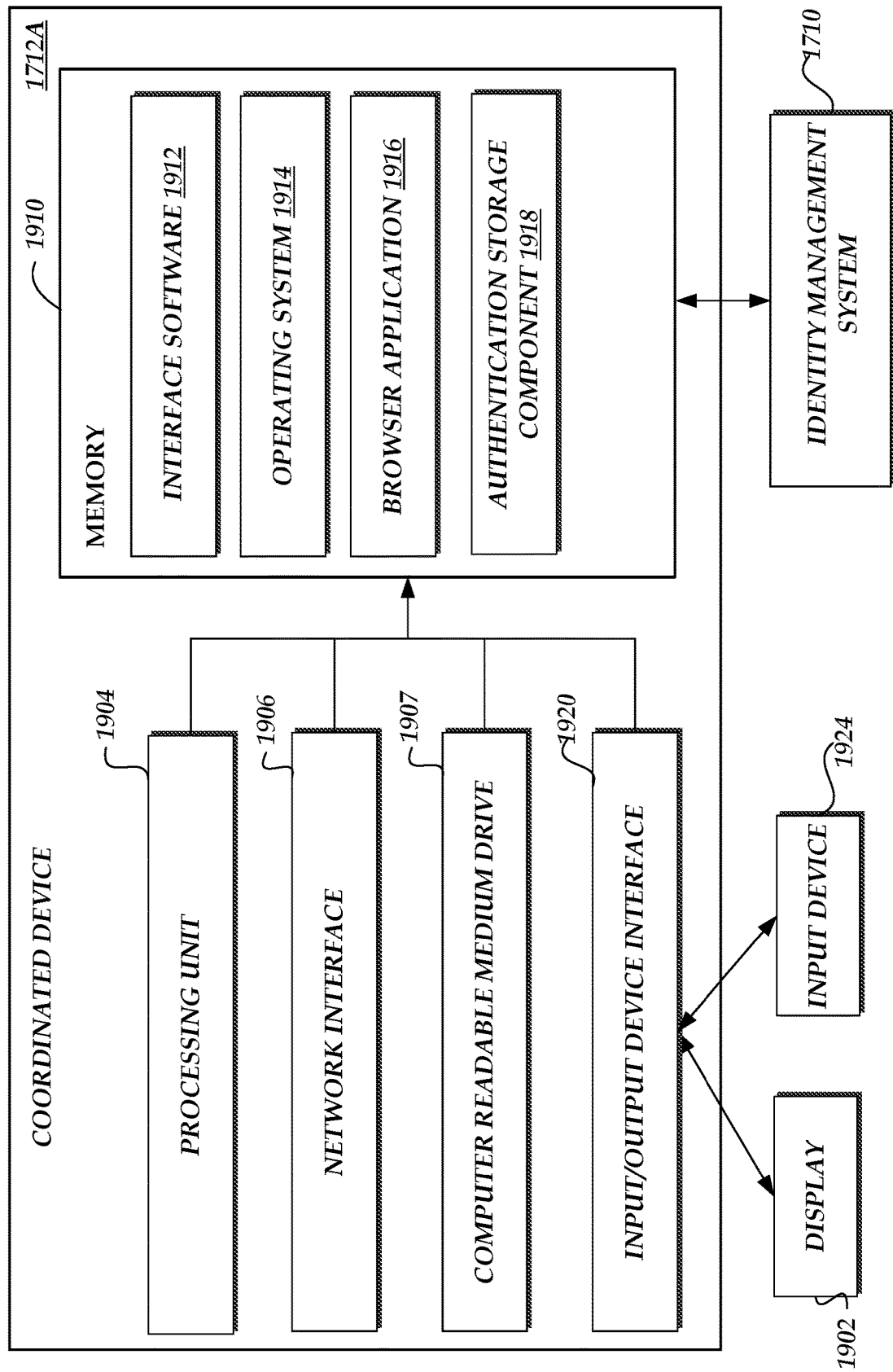
FIGS. 19A and 19B depict general architectures of coordinated devices managed by the coordinator of FIG. 17.

FIG. 19A depicts one embodiment of an architecture of an illustrative coordinated device 1712A in accordance with the present application. The general architecture of the coordinated device 1712A depicted in FIG. 19A includes an arrangement of computer hardware and software components that may be used to implement aspects of the present disclosure. As illustrated, the coordinated device 1712A includes a processing unit 1904, a network interface 1906, a computer readable medium drive 307, an input/output device interface 320, an optional display 1902, and an input device 1924, all of which may communicate with one another by way of a communication bus. Illustratively, the coordinated device 1712A may have more limited functionality and components, such as inputs or outputs, as embedded devices.

The network interface 1906 may provide connectivity to one or more networks or computing systems, such as the network 1704 of FIG. 17. The processing unit 1904 may thus receive information and instructions from other computing systems or services via a network. The processing unit 1904 may also communicate to and from memory 1910 and further provide output information for an optional display 1902 via the input/output device interface 1920. The input/output device interface 1920 may also accept input from the optional input device 1924, such as a keyboard, mouse, digital pen, etc. In some embodiments, the coordinated device 1712A may include more (or fewer) components than those shown in FIG. 19A. For example, some embodiments of the coordinated device 1712 may omit the display 1902 and input device 1924, while providing input/output capabilities through one or more alternative communication channel (e.g., via the network interface 1906). Additionally, the coordinated device 1712A may omit the input and output interface 1920 altogether as well.

The memory 1910 may include computer program instructions that the processing unit 12404 executes in order to implement one or more embodiments. The memory 1910 generally includes RAM, ROM or other persistent or non-transitory memory. The memory 1910 may store an operating system 1914 that provides computer program instructions for use by the processing unit 1904 in the general administration and operation of the coordinated device 1712A. The memory 1910 may further include computer program instructions and other information for implementing aspects of the present disclosure. For example, in one embodiment, the memory 1910 includes a browser application 1916 for accessing content. Illustratively, the browser application 1916 may encompass a full software browser application, portions of a browser application or simply be a software application (or executable instructions) that provide for data connectivity.

Figure 19B:
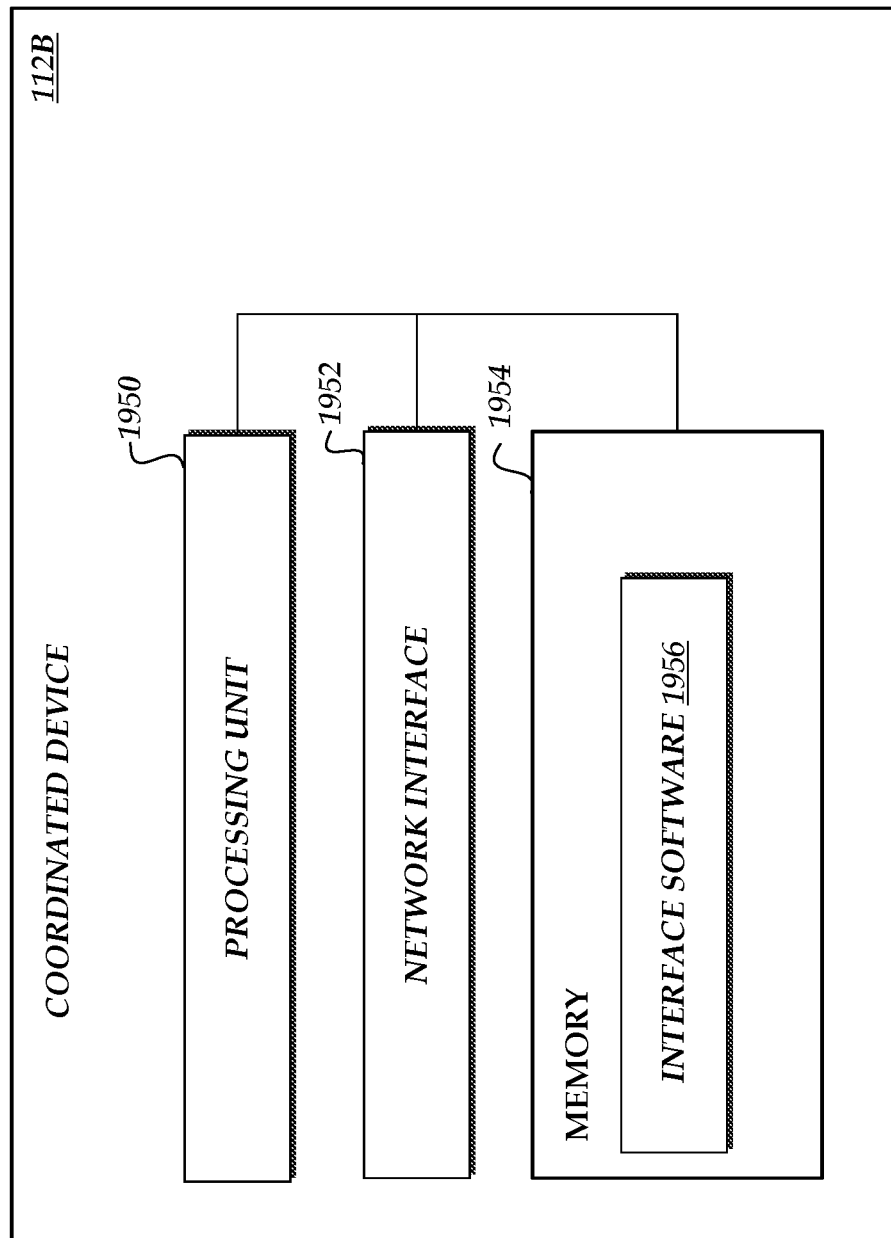

FIG. 19B depicts one embodiment of an alternative architecture of an illustrative coordinated device 1712B in accordance with the present application. The general architecture of the coordinated device 1712B depicted in FIG. 19B includes an arrangement of computer hardware and software components that may be used to implement aspects of the present disclosure. However, coordinated device 1712B may be associated with a reduced of components that may limit the computing functionality and operation of the coordinated device 1712B. As illustrated, the coordinated device 1712B includes a processing unit 1950 and a network interface 1952 that communicate with a communication bus. Unlike coordinated device 1712BA of FIG. 19A, the coordinated device 1712B may not have a computer readable medium drive, an input/output device interface, an optional display, or an input device.

The network interface 1952 may provide connectivity to one or more networks or computing systems, such as the network 1704 of FIG. 17. The processing unit 1950 may thus receive information and instructions from other computing systems or services via a network. The memory 1954 may include computer program instructions that the processing unit 1950 executes in order to implement one or more embodiments. The memory 1954 generally includes RAM, ROM or other persistent or non-transitory memory. In this embodiment, the memory 1954 may store necessarily store a full operating system that provides computer program instructions for use by the processing unit 1950 in the general administration and operation of the coordinated device 1712B. Rather, in one embodiment, the memory 1954 includes an interface software component 1956 for accessing receiving and processing instructions.

Figure 20:
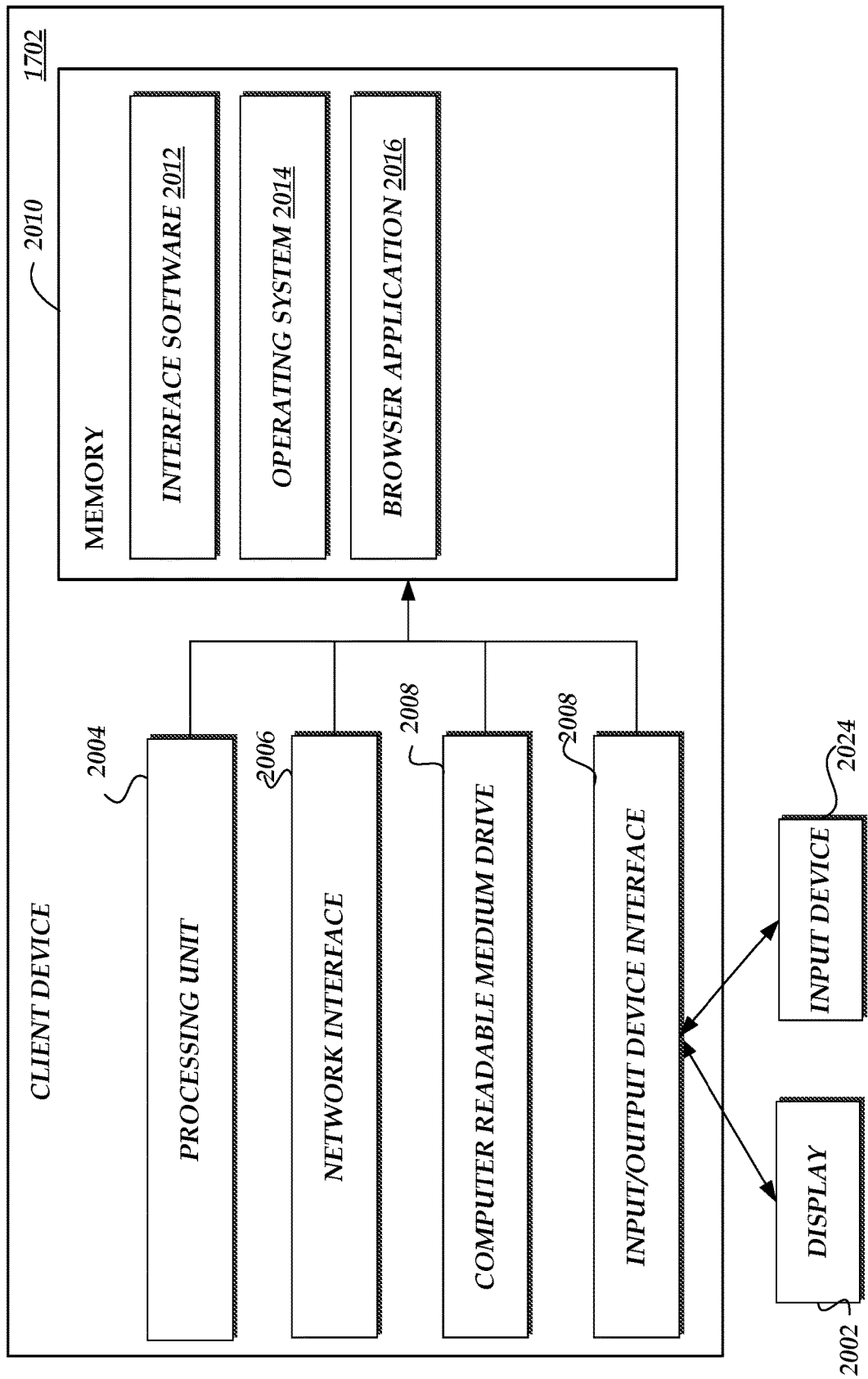
FIG. 20 depicts a general architecture of client device that may be utilized to generate and submit configuration information related to communication protocols.

FIG. 20 depicts one embodiment of an architecture of an illustrative client device 1702 in accordance with the present application. The general architecture of the client device 1702 depicted in FIG. 20 includes an arrangement of computer hardware and software components that may be used to implement aspects of the present disclosure. As illustrated, the client device 1702 includes a processing unit 202004, a network interface 2006, a computer readable medium drive 407, an input/output device interface 2020, an optional display 2002, and an input device 2024, all of which may communicate with one another by way of a communication bus.

The network interface 2006 may provide connectivity to one or more networks or computing systems, such as the network 1704 of FIG. 17. The processing unit 202004 may thus receive information and instructions from other computing systems or services via a network. The processing unit 202004 may also communicate to and from memory 2010 and further provide output information for an optional display 2002 via the input/output device interface 2020. The input/output device interface 2020 may also accept input from the optional input device 2024, such as a keyboard, mouse, digital pen, etc. In some embodiments, the client device 1702 may include more (or fewer) components than those shown in FIG. 20. For example, some embodiments of the coordinated device 1712 may omit the display 2002 and input device 2024, while providing input/output capabilities through one or more alternative communication channel (e.g., via the network interface 2006). Additionally, the client device 1702 may omit the input and output interface 2020 altogether as well.

The memory 2010 may include computer program instructions that the processing unit 12404 executes in order to implement one or more embodiments. The memory 2010 generally includes RAM, ROM or other persistent or non-transitory memory. The memory 2010 may store an operating system 2014 that provides computer program instructions for use by the processing unit 2004 in the general administration and operation of the client device 1702. The memory 2010 may further include computer program instructions and other information for implementing aspects of the present disclosure. For example, in one embodiment, the memory 2010 includes a browser application 2016 for accessing content. Illustratively, the browser application 2016 may encompass a full software browser application, portions of a browser application or simply be a software application (or executable instructions) that provide for data connectivity.

Figure 21:
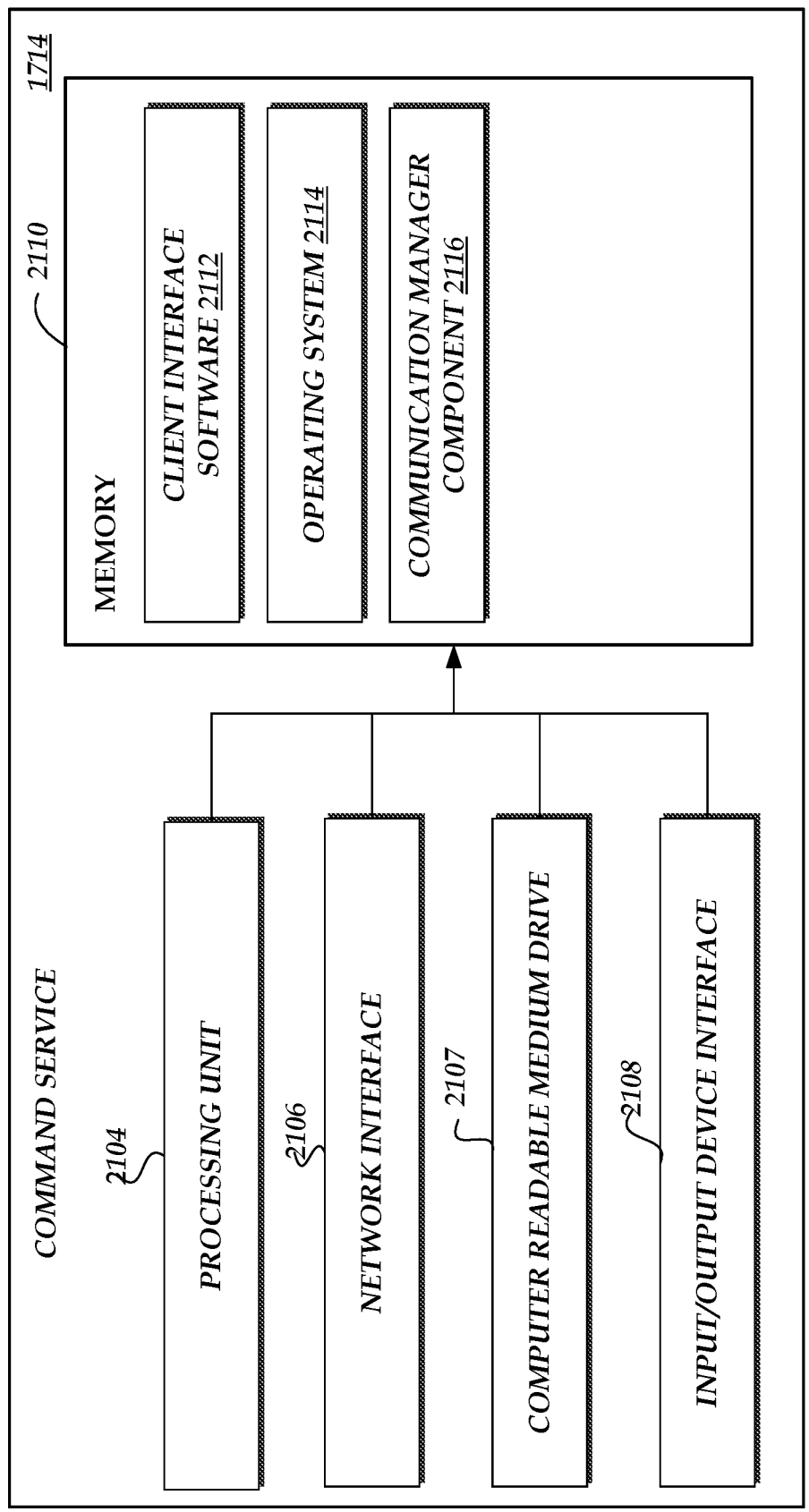
FIG. 21 is depicted a general architecture of a computing device that may be utilized to process communications sent in accordance with a messaging protocol and utilizing embedded codes.

FIG. 21 depicts one embodiment of an architecture of an illustrative computing device for implementing the message processing services component described herein. As previously described, one or more computing devices in the environment can function as a message processing services, such as MQTT broker. In other embodiments, the message processing services may be implemented in networking components. Accordingly, the general architecture of the message processing services depicted in FIG. 21 includes an arrangement of computer hardware and software components that may be used to implement aspects of the present disclosure. As illustrated, the remote command services 1714 includes a processing unit 2104, a network interface 506, a computer readable medium drive 2107, an input/output device interface 2120, an optional display 2102, and an input device 2124, all of which may communicate with one another by way of a communication bus. The components of the remote command services 1714 may be physical hardware components or implemented in a virtualized environment.

The network interface 506 may provide connectivity to one or more networks or computing systems, such as the network 1750 of FIG. 17. The processing unit 2104 may thus receive information and instructions from other computing systems or services via a network. The processing unit 2104 may also communicate to and from memory 2110 and further provide output information for an optional display 2102 via the input/output device interface 2120. The input/output device interface 2120 may also accept input from the optional input device 2124, such as a keyboard, mouse, digital pen, etc. In some embodiments, the remote command services 1714 may include more (or fewer) components than those shown in FIG. 21. For example, some embodiments of the remote command services 1714 may omit the display 202 and input device 20201824, while providing input/output capabilities through one or more alternative communication channel (e.g., via the network interface 506).

The memory 2110 may include computer program instructions that the processing unit 2104 executes in order to implement one or more embodiments. The memory 2110 generally includes RAM, ROM or other persistent or non-transitory memory. The memory 2110 may store an operating system 2114 that provides computer program instructions for use by the processing unit 2104 in the general administration and operation of the intermediary server 1714. The memory 2110 may further include computer program instructions and other information for implementing aspects of the present disclosure. For example, in one embodiment, the memory 2110 includes client interface software 2112 for receiving and processing content requests from client devices 1702. Additionally, the memory 2110 includes a communication manager component 2116 for processing received communications. Illustratively, the communication manager 2116 can translate messages associated with a specific topic such that they are directed to a topic subscribed to by a smaller subset of devices.

Turning now to FIGS. 6A-6D, illustrative interactions between the components of the content management system 1710 to process content messages will be described. More specifically, FIGS. 6A-6D will be described with regard to interactions between coordinated devices 1712, a client device 1702 and a message processing service. As previously indicated, the message processing service can be implemented by a variety of devices including the coordinator 1714 or other network equipment. Additionally, the coordinated devices 1712 can correspond to the coordinated devices 1712 (FIG. 3A), coordinated devices 1712 (FIG. 19B) or combinations thereof. However, reference to interactions should not be limited to any particular device or combination of devices, even if used for illustrative purposes.

Figure 22A:
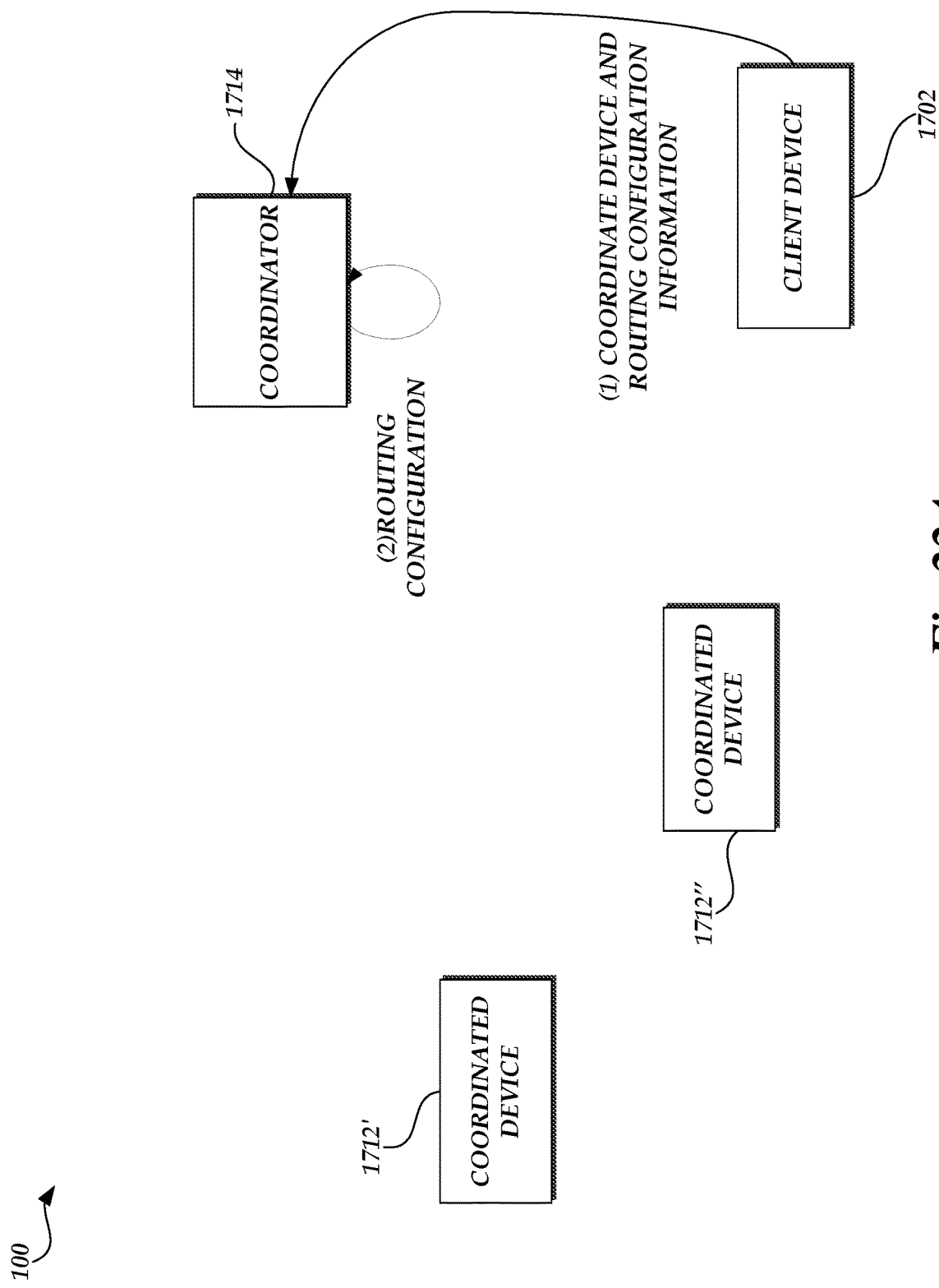
FIGS. 22A-22D are block diagrams of the illustrative environment of FIG. 17 depicting illustrative interactions for exchanging communications in accordance with a messaging protocol utilizing embedded codes.

With reference to FIG. 22A, the initial configuration of a message processing service will be described. Illustratively, a client or system administrator configures the message processing service with information that facilitates the interpretation of received communications. In one embodiment, the message processing service can be implemented by the service provider environment 1720 to provide communications to one of several potential coordinated environments 1710. In another embodiment, the message processing service can be implemented by the coordinator 1714 to provide communications to one of several coordinated devices 1712. Accordingly, FIGS. 6A-6D should not be limited to implementation solely on either embodiments or other variations. However, for purposes of illustration, FIGS. 6A-6D will be described with regard to interactions between a coordinator 1714 and a set of coordinated devices.

In accordance with an illustrative embodiment, the communications can be formed in accordance with the MQTT messaging protocol, regardless of the actual communication protocol that is utilized to transmit the message across the communication network 1704. Specific to the MQTT protocol, each message is associated with a topic portion that has one or more grouping of words defining or otherwise associated with the communication. Each separable grouping of words can be generally referred to as a level and a topic portion may have multiple levels. An example below includes a first level, "base level", followed by a series of additional levels, "level 1"-"level n." Each additional level is delineated by a topic separator.

base level/level 1/level 2/level 3 . . . /level n

As previously described, in the traditional MQTT protocol, a message coordinator 1714 receiving a message will attempt to match the topic with one or more recipient devices that have registered to receive messages published by topic. For example, the message coordinator 1714 will look for the one or more topic portions of the message to match (entirely or partially) with the topic registrations. The coordinator 1714 message processing service can limit a determination to an exact matching of all levels or partial matching of one or more levels.

With reference now to FIG. 22A, at (1), a client device 1702 corresponding to an administrator or customer can transmit configuration information to the coordinator 1714. Illustratively, the configuration information corresponds to one or more instructions, logical rules, or processing steps that define a set of actions the coordinator 1714 message processing service can take on a message based on matching the topic portion of a received message, the source of the message, and the like. For example, one configuration of the coordinator 1714 message processing service can include a definition of whether communications corresponding to an assigned task should be implemented by specific coordinated devices 1712. In this example, a set of coordinated devices 1712 may be subscribed to receive content messages with a corresponding topic, but which device receives the message may depend on the evaluation of the rules identified by the coordinator 1714.

In another example, the coordinator 1714 message processing service may be configured to obtain additional information, such as cost information, routing information, workload, service level information, security information, and the like based on identifying one or more embedded codes that correspond to instructions to obtain such information. In this regard, the coordinator 1714 message processing service in traditional implementations of messaging protocols does not conduct any additional processing of the received messages or may require additional external network communications or components to make routing decisions. Additionally, in accordance with the present application, the coordinator 1714 can be configured with a wide variety of additional functionality as specified by the administrator via the client device 1702. Although illustrated as a direct communication to configure the coordinator 1714, in some embodiments, the client computing device 1702 would interact indirectly with the coordinator 1714 via the message processing system 1720.

At (2), the coordinator 1714 processes the configuration information and stores the configuration for subsequent processing. In this regard, illustratively, the coordinator 1714 can maintain a database or matrix for matching security information included in received messages. Additionally, the coordinator 1714 can maintain the additional processing instructions or executable code that will be executed when a matching identified or when required security information is not included in received messages. In other embodiments, the coordinator 1714 can obtain the additional instructions or executable code utilizing an interface, such as an API, at the time that an embedded code is identified. For example, the coordinator 1714 can access third party security service providers that can facilitate the configuration of the coordinator 1714 or provide information utilized by the coordinator 1714 to evaluate security information provided in the published messages. Illustratively, the configuration of the coordinator 1714 will facilitate the processing of message routing without need to have external network access.

Figure 22B:
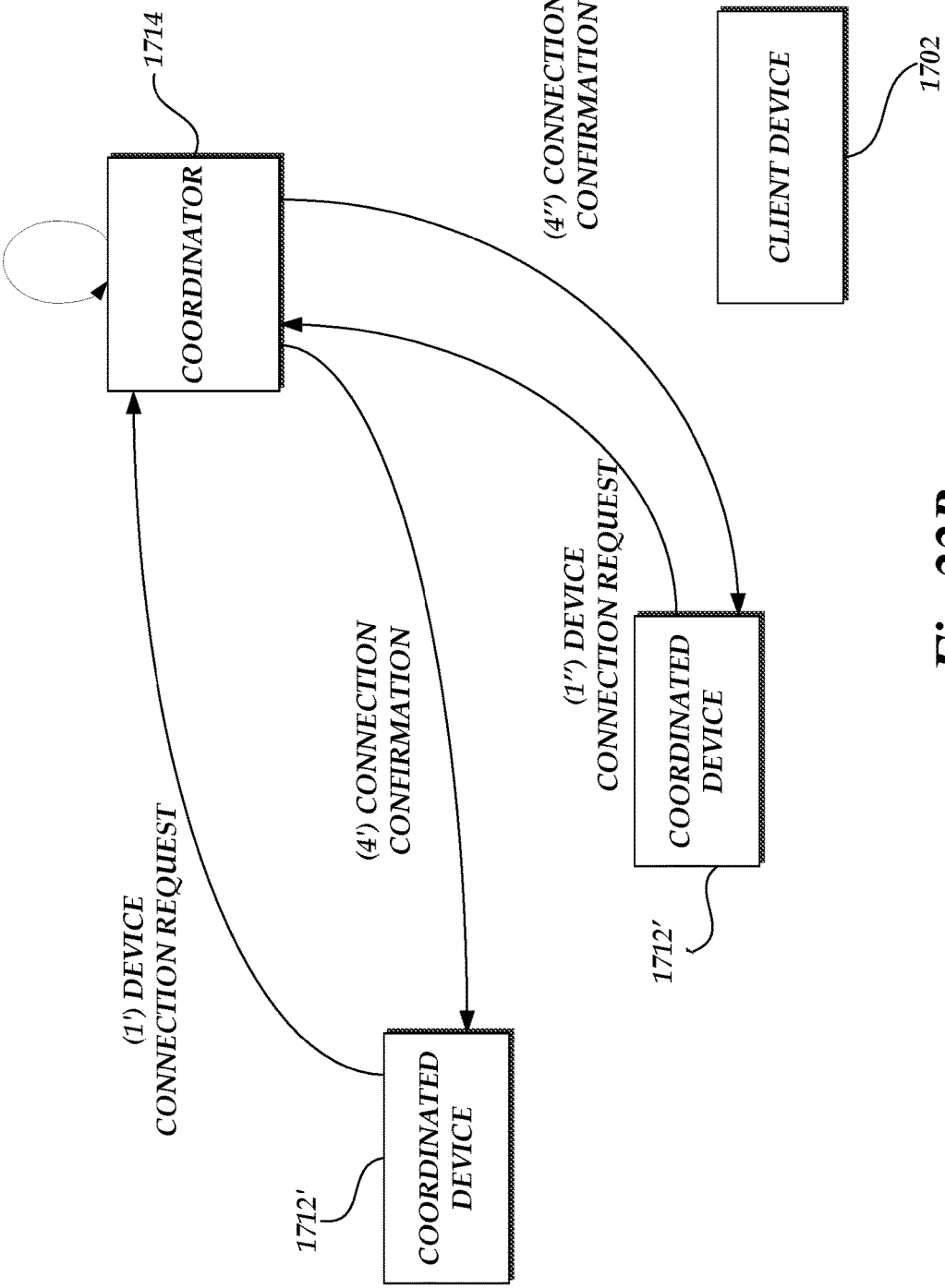

With reference to FIG. 22B, the initial configuration of recipient devices, coordinated devices 1712' and 1712" will be described. At (1), the coordinated devices 1712' and 1712" generate a device connection request and transmit the request to the coordinator 1714. Illustratively, the device connection request corresponds to establish procedures associated with the authentication and authorization of the coordinated devices 1712' and 1712" with the coordinator 1714. Still further, in some embodiments, the logical network 100 can include additional gateway components that independently, or as part of the content management system 1710, manage the transmission of the messages to the coordinator 1714. Such gateway components can implement security functionality, load balancing or other network processing services.

At (2), the coordinator 1714 processes the connection request such as by validating security information, requesting additional information or determining the characteristics of the requesting client computing device 1702. At (3), the coordinator 1714 processes the connection request by updating routing tables, business logic, or business rules based on authenticated coordinated devices. For example, the coordinated devices 1712 may include various permissions or security codes that can be utilized by the coordinator 1714 to match incoming messages. Additionally, the coordinator 1714 can receive additional information, such as the security information or code for evaluating the security information. At (4), if the connection request is acceptable and authorized, the message processing services 2200 transmits a connection confirmation to the requesting coordinator 1714. In this regarding, once authorized, the coordinating devices 1712 and 1712' and coordinator 1714 can begin communication within the procedures defined in a messaging protocol, such as MQTT. Additionally, the coordinating devices 1712 and 1712' can provide additional security information that facilitates the routing processes described above.

Figure 22C:
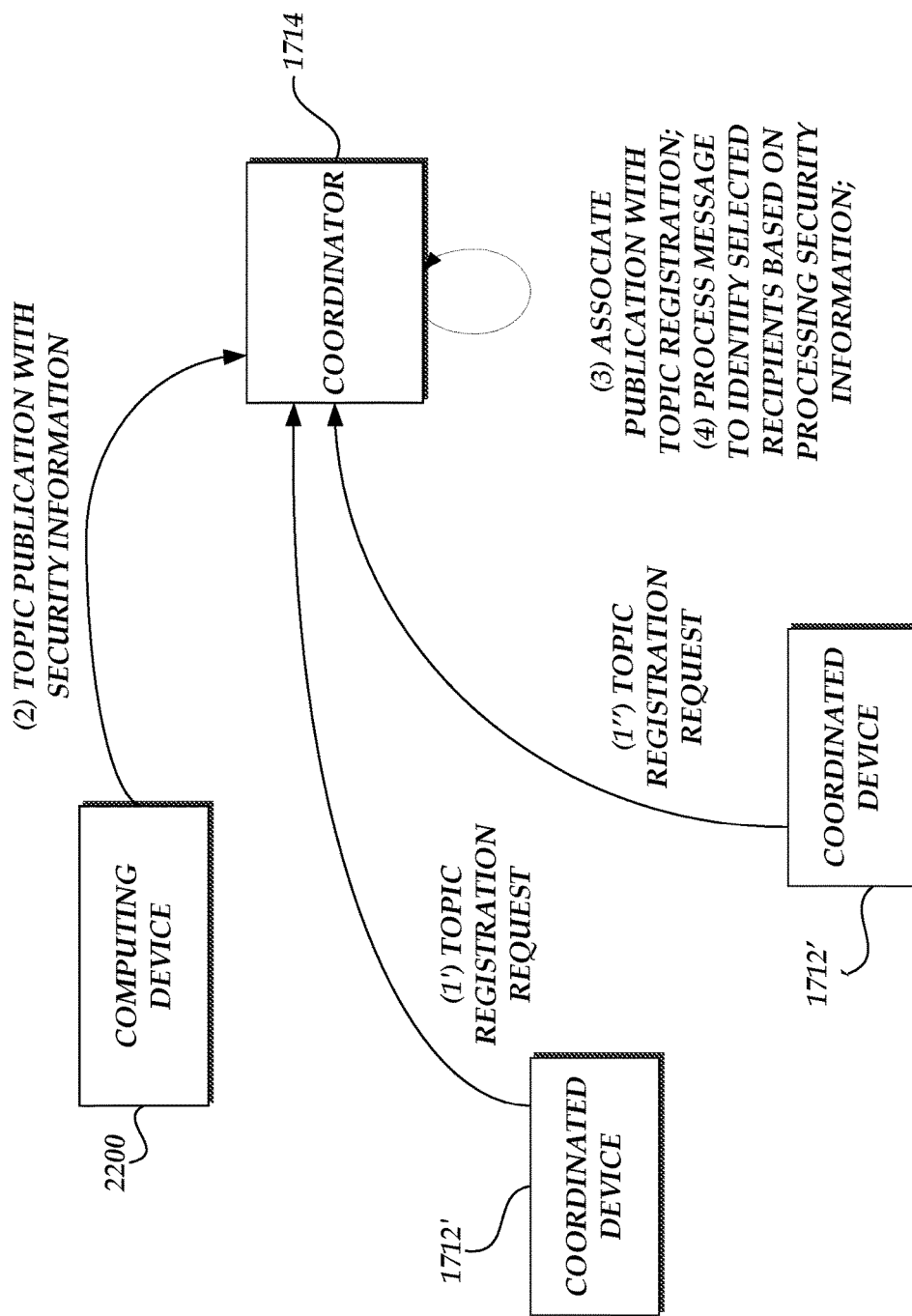
Figure 22D:
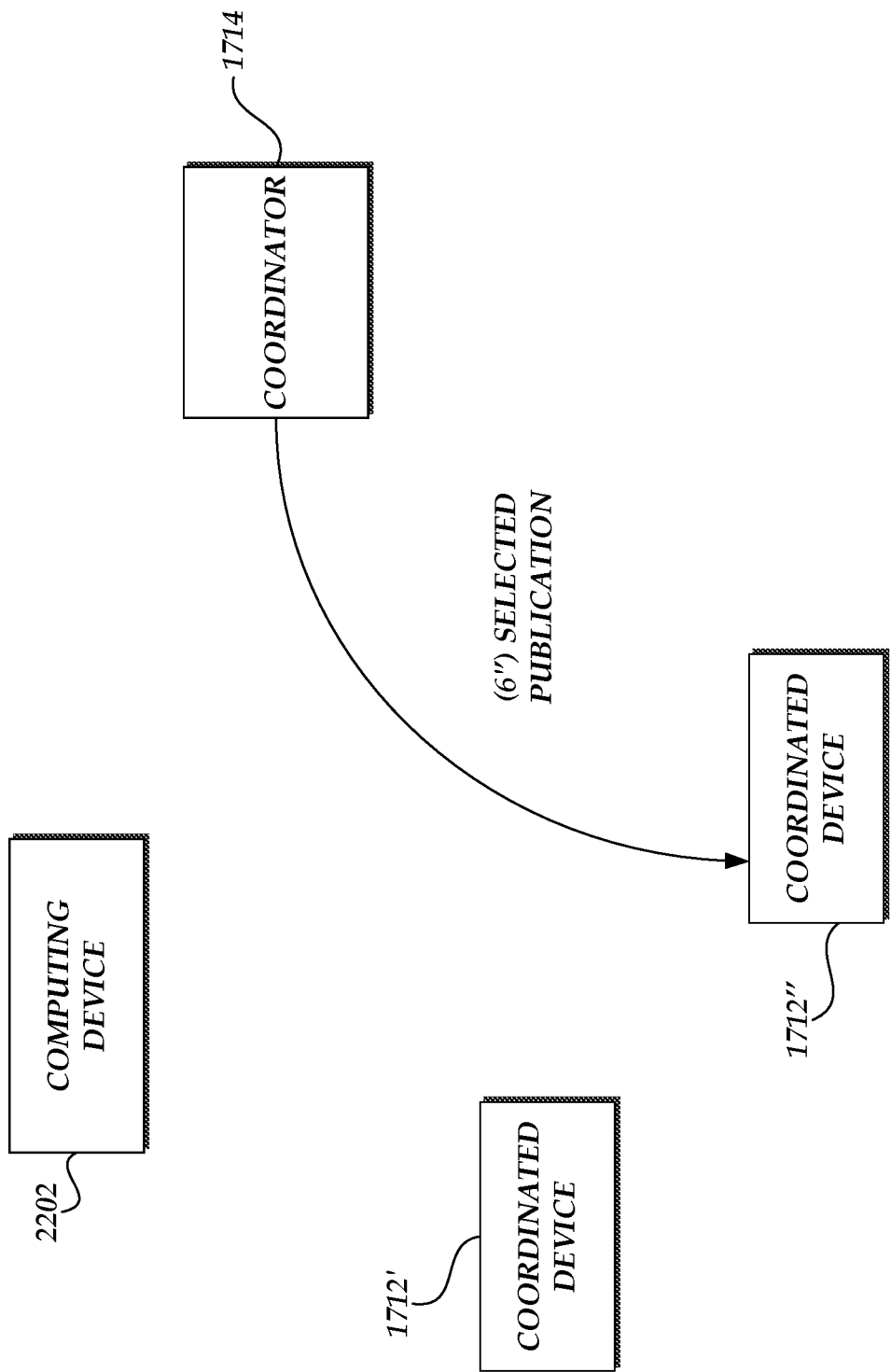

With reference now to FIG. 22C, after receiving the connection confirmation, at (1), the coordinated devices 1712' and 1712" transmit one or more topic registration requests to the coordinator 1714. Illustratively, the topic registration is defined in accordance with the messaging protocol such that the coordinated devices 1712' and 1712" can register to receive content published according to specific topics by any number of content providers. As applied to the present application, the coordinated devices 1712' and 1712" register for one or more topics. For purposes of illustration, examples will be provide such that the forwarding of message to the registered coordinated devices 1712' and 1712" can be different based on the security information in the messages.

At some point after registration, at (2), a separate computing device 2202 publishes one or more pieces content to the coordinator 1714. Illustratively, the coordinator 1714 can receive the messages can correspond to communications transmitted from the service provider environment 1720. Each published piece of content is associated with a topic. For purpose of an illustrative example, at least one published content is associated with a topic portion of the content/ message that corresponds to the topic registered by the coordinated devices 1712 and 1712' with the coordinator

1714. In this regard, the message can include one or more levels in the topic portion that can be utilized to match received messages with registered coordinating devices. Additionally, the received messages can include or be associated with security information, such as group identifiers, source identifiers, and passwords, certificates or other tokens.

At (3), the coordinator 1714 matches the registered topics with the published topics to determine that the coordinated devices should receive. In this regard, the coordinator 1714 can determine the set of coordinated devices 1712 that have registered to receive the message. One skilled in the relevant art will appreciate that in traditional implementations of the MQTT messaging protocol, or other messaging protocols, the coordinator 1714 would send the received messages to all registered coordinated devices. At (4), the coordinator 1714 processes the topic portion of the communication to identify one or more coordinated devices that should receive the published message. In some embodiments, the coordinator 1714 can include functionality to process the topic portion, such as communication manager component 1860. In other embodiments, the coordinator 1714 can utilize additional services or components to facilitate the parsing. More specifically, the coordinator 1714 can utilize various business rules or routing tables to identify a subset of registered coordinated devices 1712 that will receive the message. Accordingly, the coordinator 1714 can evaluate the business rules or routing tables to identify which of the registered coordinated devices 1712 that will not receive the published message. Illustratively, the coordinator 1714 can utilize the routing tables and business rules to associate the security information with permission to publish the messages to a set of possible recipient devices.

At (5), the coordinator 1714 message processing service and can associate a secondary topic publication that will cause the message to be directed to the selected subset of registered devices. In one embodiment, the coordinator 1714 can be configured to transmit messages directly to the selected, registered devices. In this embodiment, the coordinator 1714 can utilize the same messaging protocol or a different communication protocol as specified in the business rules or logic. In another embodiment, the coordinator 1714 can associate one or more secondary topic publications that would be applicable or match the selected, registered devices. In this embodiment, the secondary topic publications would not be registered for the non-selected devices, such as secondary topic publications for individual devices. For purposes of illustration of utilizing directed publication, with reference to FIG. 22D, at (6), the message processing service can cause the forwarding of the message to coordinate device 1712" and not coordinated device 1712'.1712. 171217121714Additionally, in some embodiments, the coordinator 1714 can select a coordinated device 1712 that may not have registered to receive messages according to the original topic, but that is nonetheless selected by the coordinator 1714.

FIG. 23 is a flow diagram illustrative of a remote execution messaging routine 2300 implemented by a message processing service in accordance with an illustrative embodiment. Routine 2300 illustrates the utilization of business rules, routing tables or other logical information in a messaging protocol during the message routing. At block 2302, the message processing service obtains registration information including at least one topic related to the remote execution of content by a device, such as a coordinated device 1712 or any other computing device 1702 As described previous, the devices transmit one or more topic registration requests to the message processing service. Illustratively, the topic registration is defined in accordance with the messaging protocol such that the device can register to receive content published according to specific topics by any number of content providers. As previously specified, the topic registrations can correspond to individual devices or a set of devices.

At some point after registration, at block 2304, the message processing service obtains one or more publications having a topic portion. Illustratively, some computing device 2202 (FIG. 22C) publishes one or more pieces content to the message processing service. Each published piece of content is associated with a topic. For purpose of an illustrative example, at least one published content is associated with a registered topic of the client computing devices 1702. Additionally, the published piece of content associated with the topic includes a payload portion of content. Examples of such payload portions can include tasks to be executed by a coordinated device or network device. Additionally, the messages can include security information that will be utilized to evaluate whether the message should be published by the message publishing service.

At block 2306, the message processing service matches the registered topics with the published topics to determine that one or more devices should receive the published content with the topic to form the set of client devices that should receive the published topic. Illustratively, since the message processing service is configured in accordance with the messaging protocol, such as MQTT, matching registrations to topic publication can be accomplished in the manner dictated by the messaging protocol. Illustratively, the matching of the topic portion can correspond to a matching of all levels of the topic portion or a partial matching of at least one level. Still further, the matching can correspond to a matching of a base level, while other levels may be ignored or utilized for secondary matching.

At block 2308, the message processing service identifies security information the topic portion of the message or other portions. Illustratively, the message processing service processes the topic portion to select a subset of devices that should receive the message. In some embodiments, the message processing service can include functionality, such as business rules, routing tables, logical rules, and the like to select the subset of registered devices. In other embodiments, the message processing service can utilize additional services or components to facilitate the processing. Additionally, at block 2308, the message processing service then selects a set of recipient devices to receive the published message and not with the non-selected recipient devices. In some embodiments, the message processing service can include functionality, such as business rules, routing tables, logical rules, and the like to select the subset of registered devices. In one aspect, the coordinator 1714 can evaluate business rules or routing table that identifies the subset of coordinated devices 1712 that should receive the received messages. Illustratively, the business rules or routing tables can incorporate information such as source address of the originator, identification information in one or more levels of the topic portion, security configuration information of the identified recipient devices 1712, timestamp information, utilization information regarding the coordinated devices, financial cost information and the like. In other examples, the business rules can include random selection or a weighted selection algorithm if one or more recipient devices 1712 may otherwise be eligible or available to receive the message. For example, the coordinator 1714 can be configured with business rules that associate a source identifier, such as the network address of the source of the message with one or more selected recipient devices 1712. In another example, the coordinator 1714 can be configured with security specification information that determines a minimum security configuration or specifies a type of security specification for a received message. In this example, the coordinator 1714 can then utilize the security information of one or more registered security devices and determine which of the recipient device satisfies the specified security specifications. In still a further example, the coordinator 1714 can configured with a white list that identifies all available recipient devices based on a time of day, type of message, or other information or a black list the identifies one or more recipient devices that should be excluded.

At block 2310, the message processing service transmits the published content done in accordance with the procedures and capabilities of the messaging protocol, such as MQTT, and does not require additional or alternative communications to cause the transmission of the executable code. In other example, the message processing service can utilize a separate transport protocol. The recipient devices process the received published content.

At block 2312, the message processing service obtains processing results corresponding to the processing of the message. Illustratively, the client computing devices generates and publishes, via the messaging protocol, content related to information indicative of the processing results of the code. In some embodiments, the processing result can correspond to a binary determination of whether the execution of the code was successfully carried out. In another embodiment, the processing result can include one or more values indicative of the execution of the code/instruction or a log detailing information about the execution of the code/instructions. In a manner similar to that described with the publication of update topics, the publication of the processing result(s) can be associated with a particular topic, generally referred to as "processing result topic."

At block 2314, the message processing service matches the registered topics with the published topics to determine that the admin device 1704 should receive the published content with the processing result topic and transmits the published content. Illustratively, the transmittal of the published content is also done in accordance with the procedures and capabilities of the messaging protocol, such as MQTT, and does not require additional or alternative communications to cause the transmission of the executable code. At block 2316, the routine 2300 terminates.

Figure 24:
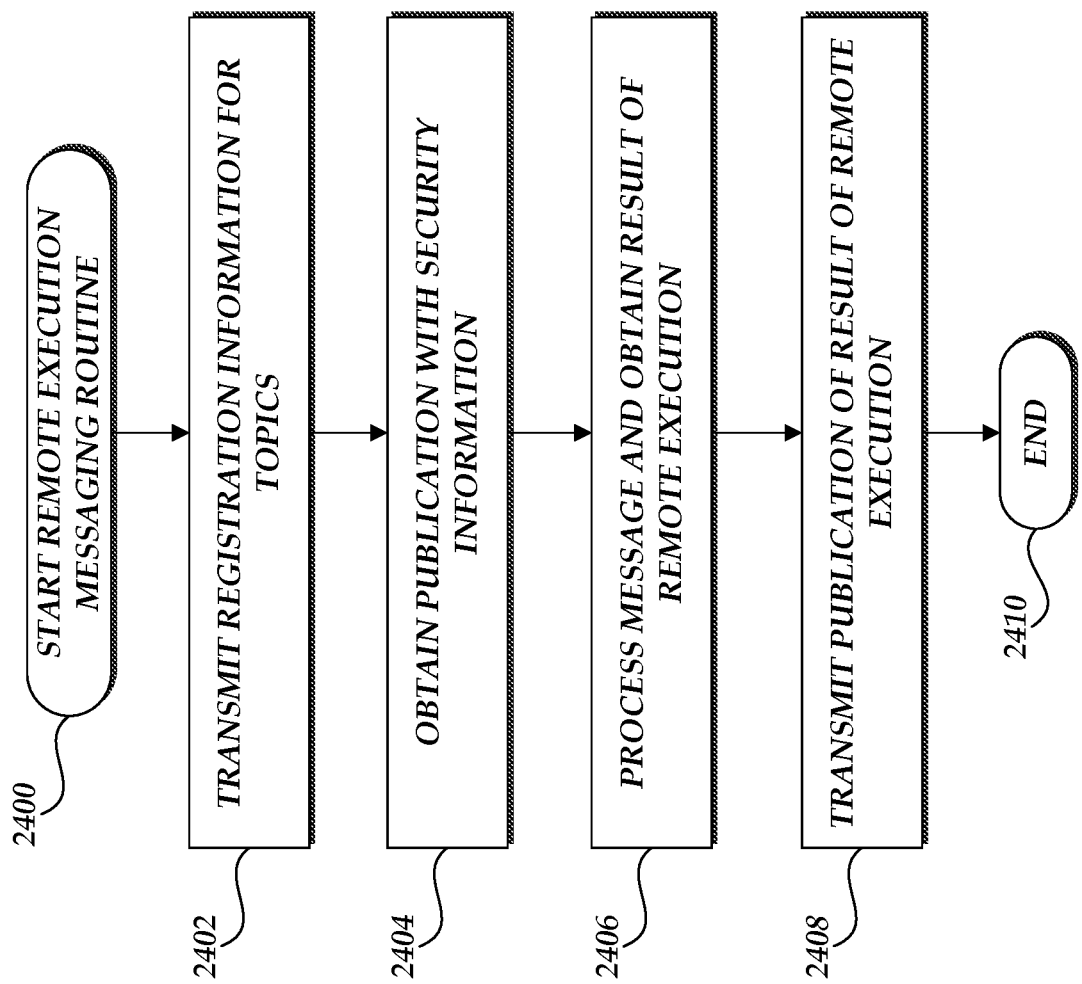
FIG. 24 is a flow diagram illustrative of a remote execution messaging routine implemented by a client computing device or coordinated device in accordance with an illustrative embodiment.

FIG. 24 is a flow diagram illustrative of a remote execution messaging routine 2400 implemented by a coordinated device 1712 or other computing device in accordance with an illustrative embodiment. As previously described, in this application, the coordinated device 1712 or other computing device can be considered as a message processing service to utilize security information in the processing of messages independent of whether other components also utilized the security information in routing of messages. The identification of a coordinated device 1712 in this example, however, should not be construed as limiting for the application of routine 2400. At block 2402, the coordinated device 1712 transmits one or more topic registration requests to the message processing services 2200. As described above, the topic registration is defined in accordance with the messaging protocol such that the coordinated device 1712 can register to receive content published according to specific topics by any number of content providers.

In response to receiving published content, the message processing services 2200 matches the registered topics with the published topics to determine that the client coordinated device 1712 should receive the published content. As previously described, the message processing service processes content with an original registration and then forwards the message to the coordinated device utilizing a routing table. At block 2404, the coordinated device 1712 receives published content from the message processing services 2200. Illustratively, the transmittal of the published content is done in accordance with the procedures and capabilities of the messaging protocol, such as MQTT, and does not require additional or alternative communications to cause the transmission of the executable code.

As part of the execution of the execution of content or after the execution of content, at block 2406, the coordinated device 1712 obtains the results of the remote execution. In some embodiments, the processing result can correspond to a binary determination of whether the execution of the code was successfully carried out. In another embodiment, the processing result can include one or more values indicative of the execution of the code/instruction or a log detailing information about the execution of the code/instructions.

At block 2408, the coordinated device 1712 publishes, via the messaging protocol, content related to information indicative of the processing results of the code. Illustratively, the transmittal of the published content is done in accordance with the procedures and capabilities of the messaging protocol, such as MQTT, and does not require additional or alternative communications to cause the transmission of the executable code. At block 2410, the routine 2400 terminates.

In accordance with an aspect of the present application:

1. A computer-implemented method for managing the execution of commands on a computing device utilizing a messaging protocol comprising:

receiving, at a message processing service, from an administrative client device, information related to configuration of message processing functionality to identify a set of codes embedded in a topic portion of received messages and process the received messages in accordance with instructions associated with identified codes, wherein the messages are formed in accordance with the MQ Telemetry Transport protocol;

receiving, by the message processing service, a received message from a device, wherein the received message includes a topic portion that includes one or more levels associated with subject matter descriptors and one or more levels identifying at least one embedded code;

identifying, by the message processing service, a set of recipient devices registered to receive messages based on the topic portion of the messages;

parsing, by the message processing service, the topic portion of the received message to identify the at least one embedded code;

processing, by the message processing service, the received message in accordance with the identified at least one embedded code utilizing the configuration of the message processing functionality, wherein the processing of the received message includes identification of a subset of the identified set of recipient devices to receive the received message; and publishing, by the message processing service, the processed received message to the subset of recipient device in the set of recipient devices.

2. The method as recited in claim 1, wherein processing, by the message processing service, the received message in accordance with the identified at least one embedded code utilizing the configuration of the message processing functionality includes a selection of the at least one recipient device based on evaluation of at least one criteria.

3. The method as recited in claim 1, wherein the subset of recipient devices correspond to a coordinated device and wherein the received message corresponds to instructions to execute a task by a coordinated device.

4. The method as recited in claim 1, wherein the message processing service corresponds to a coordinator for coordinated devices.

5. A system for managing communications utilizing a message protocol comprising:
   a message processing service implemented on at least one computing device having a processor and a memory, the remote command service configured to receive and publish messages formed in accordance with a messaging protocol,
   wherein the message processing service is configured to:
   receive an incoming message corresponding to a topic portion, the topic portion including at least one embedded code and at least one level describing a subject matter of the incoming message;
   process the embedded code according to a message processing configuration;
   and
   publish the processed incoming message.

6. The system as recited in claim 5 further comprising an administrative client device configured to configure the message processing service by associating one or more actions with as set of embedded codes.

7. The system as recited in claim 5, wherein the message processing service parses the topic to identify the embedded code.

8. The system as recited in claim 5, wherein the message processing service processes the embedded code by selecting a subset of possible recipients for the incoming message.

9. The system as recited in claim 5, wherein the message processing service processes the embedded code by modifying executable code included the incoming message.

10. The system as recited in claim 5, wherein the message processing service processes the embedded code by modifying timing associated with publishing the processed incoming message.

11. The system as recited in claim 5, wherein the message includes an assignment for a task and wherein the message processing service processes the embedded code by selecting a recipient device to process the task.

12, The system as recited in claim 5, wherein the messaging protocol comprises the MQ Telemetry Transport protocol.

13. A computer-implemented method for managing messages utilizing message protocols comprising:
   receiving messages formed in accordance with a messaging protocol, the messages corresponding to a topic, the topic including at least one embedded code and a subject matter description; and
   processing the embedded code according to a message processing configuration.

14. The computer-implemented method as recited in claim 13 further comprising parsing the topic to identify the embedded code.

15. The computer-implemented method as recited in claim 13, wherein processing the embedded code includes selecting a subset of possible recipients for the message.

16. The computer-implemented method as recited in claim 13, wherein the messages include one or more executable portions and wherein processing the embedded code includes modifying the execution of the one or more executable portions.

17. The computer-implemented method as recited in claim 16, wherein processing the embedded code includes modifying timing associated with executing the one or more executable portions.

18. The computer-implemented method as recited in claim 16, wherein at least one message includes two or more executable code portions and wherein processing the embedded code includes selecting from the two or more executable portions.

19. The computer-implemented method as recited in claim 16, wherein at least one message includes two or more executable code portions and wherein processing the embedded code includes deleting one of the two or more executable portions.

20. The computer-implemented method as recited in claim 13, wherein the messaging protocol comprises the MQ Telemetry Transport protocol.

In accordance with another aspect of the present application:

1. A computer-implemented method for managing the execution of commands on a computing device utilizing a messaging protocol comprising:
   receiving, at a message processing service, from an administrative client device, information related to configuration of message processing functionality to select a subset of registered devices to receive messages published in accordance with a topic, wherein the messages are formed in accordance with the MQ Telemetry Transport protocol;
   receiving, by the message processing service, a received message from a device, wherein the received message includes a topic portion that includes one or more levels associated with subject matter descriptors;
   identifying, by the message processing service, a set of recipient devices registered to receive messages based on the topic portion of the messages;
   processing, by the message processing service, the topic portion of the received message to select a subset of the recipient devices based on evaluation of at least one of a set of business rules or routing tables; and
   publishing, by the message processing service, the processed received message.

2. The method as recited in claim 1, wherein processing, by the message processing service, the received message includes obtaining at least one piece of additional information.

3. The method as recited in claim 1, wherein the subset of recipient devices correspond to a coordinated device and wherein the received message corresponds to instructions to execute a task by a coordinated device.

4. The method as recited in claim 1 further comprising processing, by the message processing service, the received message to identify a secondary topic corresponding to the selected subset of recipient devices.

5. A system for managing communications utilizing a message protocol comprising:
   a message processing service implemented on at least one computing device having a processor and a memory, the remote command service configured to receive and publish messages formed in accordance with a messaging protocol,
   wherein the message processing service is configured to:
   receive an incoming message corresponding to a topic portion, the topic portion including at least one level describing a subject matter of the incoming message, wherein a set of recipient devices are registered to receive messages associated with the topic of the incoming message;

process the incoming message according to a message processing configuration to identify a subset of the recipient devices; and publish the processed incoming message.

6. The system as recited in claim 5 further comprising an administrative client device configured to configure the message processing service by associating one or more business rules or routing tables.

7. The system as recited in claim 5, wherein the message processing service processes the incoming message by evaluating security criteria associated with the set of recipient devices and excluding at least one recipient device based on evaluation of the security criteria.

8. The system as recited in claim 5, wherein the message processing service processes selects a subset of possible recipients for the incoming message based on evaluation of logical rules.

9. The system as recited in claim 8, wherein the message processing service selects a single recipient device to receive the incoming message.

10. The system as recited in claim 5, wherein the message processing service corresponds to a network processing service.

11. The system as recited in claim 10, wherein the set of recipient devices corresponds to individual devices in a set of coordinated device networks.

12. The system as recited in claim 5, wherein the messaging protocol comprises the MQ Telemetry Transport protocol.

13. A computer-implemented method for managing messages utilizing message protocols comprising:

receiving messages formed in accordance with a messaging protocol, the messages corresponding to a topic, the topic including a subject matter description, wherein a set of recipient devices are registered to receive messages associated with the topic; and processing the received messages to a message processing configuration to identify a subset of the set of recipient devices.

14. The computer-implemented method as recited in claim 13, wherein processing the received messages includes selecting a subset of possible recipients for individual messages.

15. The computer-implemented method as recited in claim 13, wherein the message processing configurations include at least one business rule and wherein processing the received messages including evaluating the at least one business rule.

16. The computer-implemented method as recited in claim 15, wherein evaluating the at least one business rules includes obtaining information associating a source to the originating message.

17. The computer-implemented method as recited in claim 13, wherein the message processing configurations include a routing table and wherein processing the received messages including evaluating the routing table.

18. The computer-implemented method as recited in claim 13 further comprising obtaining the message processing configuration from an administrative component.

19. The computer-implemented method as recited in claim 13, wherein the messaging protocol comprises the MQ Telemetry Transport protocol.

20. The computer-implemented method as recited in claim 13, wherein the subset of recipient devices includes two or more recipient devices.

In accordance with another aspect of the present application:

1. A computer-implemented method for managing the execution of commands on a computing device utilizing a messaging protocol comprising:

receiving, at a message processing service, from an administrative client device, information related to configuration of message processing functionality to publish messages to a subset of registered devices to receive messages published in accordance with a topic, wherein the messages are formed in accordance with the MQ Telemetry Transport protocol;

receiving, by the message processing service, a received message from a device, wherein the received message includes a topic portion that includes one or more levels associated with subject matter descriptors;

identifying, by the message processing service, a set of recipient devices registered to receive messages based on the topic portion of the messages;

processing, by the message processing service, the received message to identify a security identifier and additional information to select a subset of the recipient devices based on evaluation of at least one of a set of business rules or routing tables; and publishing, by the message processing service, the processed received message based, at least in part, on the processing of the received message.

2. The method as recited in claim 1, wherein processing, by the message processing service, the received message includes obtaining at least one piece of additional information.

3. The method as recited in claim 1, wherein the subset of recipient devices correspond to a coordinated device and wherein the received message corresponds to instructions to execute a task by a coordinated device.

4. The method as recited in claim 1 further comprising parsing, by the message processing information, the message to obtain the security identifier and additional information.

5. A system for managing communications utilizing a message protocol comprising:

a message processing service implemented on at least one computing device having a processor and a memory, the remote command service configured to receive and publish messages formed in accordance with a messaging protocol, wherein the message processing service is configured to:

receive an incoming message corresponding to a topic portion, the topic portion identifying a subject matter of the incoming message, wherein a set of recipient devices are registered to receive messages associated with the topic of the incoming message;

process the incoming message according to a message security configuration to identify a subset of the recipient devices, wherein the message security configuration corresponds to evaluation of security information included in the incoming message; and publish the processed incoming message to the identified subset of the recipient devices.

6. The system as recited in claim 5 further comprising an administrative client device configured to configure the message processing service by associating one or more routing tables as part of the message security information.

7. The system as recited in claim 5, wherein the message processing service processes the incoming message by evaluating security criteria associated with the set of recipient devices and excluding at least one recipient device based on evaluation of the security criteria.

8. The system as recited in claim 5, wherein the message processing service processes the incoming message by evaluating security criteria associated with the set of recipient devices and selecting at least one recipient device based on evaluation of the security criteria.

9. The system as recited in claim 8, wherein the message processing service selects a single recipient device to receive the incoming message.

10. The system as recited in claim 5, wherein the incoming message corresponds to a network service.

11. The system as recited in claim 10, wherein the set of recipient devices corresponds to individual devices in a set of coordinated device networks.

12. The system as recited in claim 5, wherein the messaging protocol comprises the MQ Telemetry Transport protocol.

13. A computer-implemented method for managing messages utilizing message protocols comprising:
receiving messages formed in accordance with a messaging protocol, the messages corresponding to a topic, the topic including a subject matter description, wherein a set of recipient devices are registered to receive messages associated with the topic; and
processing security information included in the received messages according to a security processing configuration to manage access to a subset of the set of recipient devices.

14. The computer-implemented method as recited in claim 13, wherein processing the received messages includes selecting a subset of possible recipients for individual messages.

15. The computer-implemented method as recited in claim 13, wherein the message processing configurations include at least one of a business rule or routing table and wherein processing the received messages including evaluating the at least one business rule or routing table.

16. The computer-implemented method as recited in claim 15, wherein evaluating the at least one of a business rule or routing table includes evaluating the security information included in the received messages according to the at least one business rule or routing table.

17. The computer-implemented method as recited in claim 16, wherein the security information includes an identifier and a password embedded in the received messages.

18. The computer-implemented method as recited in claim 13 further comprising obtaining the security processing configuration from an administrative component.

19. The computer-implemented method as recited in claim 13, processing the security information included in the received messages according to a security processing configuration includes processing the security information included in the received messages without external network communication access.

20. The computer-implemented method as recited in claim 13, wherein the subset of recipient devices includes two or more recipient devices.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing the execution of commands on a computing device utilizing a messaging protocol comprising:
receiving, at a message processing service, from an administrative client device, information related to configuration of message processing functionality to identify a set of codes embedded in a topic portion of received messages and process the received messages in accordance with instructions associated with identified codes, wherein the messages are formed in accordance with the MQ Telemetry Transport protocol;
receiving, by the message processing service, a received message from a device, wherein the received message includes a topic portion that includes one or more levels associated with subject matter descriptors and one or more levels identifying at least one embedded code;

identifying, by the message processing service, a set of recipient devices registered to receive messages based on processing the one or more levels in the topic portion of the received messages;

parsing, by the message processing service, the topic portion of the received message to identify the at least one embedded code;

processing, by the message processing service, the received message in accordance with the identified at least one embedded code utilizing the configuration of the message processing functionality, wherein the processing of the received message includes identification of a subset of the identified set of recipient devices to receive the received message; and publishing, by the message processing service, the processed received message on a second topic associated with the identified subset of the set of recipient devices;

wherein the message processing service withholds publication of the processed received message to devices of the set of devices that are not within the identified subset, based on processing the received message in accordance with the identified at least one embedded code.

2. The method as recited in claim 1, wherein processing, by the message processing service, the received message in accordance with the identified at least one embedded code utilizing the configuration of the message processing functionality includes a selection of the at least one recipient device based on evaluation of at least one criteria.

3. The method as recited in claim 1, wherein the subset of recipient devices correspond to a coordinated device and wherein the received message corresponds to instructions to execute a task by a coordinated device.

4. The method as recited in claim 1, wherein the message processing service corresponds to a coordinator for coordinated devices.

5. A system for managing communications utilizing a message protocol comprising:

a message processing service implemented on at least one computing device having a processor and a memory, the message processing service configured to receive and publish messages formed in accordance with a messaging protocol, wherein the message processing service is configured to:
receive an incoming message corresponding to a topic portion, the topic portion including at least one embedded code and at least one level describing a subject matter of the incoming message;

process the received message in accordance with the at least one embedded code according to a message processing configuration, wherein the processing of the received message includes identification of a subset of an identified set of recipient devices to receive the received message; and publish the processed received message on a second topic associated with the subset of the set of recipient devices;

wherein the message processing service withholds publication of the processed received message to recipient devices of the identified set of recipient devices that are not within the identified subset, based on processing the received message in accordance with the at least one embedded code.

6. The system as recited in claim 5 further comprising an administrative client device configured to configure the message processing service by associating one or more actions with a set of embedded codes.

7. The system as recited in claim 5, wherein the message processing service parses the topic to identify the embedded code.

8. The system as recited in claim 5, wherein the message processing service processes the embedded code by selecting a subset of possible recipients for the incoming message.

9. The system as recited in claim 5, wherein the incoming message includes executable code, and wherein the message processing service processes the embedded code by modifying the executable code included in the incoming message.

10. The system as recited in claim 5, wherein the message processing service processes the embedded code by modifying a timing associated with publishing the processed incoming message.

11. The system as recited in claim 5, wherein the message includes an assignment for a task and wherein the message processing service processes the embedded code by selecting a recipient device to process the task.

12. The system as recited in claim 5, wherein the messaging protocol comprises the MQ Telemetry Transport protocol.

13. A computer-implemented method for managing messages utilizing message protocols comprising:

receiving messages formed in accordance with a messaging protocol, the messages corresponding to a topic, the topic including at least one embedded code and a subject matter description;

processing the received message in accordance with the at least one embedded code according to a message processing configuration, wherein the processing of the received message includes identification of a subset of an identified set of recipient devices to receive the received message;

publishing the processed received message on a second topic associated with the subset of the set of recipient devices; and withholding publication of the processed received message to recipient devices of the set of recipient devices that are not within the subset, based on processing the received message in accordance with the at least one embedded code.

14. The computer-implemented method as recited in claim 13 further comprising parsing the topic to identify the embedded code.

15. The computer-implemented method as recited in claim 13, wherein processing the embedded code includes selecting a subset of possible recipients for the message.

16. The computer-implemented method as recited in claim 13, wherein the messages include one or more executable portions and wherein processing the embedded code includes modifying an execution of the one or more executable portions.

17. The computer-implemented method as recited in claim 16, wherein processing the embedded code includes modifying u timing associated with executing the one or more executable portions.

18. The computer-implemented method as recited in claim 16, wherein at least one message includes two or more executable code portions and wherein processing the embedded code includes selecting from the two or more executable code portions at least one executable code portion for execution.

19. The computer-implemented method as recited in claim 16, wherein at least one message includes two or more executable code portions and wherein processing the embedded code includes deleting one of the two or more executable portions.

20. The computer-implemented method as recited in claim 13, wherein the messaging protocol comprises the MQ Telemetry Transport protocol.

\* \* \* \* \*